(12) United States Patent
Bakaya et al.

(10) Patent No.: US 7,831,493 B1
(45) Date of Patent: Nov. 9, 2010

(54) METHOD AND DATA PROCESS SYSTEM FOR ANALYSING AND TIMING BUY/SELL TIPS AS AN AID TO INVESTMENT DECISION MAKING ON A TRADEABLE ASSET OR SECURITY

(76) Inventors: Anil Bakaya, 1011 Eaton Dr., McLean, VA (US) 22102; Dhiraj Dylan Bakaya, 1011 Eaton Dr., McLean, VA (US) 22102

( * ) Notice: Subject to any disclaimer, the term of this patent is extended or adjusted under 35 U.S.C. 154(b) by 0 days.

(21) Appl. No.: 09/926,598

(22) PCT Filed: May 25, 2000

(86) PCT No.: PCT/AU00/00551

§ 371 (c)(1),
(2), (4) Date: Jan. 17, 2002

(87) PCT Pub. No.: WO00/73946

PCT Pub. Date: Dec. 7, 2000

(30) Foreign Application Priority Data

May 27, 1999 (AU) .................................... PQ0593

(51) Int. Cl.
*G06Q 40/00* (2006.01)
(52) U.S. Cl. .................................. 705/36 R

(58) Field of Classification Search .............. 705/35–45
See application file for complete search history.

(56) References Cited

U.S. PATENT DOCUMENTS 6,272,474 B1 * 8/2001 Garcia ...................... 705/36 R

* cited by examiner

*Primary Examiner*—Richard C Weisberger

(57) ABSTRACT

A method for analysing data and determining the timing of buy/sell tips as an aid to making an investment decision tradable assets or securities including the steps of: (a) receiving data on a number of specified assets or securities, (b) determining the technical strength of each asset or security from recorded market characteristics of the security as a function of the volume trade of the security, the price at which the trade took place, and the direction of movement of the price, and ranking the technical strength of each asset or security, (c) selecting tradable asset or securities having a ranking or value of technical strength above a predetermined ranking or value, (d) determining the fundamental strength of those selected assets or securities based on one or more of a group of selected variables and ranking those selected assets or securities, based on the fundamental strength, and (e) selecting or facilitating the selection of securities which are suitable for purchasing and/or securities which are suitable for selling based on the combination of the technical strength and fundamental strength of the security.

5 Claims, 34 Drawing Sheets

FIGURE 1

HIGH VOLUMES TRADED THIS WEEK 11.5.87

MINING AND OIL - M.CAP. > 200M

| STOCK NAME | VOLUME INDEX | PRICE | M.CAP(1000) |
|---|---|---|---|
| ANGLO AMERICAN PACIFIC LIMITED | 19.13 | 3.05 | 374753 |
| OIL SEARCH LIMITED | 9.99 | 1.45 | 277384 |
| HARTOGEN ENERGY LIMITED | 8.48 | 4.30 | 339188 |
| METALS EXPLORATION LIMITED | 7.51 | 1.90 | 259405 |
| BHP GOLD MINES LIMITED | 6.33 | 1.75 | 1697500 |
| BELL RESOURCES LIMITED | 8.19 | 6.00 | 3487922 |
| NORTH KALGURLI MINES LIMITED | 5.11 | 1.85 | 600359 |
| PANCONTINENTAL MINING LIMITED | 4.40 | 3.75 | 602648 |
| CRUSADER LIMITED | 3.98 | 3.25 | 307148 |
| HILL 50 GOLD MINE N.L. | 3.60 | 1.70 | 233750 |
| AMPOL EXPLORATION LIMITED | 3.23 | 5.40 | 507519 |
| PELSART RESOURCES N.L. | 2.88 | 1.30 | 311545 |
| NORTH FLINDERS MINES LIMITED | 2.79 | 27.50 | 443190 |
| AUSTRALIAN OIL AND GAS CORPORATION LIMITED | 2.63 | 2.70 | 512730 |
| M.I.M. HOLDINGS LIMITED | 2.53 | 3.85 | 2508598 |

MINING AND OIL - M.CAP. BETWEEN 50M AND 200M

| STOCK NAME | VOLUME INDEX | PRICE | M.CAP(1000) |
|---|---|---|---|
| BRUCE RESOURCES N.L. | 212.47 | 1.25 | 82500 |
| BARCOO PETROLEUM N.L. | 68.01 | 0.57 | 82757 |
| WINTON OIL N.L. | 14.22 | 0.28 | 84829 |
| SOUTHERN RESOURCES LIMITED | 13.94 | 3.60 | 65041 |
| GENOA OIL N.L. | 12.72 | 4.80 | 149099 |
| CONSOLIDATED PETROLEUM AUSTRALIA N.L. | 11.71 | 0.58 | 54144 |
| PHOENIX OIL & GAS N.L. | 10.16 | 1.70 | 71410 |
| JULIA MINES N.L. | 8.95 | 3.40 | 140336 |
| AZTEC EXPLORATION LIMITED | 8.49 | 1.05 | 103950 |
| INDEPENDENT RESOURCES LIMITED | 8.25 | 11.00 | 118140 |
| PETRO ENERGY LIMITED | 8.17 | 0.18 | 51930 |
| GREENBUSHES TIN LIMITED | 7.85 | 1.30 | 79557 |
| GOLDEN VALLEY MINES N.L. | 6.89 | 1.20 | 82873 |
| BOULDER GOLD N.L. | 6.87 | 3.40 | 111723 |
| MINORA RESOURCES N.L. | 5.68 | 0.33 | 59400 |

MINING AND OIL - M. CAP LESS THAN 50M

| STOCK NAME | VOLUME INDEX | PRICE | M.CAP(1000) |
|---|---|---|---|
| ARBOYNE N.L. | 42.17 | 1.25 | 14481 |
| KIA PACIFIC GOLD LIMITED | 38.57 | 0.32 | 31224 |
| CORNWALL PETROLEUM CORPORATION N.L. | 32.19 | 0.75 | 16895 |
| MOAGE LIMITED | 27.83 | 1.15 | 40923 |
| KALBARA MINING N.L. | 27.54 | 0.62 | 22270 |
| MISTRAL MINES N.L. | 27.33 | 0.90 | 26900 |
| SABMINCO N.L. | 21.88 | 0.68 | 16047 |
| EAST COAST MINERALS N.L. | 21.13 | 0.50 | 16937 |
| FIMISTON MINING LIMITED | 18.60 | 0.85 | 26280 |
| NEWMEX EXPLORATION LIMITED | 18.15 | 0.90 | 33392 |
| CLIFFORD MINERALS LIMITED | 16.01 | 0.40 | 6901 |
| SOVEREIGN RESOURCES | 13.69 | 0.27 | 18261 |
| CENTRAL MURCHISON GOLD LIMITED | 13.23 | 0.19 | 17292 |
| ZAPOPAN N.L. | 12.06 | 1.00 | 12260 |
| WATTLE GULLY GOLD MINES N.L. | 12.00 | 0.37 | 10725 |

INDUSTRIAL STOCKS - M.CAP. > 200M

| STOCK NAME | VOLUME INDEX | PRICE | M.CAP(1000) |
|---|---|---|---|
| AIRSHIP INDUSTRIES LIMITED | 24.64 | 1.00 | 254178 |
| TOOTH & CO LIMITED | 17.55 | 8.20 | 479427 |
| BORG-WARNER (AUSTRALIA) LIMITED | 8.75 | 5.00 | 202215 |
| JAMES HARDIE INDUSTRIES LIMITED | 5.71 | 4.55 | 813253 |
| AUSTRALIAN ASSET MANAGEMENT LIMITED | 5.70 | 1.50 | 233571 |
| GOODMAN FIELDER LIMITED | 2.70 | 4.70 | 1612052 |
| WESFARMERS LIMITED | 2.18 | 3.70 | 283166 |
| RHEEM AUSTRALIA LIMITED | 2.14 | 3.90 | 329129 |
| INDUSTRIAL EQUITY LIMITED | 2.11 | 4.70 | 2756568 |
| NATIONAL CONSOLIDATED LIMITED | 2.07 | 4.00 | 328672 |
| WESTFIELD TRUST | 2.05 | 2.00 | 611796 |
| BORAL LIMITED | 1.99 | 4.80 | 2547994 |
| FLETCHER CHALLENGE LIMITED | 1.97 | 4.70 | 3917304 |
| COLES MYER LIMITED | 1.86 | 7.08 | 3352963 |
| NATIONAL AUSTRALIA BANK LIMITED | 1.81 | 5.54 | 2471145 |

INDUSTRIAL STOCKS - M.CAP. BETWEEN 50M AND 200M

| STOCK NAME | VOLUME INDEX | PRICE | M.CAP(1000) |
|---|---|---|---|
| N21-BRICK SECURITIES PROPERTY TRUST | 143.78 | 0.83 | 55800 |
| CIC HOLDINGS LIMITED | 41.04 | 3.60 | 149920 |
| PINE VALE INVESTMENTS LIMITED | 29.92 | 0.56 | 55591 |
| AUST-WIDE TRUST | 11.82 | 0.44 | 63105 |
| NATIONAL PROPERTIES LIMITED | 11.71 | 3.10 | 96290 |
| COCKBURN CEMENT LIMITED | 10.83 | 1.80 | 54000 |
| BUNNINGS LIMITED | 9.99 | 4.50 | 174666 |
| INTER-PACIFIC EQUITY LIMITED | 6.26 | 3.55 | 68967 |
| CHEETHAM LIMITED | 6.54 | 3.40 | 103819 |
| FINE METALS CORPORATION LIMITED | 6.43 | 3.60 | 86390 |
| LATEC INVESTMENTS LIMITED | 6.21 | 0.27 | 109289 |
| TTL CORPORATION LIMITED | 5.75 | 3.15 | 109500 |
| HASTINGS DEERING FINANCE AND INVESTMENT CO L | 5.00 | 1.10 | 68987 |
| FIRST NATIONAL RESOURCE TRUST | 4.38 | 1.05 | 105000 |
| SIDDONS INDUSTRIES LIMITED | 3.63 | 3.05 | 89725 |

INDUSTRIAL STOCKS - M. CAP LESS THAN 50M

| STOCK NAME | VOLUME INDEX | PRICE | M.CAP(1000) |
|---|---|---|---|
| GOLDMIN INVESTMENTS LIMITED | 140.45 | 0.32 | 4800 |
| PACIFIC CAPITAL LIMITED | 110.64 | 0.46 | 4128 |
| STRAND HOLDINGS LIMITED | 91.40 | 1.10 | 44395 |
| AUSTEO HOLDINGS LIMITED | 87.36 | 0.31 | 3999 |
| LUSTRAL LIMITED | 79.86 | 2.00 | 13200 |
| DGA AUSTRALIA LIMITED | 53.81 | 0.95 | 10212 |
| ASHCITI INVESTMENT HOLDINGS LIMITED | 48.36 | 0.85 | 14414 |
| BUSINESS CAPITAL LIMITED | 36.95 | 1.20 | 11400 |
| BUILDMAT (AUSTRALIA) LIMITED | 33.65 | 0.50 | 3076 |
| TECHNICAL EQUITIES LIMITED | 32.65 | 0.28 | 5600 |
| CHURCHILL LEISURE INDUSTRIES LIMITED | 22.46 | 0.12 | 8053 |
| CAMPBELL GROUP LIMITED | 21.99 | 2.80 | 44604 |
| MINING TECHNOLOGY AUST. LIMITED | 21.79 | 0.13 | 4700 |
| WINDSOR HOLDINGS LIMITED | 19.38 | 0.68 | 2614 |
| BELMONT HOLDINGS LIMITED | 18.04 | 1.00 | 1813 |

FIGURE 2

STOCKS NEAR BOOK VALUE 11.5.87

MINING AND OIL – M.CAP. > 200M

| STOCK NAME | NTA/PRICE | PRICE | M.CAP(1000) |
|---|---|---|---|
| BRIDGE OIL LIMITED | 0.85 | 1.55 | 510351 |
| C S R LIMITED | 0.80 | 3.83 | 2533425 |
| M.I.M. HOLDINGS LIMITED | 0.69 | 3.85 | 2505598 |
| BELL RESOURCES LIMITED | 0.87 | 6.00 | 3497622 |
| AUSTRALIAN OIL AND GAS CORPORATION LIMITED | 0.61 | 2.70 | 512730 |
| PEKO-WALLSEND LIMITED | 0.60 | 8.20 | 1459140 |
| HOWARD SMITH LIMITED | 0.58 | 4.75 | 486310 |
| QUEENSLAND COAL TRUST | 0.56 | 1.45 | 733121 |
| CRA LIMITED | 0.52 | 11.30 | 6284653 |
| ENERGY RESOURCES OF AUSTRALIA LIMITED | 0.51 | 2.35 | 963500 |
| NORTH BROKEN HILL HOLDINGS LIMITED | 0.49 | 3.70 | 1639262 |
| COMALCO LIMITED | 0.48 | 3.30 | 1850023 |
| HARTOGEN ENERGY LIMITED | 0.47 | 4.30 | 339168 |
| WOODSIDE PETROLEUM LIMITED | 0.44 | 2.40 | 1800001 |
| BOUGAINVILLE COPPER LIMITED | 0.43 | 6.00 | 2005316 |

MINING AND OIL – M.CAP. BETWEEN 50M AND 200M

| STOCK NAME | NTA/PRICE | PRICE | M.CAP(1000) |
|---|---|---|---|
| PETROZ N.L. | 1.44 | 0.08 | 58881 |
| OAKBRIDGE LIMITED | 1.39 | 0.80 | 115054 |
| COAL & ALLIED INDUSTRIES LIMITED | 1.19 | 4.15 | 130679 |
| MUSWELLBROOK ENERGY AND MINERALS LIMITED | 0.84 | 2.15 | 130610 |
| MID-EAST MINERALS NO LIABILITY | 0.99 | 1.25 | 78913 |
| OIL COMPANY OF AUSTRALIA N.L. | 0.88 | 0.00 | 91528 |
| BEACH PETROLEUM LIMITED | 0.49 | 0.85 | 84248 |
| PETROLEUM SECURITIES AUSTRALIA LIMITED | 0.43 | 3.50 | 53134 |
| GREENBUSHES TIN LIMITED | 0.40 | 1.30 | 78957 |
| COSTAIN AUSTRALIA LIMITED | 0.39 | 2.80 | 105944 |
| WESTRALIAN SANDS LIMITED | 0.38 | 3.10 | 122845 |
| MAGELLAN PETROLEUM AUSTRALIA LIMITED | 0.28 | 3.75 | 114540 |
| CUDGEN R.Z. LIMITED | 0.25 | 6.20 | 77500 |
| CONSOLIDATED RUTILE LIMITED | 0.22 | 7.00 | 145446 |
| WINDSOR RESOURCES N.L. | 0.07 | 1.70 | 67922 |

MINING AND OIL – M. CAP. LESS THAN 50M

| STOCK NAME | NTA/PRICE | PRICE | M.CAP(1000) |
|---|---|---|---|
| AUSTEN & BUTTA LIMITED | 3.02 | 0.75 | 24096 |
| CONSOLIDATED RESOURCES N.L. | 2.14 | 0.07 | 7891 |
| STRATA OIL N.L. | 1.88 | 0.12 | 7697 |
| SOUTHERN CROSS EXPLORATION N.L. | 1.41 | 0.16 | 6064 |
| PETROCARB EXPLORATION N.L. | 1.33 | 0.19 | 9916 |
| ALLIED QUEENSLAND COALFIELDS LIMITED | 1.21 | 0.60 | 15358 |
| ASIA OIL AND MINERALS LIMITED | 1.20 | 0.20 | 11811 |
| VICTORIA EXPLORATION N.L. | 1.13 | 0.22 | 7210 |
| LAUREL BAY PETROLEUM LIMITED | 1.03 | 0.24 | 35000 |
| SAMANTHA EXPLORATION N.L. | 0.98 | 0.55 | 17057 |
| VAM LIMITED | 0.94 | 0.45 | 14926 |
| TARGET PETROLEUM N.L. | 0.89 | 0.80 | 25538 |
| BLIGH COAL LIMITED | 0.89 | 0.30 | 3600 |
| ORCA PETROLEUM N.L. | 0.84 | 0.24 | 27188 |
| GOLDEN GROVE MINING N.L. | 0.77 | 2.00 | 35582 |

INDUSTRIAL STOCKS – M.CAP. > 200M

| STOCK NAME | NTA/PRICE | PRICE | M.CAP(1000) |
|---|---|---|---|
| TUBEMAKERS OF AUSTRALIA LIMITED | 1.19 | 2.30 | 284400 |
| CALTEX AUSTRALIA LIMITED | 1.14 | 2.05 | 359000 |
| NATIONAL AUSTRALIA BANK LIMITED | 1.08 | 6.54 | 2471145 |
| AUSTRALIA AND NEW ZEALAND BANKING GROUP LIMITED | 0.99 | 6.10 | 2603231 |
| WESTPAC BANKING CORPORATION | 0.98 | 4.98 | 2847225 |
| JENNINGS INDUSTRIES LIMITED | 0.88 | 2.05 | 291325 |
| SUNSHINE AUSTRALIA LIMITED | 0.88 | 2.45 | 260437 |
| TOOTH & CO LIMITED | 0.85 | 6.20 | 478427 |
| I.C.I AUSTRALIA LIMITED | 0.82 | 4.00 | 885768 |
| WORMALD INTERNATIONAL LIMITED | 0.80 | 3.30 | 443428 |
| GENERAL PROPERTY TRUST | 0.79 | 3.05 | 1194502 |
| WESTFIELD TRUST | 0.78 | 2.00 | 811759 |
| AUSTRALIAN GUARANTEE CORPORATION LIMITED | 0.78 | 3.25 | 95745 |
| AUSTRALIAN FOUNDATION INVESTMENT CO | 0.76 | 1.50 | 336251 |
| NEW ZEALAND FOREST PRODUCTS LIMITED | 0.75 | 2.85 | 1212500 |

INDUSTRIAL STOCKS – M.CAP. BETWEEN 50M AND 200M

| STOCK NAME | NTA/PRICE | PRICE | M.CAP(1000) |
|---|---|---|---|
| STANDARD CHARTERED BANK AUSTRALIA LIMITED | 1.48 | 1.15 | 118153 |
| G.E. CRANE HOLDINGS LIMITED | 1.40 | 4.20 | 50820 |
| LEIGHTON HOLDINGS LIMITED | 1.30 | 0.85 | 100529 |
| AUSTORE PROPERTY TRUST | 1.24 | 0.75 | 71755 |
| MILTON CORPORATION LIMITED | 1.21 | 5.00 | 60500 |
| A.P.A. HOLDINGS LIMITED | 1.17 | 1.10 | 135041 |
| QUEENSLAND TRADING & HOLDING COMPANY LIMITED | 1.05 | 6.30 | 120962 |
| MITSUBISHI MOTORS AUSTRALIA LIMITED | 1.04 | 2.10 | 124797 |
| CARLTON INVESTMENTS LIMITED | 1.03 | 40.00 | 78200 |
| CITIES OF AUSTRALIA PROPERTY TRUST; THE | 1.02 | 0.82 | 59041 |
| NATIONAL MUTUAL PROPERTY TRUST | 1.02 | 1.18 | 147508 |
| BUNDABERG SUGAR COMPANY LIMITED | 1.01 | 2.80 | 174359 |
| MACMAHON HOLDINGS LIMITED | 1.00 | 1.10 | 63560 |
| A F L HOLDINGS LIMITED | 0.98 | 1.87 | 176505 |
| COVENTRY GROUP LIMITED | 0.97 | 3.25 | 50317 |

INDUSTRIAL STOCKS – M. CAP LESS THAN 50M

| STOCK NAME | NTA/PRICE | PRICE | M.CAP(1000) |
|---|---|---|---|
| TAG PACIFIC LIMITED | 3.48 | 0.80 | 18000 |
| ABATIC PACIFIC INDUSTRIES LIMITED | 3.29 | 0.69 | 5948 |
| JACK CHIA (AUSTRALIA) LIMITED | 3.13 | 0.23 | 35609 |
| DAINFORD HOLDINGS LIMITED | 3.00 | 1.50 | 6050 |
| GEARHART AUSTRALIA LIMITED | 2.58 | 0.22 | 3300 |
| BRIDGESTONE AUSTRALIA LIMITED | 2.38 | 1.05 | 38295 |
| AUSTECH VENTURES LIMITED | 2.12 | 0.45 | 3150 |
| VISCOUNT HOLDINGS LIMITED | 2.00 | 0.40 | 10188 |
| TAL HOLDINGS LIMITED | 1.92 | 0.50 | 15747 |
| AIM TOYOTA LIMITED | 1.85 | 2.00 | 23858 |
| SIME DARBY AUSTRALIA LIMITED | 1.83 | 1.35 | 8312 |
| JOHN SHEARER (HOLDINGS) LIMITED | 1.78 | 1.85 | 15374 |
| E.P.T. GROUP HOLDINGS LIMITED | 1.74 | 0.43 | 40500 |
| BURNS PHILP (SOUTH SEA) COMPANY LIMITED | 1.64 | 3.00 | 30042 |
| AUSTRALIAN MERCHANT HOLDINGS LIMITED | 1.62 | 0.70 | 32807 |

FIGURE 3

LOW P/E STOCKS 11.5.87

| MINING AND OIL -M.CAP. > 200M | | | | |
|---|---|---|---|---|
| STOCK NAME | P/E RATIO | PRICE | M.CAP('000) | |
| QUEENSLAND COAL TRUST | 8.49 | 1.45 | 733121 | |
| BELL RESOURCES LIMITED | 8.56 | 6.00 | 3467622 | |
| BRIDGE OIL LIMITED | 12.66 | 1.95 | 510351 | |
| HOWARD SMITH LIMITED | 14.32 | 4.75 | 486310 | |
| C S R LIMITED | 14.93 | 3.83 | 2633428 | |
| BROKEN HILL PROPRIETARY COMPANY LIMITED; THE | 15.76 | 10.20 | 15542844 | |
| AMPOL EXPLORATION LIMITED | 17.15 | 5.40 | 507519 | |
| SANTOS LIMITED | 17.80 | 6.60 | 1742430 | |
| PEKO-WALLSEND LIMITED | 18.27 | 8.20 | 1456140 | |
| ELDERS RESOURCES LIMITED | 18.32 | 3.95 | 1140254 | |
| ENERGY RESOURCES OF AUSTRALIA LIMITED | 19.11 | 2.35 | 968500 | |
| PANCONTINENTAL MINING LIMITED | 21.07 | 3.75 | 902846 | |
| CRUSADER LIMITED | 22.25 | 3.25 | 307146 | |
| HARTOGEN ENERGY LIMITED | 22.99 | 4.30 | 339166 | |
| KIDSTON GOLD MINES LIMITED | 23.48 | 8.80 | 1100000 | |

| MINING AND OIL-M.CAP. BETWEEN 50M AND 200M | | | | |
|---|---|---|---|---|
| STOCK NAME | P/E RATIO | PRICE | M.CAP('000) | |
| COAL & ALLIED INDUSTRIES LIMITED | 5.51 | 4.15 | 130879 | |
| EROMANGA HYDROCARBONS N L | 8.39 | 0.30 | 72041 | |
| OIL COMPANY OF AUSTRALIA N L | 11.09 | 0.90 | 91528 | |
| CONSOLIDATED RUTILE LIMITED | 14.22 | 7.00 | 145448 | |
| CUDGEN R.Z LIMITED | 14.30 | 6.20 | 77500 | |
| BEACH PETROLEUM LIMITED | 14.30 | 0.85 | 94245 | |
| COSTAIN AUSTRALIA LIMITED | 14.47 | 2.80 | 105944 | |
| WESTRALIAN SANDS LIMITED | 15.67 | 3.10 | 122845 | |
| DILMET RESOURCES N.L. | 21.82 | 1.15 | 108632 | |
| GREAT VICTORIA GOLD LIMITED | 22.08 | 2.30 | 186008 | |
| WESTERN AUSTRALIAN DIAMOND TRUST | 23.63 | 1.40 | 91000 | |
| CARR BOYD MINERALS LIMITED | 24.09 | 2.60 | 133617 | |
| JIMBERLANA MINERALS N.L. | 24.78 | 0.70 | 191210 | |
| BRUNSWICK OIL N.L. | 25.22 | 2.20 | 128412 | |
| KUA ORA GOLD CORPORATION N.L. | 27.29 | 1.45 | 97905 | |

| MINING AND OIL-M. CAP LESS THAN 50M | | | | |
|---|---|---|---|---|
| STOCK NAME | P/E RATIO | PRICE | M.CAP('000) | |
| GOLD & MINERAL EXPLORATION N L | 3.46 | 0.40 | 8098 | |
| CULTUS RESOURCES N.L. | 4.89 | 0.48 | 48720 | |
| AUSTRALIAN MINING INVESTMENTS LIMITED | 5.64 | 0.52 | 46383 | |
| PLENTY RIVER MINING COMPANY N.L. | 6.11 | 0.24 | 32139 | |
| AQUARIUS EXPLORATION N.L. | 7.00 | 1.15 | 4054 | |
| JERVOIS SULPHATES (N.T.) LIMITED | 7.53 | 0.35 | 33206 | |
| ALKANE EXPLORATION (TERRIGAL) N L | 8.90 | 0.38 | 18056 | |
| COHO AUSTRALIA LIMITED | 10.56 | 0.42 | 16760 | |
| VAM LIMITED | 10.77 | 0.45 | 14926 | |
| ALLIED QUEENSLAND COALFIELDS LIMITED | 11.47 | 0.60 | 15388 | |
| CHURCHILL RESOURCES N.L. | 15.55 | 0.05 | 25697 | |
| GOLDEN PLATEAU N.L. | 15.81 | 0.95 | 19378 | |
| UNITED GOLDFIELDS CORPORATION N.L. | 16.45 | 2.80 | 28339 | |
| CONSOLIDATED RESOURCES N L | 17.85 | 0.07 | 7691 | |
| CANNING ENERGY LIMITED | 18.14 | 0.15 | 7310 | |

| INDUSTRIAL STOCKS-M.CAP. > 200M | | | |
|---|---|---|---|
| STOCK NAME | P/E RATIO | PRICE | M.CAP('000) |
| WESTPAC BANKING CORPORATION | 5.67 | 4.98 | 2847225 |
| NATIONAL AUSTRALIA BANK LIMITED | 7.08 | 5.54 | 2471145 |
| WORMALD INTERNATIONAL LIMITED | 7.38 | 3.30 | 443428 |
| AUSTRALIA & NEW ZEALAND BANKING GROUP LIMITED | 7.65 | 8.10 | 2803231 |
| MIRAGE RESORTES TRUST | 7.88 | 2.30 | 207287 |
| ADELAIDE STEAMSHIP COMPANY LIMITED; THE | 8.44 | 8.10 | 1207273 |
| FELTEX NEW ZEALAND LIMITED | 8.72 | 3.30 | 428007 |
| SUNSHINE AUSTRLIA LIMITED | 8.74 | 2.45 | 280437 |
| NATIONAL CONSOLIDATED LIMITED | 8.28 | 4.00 | 326972 |
| TUBEMAKERS OF AUSTRALIA LIMITED | 9.51 | 2.30 | 299400 |
| DAVID JONES LIMITED | 9.89 | 10.70 | 1118394 |
| AUSTRALIA GUARANTEE CORPORATION LIMITED | 10.20 | 3.25 | 656745 |
| HOOKER CORPORATION LIMITED | 10.82 | 3.18 | 642824 |
| METAL MANUFACTURERS | 10.85 | 2.35 | 356450 |
| NZI CORPORATION LIMITED | 10.90 | 1.55 | 1096228 |

| INDUSTRIAL STOCKS-M.CAP. BETWEEN 50M AND 200M | | | |
|---|---|---|---|
| STOCK NAME | P/E RATIO | PRICE | M.CAP('000) |
| AUSTRALIAN RACING AND BREEDING STABLES LIMITED | 5.39 | 3.00 | 58843 |
| CHUAN HUP AUSTRALIA LIMITED | 6.21 | 1.80 | 129850 |
| PARRY CORPORATION LIMITED | 6.59 | 3.15 | 125540 |
| MACMAHON HOLDINGS LIMITED | 7.29 | 1.10 | 85560 |
| A.P.A. HOLDINGS LIMITED | 8.02 | 1.10 | 135041 |
| GKN KWIKFORM INDUSTRIES LIMITED | 8.07 | 3.80 | 56973 |
| WESTINGHOUSE BRAKE & SIGNAL COMPANY (AUSTRALIA) | 8.27 | 7.00 | 54677 |
| ROTHWELLS LIMITED | 8.69 | 3.55 | 107629 |
| HASTINGS DEERING FINANCE AND INVESTMENT CO LTD | 8.99 | 1.10 | 68887 |
| AUSTORE PROPERTY TRUST | 9.34 | 0.75 | 71755 |
| COLLINS & LEAHY HOLDINGS LIMITED | 9.45 | 5.40 | 84741 |
| GROUP PROPERTY SERVICES LIMITED | 9.59 | 2.50 | 52363 |
| STANDARD CHARTERED BANK AUSTRALIA LIMITED | 9.67 | 1.15 | 118153 |
| P&O AUSTRALIA LIMITED | 10.09 | 3.60 | 119999 |
| BONDS COATS PATONS LIMITED | 10.35 | 4.00 | 154460 |

| INDUSTRIAL STOCKS-M. CAP LESS THAN 50M | | | |
|---|---|---|---|
| STOCK NAME | P/E RATIO | PRICE | M.CAP('000) |
| VEALLS SECURITIES AND FINANCE LIMITED | 1.44 | 0.40 | 2860 |
| FINBAR INTERNATIONAL LIMITED | 2.52 | 0.18 | 23494 |
| SEGENHOE LIMITED | 2.54 | 0.77 | 41907 |
| A.T.S. RESOURCES LIMITED | 2.70 | 1.35 | 18369 |
| HENRY & WALKER | 3.44 | 0.50 | 16384 |
| TAG PACIFIC LIMITED | 3.71 | 0.60 | 18000 |
| AMI TOYOTA LIMITED | 4.14 | 2.00 | 23858 |
| PIONEER PROPERTY GROUP LIMITED | 4.71 | 0.35 | 12427 |
| CARRIER AIR CONDITIONING (HOLDINGS) LIMITED | 5.30 | 2.10 | 14700 |
| JACK CHIA (AUSTRALIA) LIMITED | 5.32 | 0.23 | 36609 |
| JEFFERIES INDUSTRIES LIMITED | 5.67 | 1.35 | 3970 |
| WATER HOLDINGS LIMITED | 5.87 | 3.30 | 5531 |
| EASTCOURT LIMITED | 5.80 | 0.60 | 12568 |
| ALDUS LIMITED | 6.14 | 5.90 | 20137 |
| COMMUNICATIONS AND ENTERTAINMENT LIMITED | 6.18 | 0.41 | 25420 |

FIGURE 4                                            HIGH DIVIDEND YIELD STOCKS                                                                11.5.87

MINING AND OIL – M.CAP. > 200M

| STOCK NAME | YIELD | EF.TAX | PRICE | M.CAP (1000) |
|---|---|---|---|---|
| QUEENSLAND COAL TRUST | 16.25 | 0.00 | 1.45 | 733121 |
| HOWARD SMITH LIMITED | 5.26 | 37.27 | 4.75 | 486310 |
| C S R LIMITED | 4.66 | 38.30 | 3.83 | 2533426 |
| ENERGY RESOURCES OF AUSTRALIA LIMITED | 4.26 | 48.76 | 2.95 | 963500 |
| CENTRAL NORSEMAN GOLD CORPORATION | 3.54 | -0.18 | 3.00 | 624000 |
| BOUGAINVILLE COPPER LIMITED | 2.94 | 38.79 | 5.00 | 2005815 |
| BROKEN HILL PROPRIETARY COMPANY LIMITED, THE | 2.76 | 45.65 | 10.20 | 15542944 |
| BELL RESOURCES LIMITED | 2.50 | 30.49 | 6.00 | 3467622 |
| PEKO-WALLSEND LIMITED | 2.44 | 35.92 | 8.20 | 1456140 |
| SONS OF GWALIA N.L. | 2.24 | 0.00 | 14.50 | 426228 |
| KIDSTON GOLD MINES LIMITED | 1.70 | 0.56 | 8.80 | 1100000 |
| VAMGAS LIMITED | 1.68 | 58.66 | 3.58 | 240576 |
| NORTH BROKEN HILL HOLDINGS LIMITED | 1.59 | 27.64 | 3.70 | 1639292 |
| C R A LIMITED | 1.27 | 66.48 | 11.30 | 6284633 |
| GOLD MINES OF KALGOORLIE LIMITED | 1.20 | -1.69 | 10.00 | 560750 |

MINING AND OIL – M.CAP. BETWEEN 50M AND 200M

| STOCK NAME | YIELD | EF.TAX | PRICE | M.CAP (1000) |
|---|---|---|---|---|
| COAL & ALLIED INDUSTRIES LIMITED | 7.23 | 40.04 | 4.15 | 130878 |
| WESTERN AUSTRALIAN DIAMOND TRUST | 6.83 | 0.00 | 1.40 | 91000 |
| CONSOLIDATED RUTILE LIMITED | 3.93 | 45.46 | 7.00 | 143448 |
| CUDGEN R.Z. LIMITED | 3.55 | 43.60 | 6.20 | 77500 |
| WESTRALIAN SANDS LIMITED | 2.58 | 41.51 | 3.10 | 122845 |
| GREAT VICTORIA GOLD LIMITED | 2.17 | 0.00 | 2.30 | 195008 |
| COSTAIN AUSTRALIA LIMITED | 1.96 | 31.74 | 2.80 | 105944 |
| SOUTHERN GOLDFIELDS LIMITED | 0.43 | 0.00 | 0.65 | 64683 |

MINING AND OIL – M. CAP LESS THAN 50M

| STOCK NAME | YIELD | EF.TAX | PRICE | M.CAP (1000) |
|---|---|---|---|---|
| MARY KATHLEEN URANIUM | 15.00 | 0.00 | 0.20 | 14778 |
| AUSTRALIAN MINING INVESTMENTS LIMITED | 6.67 | 0.00 | 0.82 | 46369 |
| AUSTEN & BUTTA LIMITED | 3.33 | 63.20 | 0.75 | 24066 |
| PACIFIC MINING LIMITED | 1.50 | 0.00 | 0.50 | 7242 |

INDUSTRIAL STOCKS – M.CAP. > 200M

| STOCK NAME | YIELD | EF.TAX | PRICE | M.CAP (1000) |
|---|---|---|---|---|
| MIRAGE RESORTS TRUST | 10.87 | 0.00 | 2.30 | 207287 |
| WESTFIELD TRUST | 7.76 | 0.00 | 2.00 | 811758 |
| STOCKLAND TRUST | 7.30 | 0.00 | 2.15 | 452751 |
| GENERAL PROPERTY TURST | 7.07 | 0.00 | 3.05 | 1194502 |
| PETERSVILLE SLEIGH LIMITED | 6.52 | 33.12 | 2.30 | 335034 |
| WORMWALD INTERNATIONAL LIMITED | 5.94 | 16.84 | 3.30 | 443428 |
| TOOTH & CO LIMITED | 5.85 | 28.61 | 8.20 | 479427 |
| WESTPAC BANKING CORPORATION | 5.82 | 40.09 | 4.98 | 2847225 |
| TUBEMAKERS OF AUSTRALIA LIMITED | 5.43 | 44.19 | 2.30 | 294400 |
| NATIONAL AUSTRALIA BANK LIMITED | 5.23 | 39.15 | 5.54 | 2471145 |
| AUSTRALIA & NEW ZEALAND BANKING GROUP LIMITED | 5.08 | 42.37 | 8.10 | 2803231 |
| HUMES LIMITED | 4.91 | 44.78 | 2.65 | 440573 |
| SUNSHINE AUSTRALIA LIMITED | 4.90 | 4.31 | 2.49 | 260437 |
| WOOLWORTHS LIMITED | 4.88 | 40.08 | 3.37 | 809093 |
| JAMES HARDIE INDUSTRIES LIMITED | 4.84 | 34.31 | 4.55 | 813253 |

INDUSTRIAL STOCKS – M.CAP. BETWEEN 50M AND 200M

| STOCK NAME | YIELD | EF.TAX | PRICE | M.CAP (1000) |
|---|---|---|---|---|
| CHAMBERLAIN HOLDINGS LIMITED | 16.87 | 0.07 | 0.24 | 72885 |
| LEIGHTON HOLDINGS LIMITED | 14.12 | 12.06 | 0.65 | 100629 |
| QUEENSLAND INVESTMENT TRUST | 12.03 | 0.00 | 0.96 | 58583 |
| PENNANT PROPERTY TRUST | 11.41 | 0.00 | 0.93 | 59287 |
| CITY MUTUAL PROPERTY TRUST | 11.05 | 0.00 | 2.06 | 56207 |
| AUSTORE PROPERTY TRUST | 10.89 | 0.00 | 0.75 | 71755 |
| HOOKER PROPERTY TRUST | 10.16 | 0.00 | 0.94 | 93913 |
| NATIONAL MUTUAL PROPERTY TRUST | 8.33 | 0.00 | 1.16 | 147508 |
| THORN EMI (AUSTRALIA) LIMITED | 7.50 | 40.76 | 2.00 | 83530 |
| HASTINGS DEERING FINANCE AND INVESTMENT CO. LTD | 7.23 | 0.00 | 1.10 | 98887 |
| GROUP PROPERTY SERVICES LIMITED | 6.90 | 45.72 | 2.50 | 52363 |
| MACMAHON HOLDINGS LIMITED | 8.62 | 3.97 | 1.10 | 85560 |
| CAPITAL PROPERTY TRUST | 6.33 | 0.00 | 2.25 | 62233 |
| A F L HOLDINGS LIMITED | 5.99 | 55.60 | 1.87 | 175505 |
| MITSUBISHI MOTORS AUSTRALIA LIMITED | 5.95 | 1.93 | 2.10 | 124797 |

INDUSTRIAL STOCKS – M. CAP LESS THAN 50M

| STOCK NAME | YIELD | EF.TAX | PRICE | M.CAP (1000) |
|---|---|---|---|---|
| SEGENHOE LIMITED | 90.94 | 45.32 | 0.77 | 41907 |
| QUEENSLAND MERCHANT HOLDINGS LIMITED | 26.92 | 0.00 | 0.13 | 10678 |
| ABATC PACIFIC INDUSTRIES LIMITED | 16.87 | 46.70 | 0.90 | 5648 |
| TAG PACIFIC LIMITED | 15.38 | 45.22 | 0.60 | 18000 |
| J & B RECORDS LIMITED | 13.08 | 47.55 | 0.65 | 7475 |
| CANBERRA COMMERCIAL PROPERTY TRUST | 12.77 | 0.00 | 1.00 | 2430 |
| ADELAIDE PROPERTY TRUST | 12.38 | 0.00 | 0.87 | 420 |
| EQUITABLE PROPERTY TRUST | 12.02 | 0.00 | 1.90 | 27669 |
| COMREALTY PROPERTY TRUST | 11.82 | 0.00 | 0.85 | 19252 |
| ABGROUP LIMITED | 11.38 | 0.00 | 0.22 | 13873 |
| MCNAMARA PROPERTY TRUST | 11.28 | 0.00 | 1.10 | 11440 |
| STIRLING PROPERTY TRUST | 11.05 | 0.00 | 0.95 | 38418 |
| IEL PROPERTY TRUST, THE | 11.03 | 0.00 | 1.00 | 31200 |
| COLLY FARMS COTTON LIMITED | 10.53 | 0.09 | 0.95 | 27500 |
| PAYNTER DIXON HOLDINGS LIMITED | 10.23 | 41.78 | 0.75 | 22312 |

FIGURE 5A  BEST PERFORMING STOCKS OVER LAST WEEK  11.5.87

MINING AND OIL - M.CAP. > 200M

| STOCK NAME | % RISE | PRICE | M.CAP($000) |
|---|---|---|---|
| PELSART RESOURCES N.L. | 36.84 | 1.10 | 311545 |
| HARTOGEN ENERGY LIMITED | 32.31 | 4.30 | 339188 |
| AUSTRALIAN OIL AND GAS CORPORATION LIMITED | 25.58 | 2.70 | 512730 |
| BRIDGE OIL LIMITED | 19.23 | 1.55 | 510351 |
| WESTERN MINING CORPORATION HOLDINGS LIMITED | 17.72 | 7.84 | 5094534 |
| M.I.M. HOLDINGS LIMITED | 17.38 | 3.85 | 2508598 |
| BOUGAINVILLE COPPER LIMITED | 18.28 | 5.00 | 2005315 |
| CRUSADER LIMITED | 18.07 | 3.25 | 307146 |
| AUSTWHIM RESOURCES N.L. | 16.00 | 2.90 | 241579 |
| COMALCO LIMITED | 13.70 | 3.30 | 1850023 |
| BROKEN HILL PROPRIETARY COMPANY LIMITED, THE | 12.58 | 10.20 | 15542844 |
| CENTAUR MINING & EXPLORATION LIMITED | 12.50 | 2.70 | 259414 |
| AUSTRALIAN DEVELOPMENT LIMITED | 12.07 | 8.50 | 251550 |
| BELL RESOURCES LIMITED | 11.94 | 6.00 | 3487622 |
| METALS EXPLORATION LIMITED | 11.76 | 1.90 | 259405 |

MINING AND OIL - M.CAP. BETWEEN 50M AND 200M

| STOCK NAME | % RISE | PRICE | M.CAP($000) |
|---|---|---|---|
| BRUCE RESOURCES N.L. | 177.78 | 1.25 | 62500 |
| GOLDEN VALLEY MINES N.L. | 71.43 | 1.20 | 62873 |
| CONSOLIDATED PETROLEUM AUSTRALIA N.L. | 64.71 | 0.56 | 54144 |
| GREENBUSHES TIN LIMITED | 52.94 | 1.30 | 78557 |
| PHOENIX OIL & GAS N L | 47.83 | 1.70 | 71410 |
| COOPERS RESOURCES NO LIABILITY | 47.27 | 8.10 | 121795 |
| AZTEC EXPLORATION LIMITED | 45.03 | 1.05 | 103950 |
| NORTHERN QUEENSLAND COMPANY LIMITED; THE | 37.93 | 0.00 | 104218 |
| MAGELLAN PETROLEUM AUSTRALIA LIMITED | 33.93 | 3.75 | 114540 |
| PETRO ENERGY LIMITED | 33.33 | 0.16 | 51930 |
| WINTON OIL N L | 33.33 | 0.28 | 64629 |
| AUSTPAC GOLD N L | 31.76 | 1.12 | 95230 |
| GENOA OIL N.L. | 31.43 | 4.90 | 149060 |
| ASTRO MINING N L | 27.27 | 2.00 | 102200 |
| BARCOO PETROLEUM N L | 26.67 | 0.57 | 62757 |

MINING AND OIL - M. CAP LESS THAN 50M

| STOCK NAME | % RISE | PRICE | M.CAP($000) |
|---|---|---|---|
| VULTAN MINERALS LIMITED | 122.22 | 0.00 | 19627 |
| MONARCH RESOURCES N.L. | 100.00 | 0.18 | 21615 |
| AUSTRALIAN OVERSEAS MINING LIMITED | 78.95 | 0.68 | 16940 |
| GREAT AUSTRALIA RESOURCES N L | 77.78 | 0.80 | 14507 |
| ZAPOPAN N L | 66.67 | 1.00 | 11260 |
| PAN PACIFIC PETROLEUM N.L. | 63.64 | 0.18 | 22757 |
| GREENVALE MINING N.L. | 60.00 | 0.40 | 6547 |
| STIRLING PETROLEUM N.L. | 60.00 | 0.00 | 13237 |
| COOLGARDIE GOLD N.L. | 50.00 | 1.05 | 35200 |
| BURMINE LIMITED | 48.84 | 8.40 | 35382 |
| DENISON RESOURCES N.L. | 46.55 | 0.85 | 36513 |
| CENTRAL MURCHISON GOLD LIMITED | 46.15 | 0.19 | 11292 |
| NORTHEASTERN COLD MINES | 42.86 | 0.40 | 11780 |
| SYDNEY OIL COMPANY LIMITED | 41.67 | 0.34 | 9668 |
| SOLOMON PACIFIC RESOURCES N.L. | 41.67 | 0.68 | 17000 |

INDUSTRIAL STOCKS - M.CAP. > 200M

| STOCK NAME | % RISE | PRICE | M.CAP($000) |
|---|---|---|---|
| TIMBER HOLDINGS LIMITED | 100.00 | 7.80 | 201895 |
| AIRSHIP INDUSTRIES LIMITED | 72.41 | 1.00 | 254178 |
| JONES (ROBERTS) INVESTMENTS LIMITED | 18.87 | 1.75 | 574792 |
| TUBEMAKERS OF AUSTRALIA LIMITED | 9.52 | 2.30 | 291400 |
| KERN CORPORATION LIMITED | 9.09 | 2.40 | 315792 |
| LINTER GROUP LIMITED | 9.09 | 7.20 | 299494 |
| S.A. BREWING HOLDINGS LIMITED | 8.19 | 3.70 | 884718 |
| THOMAS NATIONWIDE TRANSPORT LIMITED | 7.95 | 4.75 | 2084808 |
| AUSTRALIAN GAS LIGHT COMPANY; THE | 7.23 | 8.80 | 574693 |
| BOND CORPORATION HOLDINGS LIMITED | 6.82 | 2.78 | 979947 |
| AMPOL LIMITED | 6.45 | 3.30 | 853658 |
| BORG-WARNER (AUSTRALIA) LIMITED | 6.38 | 5.00 | 202215 |
| BORAL LIMITED | 6.19 | 4.80 | 2647894 |
| HUMES LIMITED | 6.00 | 2.85 | 440573 |
| WESTPAC BANKING CORPORATION | 5.96 | 4.98 | 2647225 |

INDUSTRIAL STOCKS - M.CAP. BETWEEN 50M AND 200M

| STOCK NAME | % RISE | PRICE | M.CAP($000) |
|---|---|---|---|
| PALMER TUBE MILLS LIMITED | 28.57 | 1.35 | 108540 |
| PENNANT PROPERTIES LIMITED | 21.79 | 0.85 | 61750 |
| WESCO LIMITED | 15.79 | 1.10 | 102134 |
| BETATENE LIMITED | 14.29 | 8.00 | 91080 |
| LATEC INVESTMENTS LIMITED | 12.50 | 0.27 | 109239 |
| MCILWRAITH MCEACHARN LIMITED | 11.11 | 5.00 | 147850 |
| STEAMSHIPS TRADING COMPANY LIMITED | 11.11 | 3.00 | 93024 |
| TTL CORPORATION LIMITED | 10.53 | 3.15 | 108500 |
| FIRST NATIONAL RESOURCE TRUST | 10.53 | 1.05 | 105000 |
| ATKINS CARLYLE LIMITED | 10.01 | 3.10 | 54107 |
| BURSWOOD PROPERTY TRUST | 10.00 | 0.44 | 177553 |
| TELEVISION WOLLONGONG TRANSMISSION LIMITED | 9.88 | 1.70 | 97920 |
| GILTNET LIMITED | 9.88 | 1.70 | 85000 |
| EUROLYNX LIMITED | 9.09 | 8.00 | 80350 |
| MONTORO RESOURCES LIMITED | 8.33 | 0.65 | 61091 |

INDUSTRIAL STOCKS - M. CAP LESS THAN 50M

| STOCK NAME | % RISE | PRICE | M.CAP($000) |
|---|---|---|---|
| AUSTMARK INTERNATIONAL LIMITED | 288.89 | 0.70 | 47250 |
| ALEXANDERS SECURITIES LIMITED | 275.00 | 0.75 | 4479 |
| HANS HUNKIN LIMITED | 81.82 | 4.00 | 2400 |
| GOLDMIN INVESTMENTS LIMITED | 68.42 | 0.32 | 4800 |
| DYLUP PLANTATIONS LIMITED | 46.67 | 1.10 | 19520 |
| NORTHERN ENERGY LIMITED | 37.50 | 1.10 | 9350 |
| CARPENTER INVESTMENT TRADING COMPANY LIMITED | 36.84 | 1.30 | 27890 |
| VIKING INDUSTRIES LIMITED | 36.36 | 0.60 | 26884 |
| FINANCE AND DEVELOPMENT LIMITED | 35.71 | 0.95 | 7742 |
| ASIATIC PACIFIC INDUSTRIES LIMITED | 33.33 | 0.60 | 5848 |
| KOM LIMITED | 33.33 | 0.36 | 22122 |
| ASSOCIATED ELECTRONIC SERVICES LIMITED | 33.33 | 0.24 | 2918 |
| NATIONAL DRAFTING INDUSTRIES LIMITED | 33.33 | 0.60 | 5926 |
| UNITED & COMMERCIAL HOLDINGS LIMITED | 29.63 | 0.35 | 21035 |
| INDUSTRIAL INVESTMENT CORPORATION | | | 255414 |
| HARTOGEN ENERGY LIMITED | 44.90 | 4.30 | 339158 |
| ANGLO AMERICAN PACIFIC LIMITED | 43.87 | 3.05 | 374753 |
| C.R.A. LIMITED | 43.04 | 11.30 | 6284853 |
| ELDERS RESOURCES LIMITED | 40.82 | 3.95 | 1140254 |
| ABERFOYLE LIMITED | 39.97 | 5.60 | 379534 |
| OIL SEARCH LIMITED | 38.10 | 1.45 | 277364 |
| GOLD MINES OF KALGOORLIE LIMITED | 35.99 | 10.00 | 560750 |

FIGURE 5B                       WORST PERFORMING STOCKS FOR LAST WEEK                                       11.5.87

MINING AND OIL - M.CAP. > 200M

| STOCK NAME | FALL | PRICE | M.CAP(1000) |
|---|---|---|---|
| CITY RESOURCES LIMITED | 7.27 | 2.55 | 291325 |
| ANGLO AMERICAN PACIFIC LIMITED | 6.15 | 3.05 | 314753 |
| HILL 50 GOLD MINE N.L. | 5.56 | 1.70 | 233750 |
| SONS OF GWALIA N.L. | 4.81 | 14.50 | 426228 |
| BARRACK MINES LIMITED | 4.00 | 4.60 | 307157 |
| AUSTRALIAN CONSOLIDATED MINERALS LIMITED | 3.95 | 7.30 | 793992 |
| AMPOL EXPLORATION LIMITED | 3.57 | 5.40 | 507519 |
| OIL SEARCH LIMITED | 3.33 | 1.45 | 277394 |
| CENTRAL NORSEMAN GOLD CORPORATION | 3.23 | 3.00 | 824000 |
| C S R LIMITED | 3.04 | 3.83 | 253426 |
| BHP GOLD MINES LIMITED | 2.78 | 1.75 | 1897500 |
| HOWARD SMITH LIMITED | 0.00 | 4.75 | 466310 |
| GOLD MINES OF KALGOORLIE LIMITED | 0.00 | 10.00 | 560750 |
| DOMINION MINING & OIL N.L. | 0.00 | 2.70 | 220888 |
| FORSAYTH N.L. | 0.00 | 7.00 | 470981 |

MINING AND OIL-M.CAP. BETWEEN 50M AND 200M

| STOCK NAME | FALL | PRICE | M.CAP(1000) |
|---|---|---|---|
| CONSOLIDATED EQUITY AND FINANCE CORPORATION LTD | 19.15 | 3.80 | 109678 |
| AUGOLD N.L. | 16.28 | 1.80 | 56310 |
| SPARGOS EXPLORATION N.L. | 15.97 | 1.00 | 110837 |
| ENTERPRISE GOLD MINES N.L. | 15.52 | 2.45 | 98992 |
| WALHALLA MINING COMPANY N.L. | 12.12 | 0.29 | 65893 |
| GRANTS PATCH MINING | 11.36 | 0.78 | 85830 |
| GOLDEN DEEPS LIMITED | 10.49 | 1.45 | 90223 |
| GREAT FINGALL MINING COMPANY N.L. | 9.33 | 0.68 | 53218 |
| MONTAGUE GOLD N.L. | 9.09 | 0.50 | 82358 |
| CENTRAL PACIFIC MINERALS N.L. | 9.09 | 1.00 | 105204 |
| ACORN SECURITIES LIMITED | 8.67 | 1.82 | 71073 |
| TRIAD MINERALS | 5.41 | 3.50 | 105105 |
| NORTH QUEENSLAND RESOURCES N.L. | 5.26 | 1.80 | 55678 |
| NORMANDY RESOURCES N.L. | 4.76 | 3.00 | 136597 |
| COAL & ALLIED INDUSTRIES LIMITED | 3.49 | 4.15 | 130879 |

MINING AND OIL-M. CAP LESS THAN 50M

| STOCK NAME | FALL | PRICE | M.CAP(1000) |
|---|---|---|---|
| BAMBOO CREEK HOLDINGS LIMITED | 31.25 | 0.55 | 5482 |
| ORESEARCH N.L. | 25.71 | 2.00 | 8746 |
| NEW HOLLAND MINING N.L. | 23.08 | 1.00 | 20845 |
| PLENTY RIVER MINING COMPANY N.L. | 22.58 | 0.24 | 33139 |
| ASSOCIATED GOLD FIELDS N.L. | 20.83 | 0.19 | 12893 |
| EURALBA MINING LIMITED | 19.57 | 0.37 | 14693 |
| INTERMIN RESOURCE CORPORATION LIMITED | 18.92 | 0.30 | 17891 |
| GOLD COPPER EXPLORATION LIMITED | 17.50 | 0.33 | 13695 |
| KALBARA MINING N.L. | 17.33 | 0.82 | 22270 |
| SAMSON EXPLORATION N.L. | 14.89 | 0.57 | 41755 |
| WESTERN REEFS LIMITED | 14.89 | 0.40 | 20844 |
| AUROTECH N.L. | 13.79 | 0.25 | 13695 |
| NORTHLAND MINERALS LIMITED | 13.04 | 2.00 | 18800 |
| MINERALS MINING & METALLURGY LIMITED | 12.50 | 2.10 | 20712 |
| PERMAIN PETROLEUM CORPORATION LIMITED | 11.76 | 0.75 | 24750 |

INDUSTRIAL STOCKS-M.CAP. > 200M

| STOCK NAME | FALL | PRICE | M.CAP(1000) |
|---|---|---|---|
| AUSTRALIA WIDE INDUSTRIES LIMITED | 10.00 | 2.25 | 206971 |
| WASTE MANAGEMENT INCORPORATED | 9.09 | 50.00 | 10376700 |
| TOOTH & CO LIMITED | 8.82 | 8.20 | 479427 |
| ADELAIDE STEAMSHIP COMPANY LIMITED, THE | 8.90 | 8.10 | 1207273 |
| ADELAIDE BRIGHTON CEMENT HOLDINGS LIMITED | 6.38 | 2.20 | 272228 |
| CLAYTON ROBARD LIMITED | 6.00 | 4.70 | 315017 |
| ACMEX HOLDINGS LIMITED | 4.41 | 6.50 | 223412 |
| INTERNATIONAL INCOME PROPERTY INC. | 4.35 | 22.00 | 248345 |
| APP INVESTMENT CORPORATION LIMITED | 4.17 | 2.30 | 1069171 |
| ROTHMANS OF PALL MALL (AUSTRALIA) LIMITED | 4.17 | 6.80 | 672274 |
| MONIER LIMITED | 4.05 | 3.55 | 554767 |
| WESTFIELD TRUST | 3.65 | 2.00 | 811756 |
| SARICH TECHNOLOGIES TRUST | 3.03 | 3.20 | 560000 |
| BURNS; PHILP & COMPANY LIMITED | 2.66 | 10.20 | 653383 |
| WOOLWORTHS LIMITED | 2.32 | 3.37 | 809093 |

INDUSTRIAL STOCKS-M.CAP. BETWEEN 50M AND 200M

| STOCK NAME | FALL | PRICE | M.CAP(1000) |
|---|---|---|---|
| WATTYL LIMITED | 28.09 | 3.38 | 104523 |
| A.P.A. HOLDINGS LIMITED | 28.57 | 1.10 | 135041 |
| ENACON LIMITED | 23.47 | 0.75 | 63704 |
| UNIVERSAL TELECASTERS LIMITED | 15.97 | 2.00 | 127510 |
| SPOTLESS GROUP LIMITED | 15.53 | 1.35 | 133167 |
| NATIONAL CAN INDUSTRIES LIMITED | 15.00 | 1.70 | 78625 |
| HANIMEX CORPORATION LIMITED | 14.81 | 1.15 | 79828 |
| DIRECT ACCEPTANCE CORPORATION LIMITED | 14.29 | 0.90 | 52094 |
| HASTINGS DEERING FINANCE AND INVESTMENT CO LTD | 12.00 | 1.10 | 88887 |
| LUMLEY CORPORATION LIMITED | 11.18 | 3.00 | 189981 |
| PLUMROSE (AUSTRALIA) LIMITED | 10.64 | 4.20 | 63197 |
| HOSPITALS OF AUSTRALIA | 9.34 | 1.85 | 67878 |
| GIBSON CHEMICAL INDUSTRIES LIMITED | 9.09 | 4.00 | 88818 |
| OAKMINSTER HOLDINGS LIMITED | 9.09 | 1.00 | 67500 |
| CEREUS AUSTRALIA LIMITED | 8.89 | 4.10 | 60008 |

INDUSTRIAL STOCKS-M. CAP LESS THAN 50M

| STOCK NAME | FALL | PRICE | M.CAP(1000) |
|---|---|---|---|
| TECHNOLOGY DEVELOPMENT CAPITAL TRUST | 77.00 | 0.23 | 1533 |
| AUSTRALIAN VENTURE CAPITAL LIMITED | 70.00 | 0.60 | 12395 |
| BRAEMAR LIMITED | 50.00 | 0.25 | 4060 |
| GIBSONS LIMITED | 44.12 | 1.90 | 6502 |
| THOMPSONLAND LIMITED | 33.33 | 2.00 | 18410 |
| POVEY CORPORATION LIMITED | 32.69 | 0.35 | 19446 |
| H.M.A LIMITED | 32.61 | 1.55 | 30002 |
| AUSTRALIAN COTTON MANUFACTURING COMPANY LIMITED | 30.77 | 4.50 | 1827 |
| UNITY CORPORATION LIMITED | 28.57 | 1.00 | 27945 |
| ALLEN COMMUNICATION LIMITED | 22.22 | 0.70 | 20440 |
| AUSADATA LIMITED | 21.87 | 0.25 | 5845 |
| EASTERN RESOURCES OF AUSTRALIA LIMITED | 20.00 | 0.12 | 5656 |
| UNI-POWER INTERNATIONAL HOLDINGS LIMITED | 20.00 | 0.30 | 10040 |
| SOUTHERN PACIFIC LEISURE LIMITED | 20.00 | 0.40 | 2030 |
| INDOOR CRICKET ARENAS (1985) LIMITED | 18.18 | 0.18 | 1599 |

FIGURE 6    HIGH VOLUME STOCKS - TRADED LAST WEEK    17.7.87

INDUSTRIAL STOCKS - M.CAP > 200M

| STOCK NAME | VOLUME INDEX | PRICE | M.CAP (MILL) |
|---|---|---|---|
| EMAIL LIMITED | 48.27 | 2.90 | 503 |
| HELM CORPORATION | 12.26 | 8.00 | 292 |
| ACMEX HOLDINGS LIMITED | 9.93 | 6.00 | 207 |
| CHASE CORPORATION LIMITED | 8.29 | 3.20 | 1452 |
| GEORGE WESTON FOODS LIMITED | 5.28 | 4.20 | 277 |
| BORAL LIMITED | 4.92 | 5.52 | 3081 |
| CLAYTON ROBARD LIMITED | 4.53 | 8.40 | 435 |
| SCHRODER PROPERTY FINANCE | 4.49 | 3.45 | 540 |
| QUATRO LIMITED | 4.11 | 1.70 | 487 |
| WESTPAC BANKING CORPORATION | 3.14 | 5.46 | 3122 |
| WESFARMERS LIMITED | 3.01 | 4.00 | 285 |
| BRIERLEY INVESTMENTS LIMITED | 2.76 | 3.63 | 4046 |
| QUEENSLAND CEMENT & LIME COMPANY LIMITED; THE | 2.64 | 3.80 | 272 |
| AFP INVESTMENT CORPORATION LIMITED | 2.58 | 2.95 | 1411 |
| T N T LIMITED | 2.54 | 5.18 | 2610 |

INDUSTRIAL STOCKS - M.CAP. BETWEEN 50M AND 200M

| STOCK NAME | VOLUME INDEX | PRICE | M.CAP (MILL) |
|---|---|---|---|
| KINGSGATE INTERNATIONAL CORPORATION LIMITED | 31.84 | 0.45 | 115 |
| DARRELL JAMES LIMITED | 30.43 | 4.30 | 52 |
| METRO INDUSTRIES LIMITED | 16.01 | 2.05 | 63 |
| ABBOTT HOLDINGS LIMITED | 15.75 | 1.75 | 79 |
| COCKBURN CEMENT LIMITED | 10.48 | 1.75 | 52 |
| CHUAN HUP AUSTRALIA LIMITED | 10.03 | 1.99 | 126 |
| INTER-PACIFIC EQUITY LIMITED | 8.59 | 3.05 | 150 |
| BOTENA INVESTMENTS LIMITED | 8.14 | 4.15 | 149 |
| B.T. INSURANCE HOLDINGS LIMITED | 8.02 | 0.32 | 71 |
| FORTUNA CORPORATION LIMITED | 7.84 | 2.80 | 78 |
| WASHINGTON H.SOUL PATTINSON AND COMPANY | 6.34 | 13.00 | 166 |
| LATEC INVESTMENTS LIMITED | 5.44 | 0.30 | 121 |
| MONTORO RESOURCES LIMITED | 4.78 | 0.78 | 71 |
| OVERSEAS STRATEGIC HOLDINGS LIMITED | 4.74 | 1.90 | 79 |
| PENNANT HOLDINGS LIMITED | 4.21 | 3.45 | 169 |

INDUSTRIAL STOCKS - M. CAP LESS THAN 50M

| STOCK NAME | VOLUME INDEX | PRICE | M.CAP (MILL) |
|---|---|---|---|
| SOLANDER HOLDINGS LIMITED | 56.51 | 1.20 | 12 |
| REDWEAVER INVESTMENTS LIMITED | 55.64 | 1.85 | 7 |
| RIA INTERNATIONAL LIMITED | 49.66 | 1.00 | 14 |
| WOODMASONS LIMITED | 38.41 | 6.30 | 23 |
| TRANS-PACIFIC FINANCE CORPORATION LIMITED | 27.02 | 2.30 | 28 |
| GIBSONS LIMITED | 23.16 | 1.95 | 7 |
| NATIONAL DRAFTING INDUSTRIES LIMITED | 21.03 | 0.40 | 4 |
| AMERICAN CORPORATE LIMITED | 20.42 | 0.55 | 37 |
| DELTA WEST LIMITED | 17.66 | 2.40 | 18 |
| BASE EQUITY LIMITED | 16.78 | 0.45 | 2 |
| JOYCE CORPORATION LIMITED | 16.01 | 1.95 | 10 |
| DENHAM BROS. LIMITED | 14.88 | 2.16 | 11 |
| CHARTERHALL AUSTRALIA LIMITED | 14.33 | 0.33 | 24 |
| NEWHAVEN PARK STUD LIMITED | 13.55 | 0.30 | 17 |
| NORTH MELBOURNE FOOTBALL CLUB LIMITED | 13.24 | 1.15 | 5 |

MINING AND OIL - M.CAP > 200M

| STOCK NAME | VOLUME INDEX | PRICE | M.CAP (MILL) |
|---|---|---|---|
| BELL RESOURCES LIMITED | 20.70 | 5.28 | 3504 |
| HILL 50 GOLD MINE N.L | 7.08 | 2.50 | 344 |
| ALCAN AUSTRALIAN LIMITED | 6.70 | 1.55 | 269 |
| ANGLO AMERICAN PACIFIC LIMITED | 3.86 | 2.35 | 269 |
| BARRACK MINES LIMITED | 3.45 | 4.50 | 269 |
| NORTH KALGURLI MINES LIMITED | 3.11 | 1.83 | 798 |
| CONSOLIDATED EXPLORATION LIMITED | 3.10 | 8.40 | 629 |
| GIANT RESOURCES LIMITED | 2.97 | 3.30 | 1032 |
| PARINGA MINING AND EXPLORATION COMPANY P.L.C | 2.93 | 5.70 | 221 |
| DOMINION MINING & OIL N.L | 2.87 | 2.80 | 225 |
| OIL SEARCH LIMITED | 2.37 | 2.05 | 392 |
| ELDERS RESOURCES LIMITED | 2.29 | 3.70 | 1068 |
| ABERFOYLE LIMITED | 2.20 | 6.90 | 473 |
| BRIDGE OIL LIMITED | 2.06 | 1.90 | 626 |
| PEKO OIL LIMITED | 1.69 | 1.75 | 436 |

MINING AND OIL - M.CAP. BETWEEN 50M AND 200M

| STOCK NAME | VOLUME INDEX | PRICE | M.CAP (MILL) |
|---|---|---|---|
| WALHALLA MINING COMPANY N.L | 7.73 | 2.50 | 78 |
| ACORN SECURITIES LIMITED | 7.61 | 2.68 | 105 |
| MUSELLBROOK ENERGY AND MINERALS LIMITED | 7.25 | 1.45 | 124 |
| STRATEGIC MINERALS CORPORATION N.L. | 6.58 | 2.75 | 103 |
| SQUARE GOLD & MINERALS LIMITED | 4.78 | 0.77 | 88 |
| NORMANDY RESOURCES N.L. | 4.77 | 3.70 | 173 |
| EASTMET LIMITED | 4.73 | 2.70 | 135 |
| TRIAD MINERALS | 4.63 | 3.15 | 95 |
| GREAT FINGALL MINING COMPANY N.L | 4.14 | 0.73 | 82 |
| JINGELLIC MINERALS N.L | 3.96 | 1.45 | 103 |
| DEVEX LIMITED | 3.56 | 1.48 | 127 |
| CONSOLIDATED RUTILE LIMITED | 3.39 | 7.00 | 145 |
| CARR BOYD MINERALS LIMITED | 3.23 | 2.08 | 130 |
| ENTERPRISE GOLD MINES N.L | 3.06 | 1.80 | 145 |
| HOME ENERGY COMPANY LIMITED | 3.05 | 0.65 | 65 |

MINING AND OIL - M. CAP LESS THAN 50M

| STOCK NAME | VOLUME INDEX | PRICE | M.CAP (MILL) |
|---|---|---|---|
| MACQUARIE OIL N.L | 11.43 | 0.70 | 19 |
| ESPERANCE MINERALS N.L | 11.26 | 0.30 | 6 |
| MOUNT PLEASANT GOLD TRUST | 10.41 | 0.50 | 22 |
| AUSTRALIAN CHINA CLAY LIMITED | 10.36 | 0.70 | 12 |
| SOUTHERN GOLDFIELDS LIMITED | 8.54 | 0.45 | 45 |
| PLENTY RIVER MINING COMPANY N.L | 7.54 | 0.34 | 46 |
| BASS STRAIT OIL & GAS (HOLDINGS) N.L | 7.42 | 0.14 | 14 |
| CULTUS GOLD N.L | 6.66 | 0.16 | 9 |
| GOLDRIM MINING AUSTRALIA LIMITED | 6.53 | 0.50 | 2 |
| BALMORAL RESOURCES N.L | 6.39 | 0.52 | 40 |
| JERVOIS SULPHATES (N.T) LIMITED | 6.25 | 0.38 | 36 |
| GONDWANA RESOURCES N.L | 5.74 | 0.55 | 15 |
| MAGNUM RESOURCES LIMITED | 5.44 | 3.80 | 30 |
| GREAT AUSTRALIA RESOURCES N.L | 5.33 | 0.65 | 13 |
| CONSOLIDATED GOLD MINING AREAS NO LIABILITY | 5.14 | 0.30 | 33 |

FIGURE 6A

HIGH VOLUMES STOCKS - LAST WEEK                                                          10.7.87

INDUSTRIAL STOCKS - M.CAP > 200M

| STOCK NAME | VOLUME INDEX | PRICE | M.CAP (MILL) |
|---|---|---|---|
| BONDS COATS PATONS LIMITED | 22.34 | 6.30 | 243 |
| MCPHERSON'S LIMITED | 13.52 | 1.55 | 206 |
| GEORGE WESTON FOODS LIMITED | 11.76 | 4.00 | 284 |
| BORAL LIMITED | 7.71 | 5.32 | 2850 |
| TNT LIMITED | 6.09 | 5.18 | 2607 |
| NORTHERN STAR HOLDINGS LIMITED | 5.76 | 2.45 | 568 |
| WATTIE INDUSTRIES LIMITED | 4.66 | 4.50 | 1205 |
| MONIER LIMITED | 4.51 | 4.15 | 849 |
| WESTFIELD TRUST | 4.31 | 2.20 | 673 |
| SOFTWOOD HOLDINGS LIMITED | 4.20 | 2.35 | 240 |
| LEND LEASE CORPORATION LIMITED | 4.16 | 16.40 | 2114 |
| WESFARMERS LIMITED | 4.08 | 4.00 | 285 |
| AFP INVESTMENT CORPORATION LIMITED | 3.81 | 2.70 | 1292 |
| ACMEX HOLDINGS LIMITED | 3.28 | 6.30 | 218 |
| FLETCHER CHALLENGE LIMITED | 3.12 | 4.70 | 4048 |

INDUSTRIAL STOCKS - M.CAP. BETWEEN 50M AND 200M

| STOCK NAME | VOLUME INDEX | PRICE | M.CAP (MILL) |
|---|---|---|---|
| METRO INDUSTRIES LIMITED | 257.22 | 2.05 | 63 |
| KINGSGATE INTERNATIONAL CORPORATION LIMITED | 28.36 | 0.40 | 102 |
| AUSTORE PROPERTY TRUST | 12.39 | 0.80 | 102 |
| INTER-PACIFIC EQUITY LIMITED | 8.49 | 2.66 | 147 |
| PRIMAC HOLDINGS LIMITED | 8.43 | 3.10 | 51 |
| AUSTRALIAN OVERSEAS INVESTMENTS LIMITED | 7.54 | 0.58 | 108 |
| CHUAN HUP AUSTRALIA LIMITED | 6.90 | 1.65 | 150 |
| FORTUNA CORPORATION LIMITED | 6.80 | 2.50 | 68 |
| SEA WORLD PROPERTY TURST | 6.60 | 0.75 | 140 |
| GIBSON CHEMICAL INDUSTRIES LIMITED | 6.25 | 4.40 | 65 |
| SOUTHERN ELECTRIC AUTHORITY OF QUEENSLAND | 6.11 | 0.81 | 97 |
| FINE METALS CORPORATION LIMITED | 4.84 | 2.50 | 63 |
| ROTWELLS LIMITED | 4.71 | 3.60 | 108 |
| FINE VALE INVESTMENTS LIMITED | 4.47 | 0.58 | 58 |
| EQUITY FINANCE LIMITED | 4.15 | 1.75 | 68 |

INDUSTRIAL STOCKS - M.CAP LESS THAN 50M

| STOCK NAME | VOLUME INDEX | PRICE | M.CAP (MILL) |
|---|---|---|---|
| FELTEX INTERNATIONAL LIMITED | 566.32 | 2.70 | 2 |
| QUOKKA INVESTMENTS LIMITED | 28.83 | 0.22 | 3 |
| ALTRACE LIMITED | 17.66 | 1.50 | 41 |
| WESTRALIAN FOREST INDUSTRIES LIMITED | 14.74 | 2.85 | 44 |
| MULTI TRANSPORT HOLDINGS LIMITED | 14.23 | 0.50 | 3 |
| STRAND HOLDINGS LIMITED | 12.34 | 0.90 | 36 |
| JOYCE CORPORATION LIMITED | 12.15 | 1.95 | 10 |
| AUSTRAL GROUP LIMITED | 11.78 | 1.25 | 28 |
| OLIMS CONSOLIDATED LIMITED | 11.42 | 1.65 | 11 |
| HILLS INDUSTRIES LIMITED | 10.69 | 2.18 | 40 |
| AUSWARD LIMITED | 10.44 | 0.50 | 5 |
| PLASPAK AUSTRALIA LIMITED | 10.31 | 0.40 | 12 |
| VEALLS SECURITIES AND FINANCE LIMITED | 10.10 | 0.45 | 7 |
| DENTRAC INDUSTRIES LIMITED | 9.59 | 0.45 | 3 |
| CHERRY LANE FASHION GROUP LIMITED | 8.53 | 5.70 | 37 |

MINING AND OIL - M.CAP > 200M

| STOCK NAME | VOLUME INDEX | PRICE | M.CAP (MILL) |
|---|---|---|---|
| CONSOLIDATED EXPLORATION LIMITED | 8.64 | 4.77 | 296 |
| BELL RESOURCES LIMITED | 6.58 | 4.78 | 3098 |
| HILL 50 GOLD MINE N.L. | 4.87 | 2.15 | 298 |
| ALCAN AUSTRALIAN LIMITED | 2.94 | 1.35 | 235 |
| MIM HOLDINGS LIMITED | 2.60 | 2.72 | 2655 |
| PARINGA MINING AND EXPLORATION COMPANY P.L.C | 2.43 | 5.20 | 202 |
| NIUGINI MINING LIMITED | 2.33 | 14.50 | 816 |
| CRA LIMITED | 2.27 | 10.45 | 5812 |
| NORTH FLINDERS MINES LIMITED | 2.20 | 14.50 | 519 |
| DOMINION MINING & OIL N.L. | 2.12 | 2.40 | 201 |
| PAM AUSTRALIA MINING LIMITED | 2.08 | 3.80 | 285 |
| FORSAYTH N.L. | 2.07 | 4.40 | 359 |
| ELDERS RESOURCES LIMITED | 1.91 | 3.20 | 924 |
| COMALCO LIMITED | 1.84 | 3.90 | 2188 |
| ANGLO AMERICAN PACIFIC LIMITED | 1.50 | 1.85 | 227 |

MINING AND OIL - M.CAP. BETWEEN 50M AND 200M

| STOCK NAME | VOLUME INDEX | PRICE | M.CAP (MILL) |
|---|---|---|---|
| ACORN SECURITIES LIMITED | 7.74 | 2.50 | 98 |
| CONSOLIDATED EQUITY AND FINANCE CORPORATION LTD | 5.98 | 3.00 | 87 |
| CUDGEN R.Z. LIMITED | 4.73 | 5.30 | 68 |
| CHASE MINERALS N.L. | 3.82 | 1.50 | 68 |
| INDEPENDENT RESOURCES LIMITED | 3.53 | 10.00 | 107 |
| CONSOLIDATED RUTILE LIMITED | 3.49 | 6.70 | 139 |
| AUSTWHIM RESOURCES N.L. | 3.29 | 2.00 | 183 |
| HOME ENERGY COMPANY LIMITED | 3.27 | 0.65 | 65 |
| STRATEGIC MINERALS CORPORATION N.L | 3.23 | 2.40 | 90 |
| EASTMET LIMITED | 2.56 | 2.40 | 120 |
| MT. CARRINGTON MINES N.L. | 2.43 | 8.10 | 108 |
| ENTERPRISE GOLD MINES N.L | 2.30 | 1.90 | 154 |
| JIMBERLANA MINERALS N.L. | 2.18 | 0.55 | 155 |
| SEDIMENTARY HOLDINGS LIMITED | 2.05 | 1.55 | 79 |
| RAMSGATE RESOURCES LIMITED | 1.92 | 0.90 | 51 |

MINING AND OIL - M. CAP LESS THAN 50M

| STOCK NAME | VOLUME INDEX | PRICE | M.CAP (MILL) |
|---|---|---|---|
| CARBON MINERALS N.L | 21.37 | 0.28 | 7 |
| MACQUARIE OIL N.L. | 21.24 | 0.60 | 19 |
| JERVOIS SULPHATES (N.T) LIMITED | 11.22 | 0.23 | 22 |
| AUSTRALIAN PETROLEUM FUND | 7.16 | 0.42 | 37 |
| SOUTHERN CROSS EXPLORATION N.L. | 8.61 | 0.16 | 8 |
| GREAT AUSTRALIA RESOURCES N.L | 8.37 | 0.60 | 12 |
| WESTRALIAN GOLD MINES LIMITED | 5.99 | 0.25 | 9 |
| STRATA OIL N.L | 5.77 | 0.24 | 15 |
| GOLDEN SHAMROCK MINES LIMITED | 4.70 | 1.45 | 19 |
| MOUNT KERSEY MINING N.L | 4.09 | 1.80 | 39 |
| FALCON AUSYRALIA LIMITED | 3.86 | 0.68 | 43 |
| MOUNT PLEASANT GOLD TRUST | 3.85 | 0.50 | 22 |
| PETROCARB EXPLORATION N.L | 3.67 | 0.15 | 8 |
| MICRON RESOURCES LIMITED | 3.59 | 0.52 | 32 |
| MEEKATHARRA MINERALS LIMITED | 3.52 | 1.45 | 28 |

FIGURE 6B                              HIGH VOLUMES TRADED THIS WEEK                                    19 JUNE 1987

| INDUSTRIALS | | | | MINING & OIL | | | |
|---|---|---|---|---|---|---|---|
| MKT CAP GREATER THAN 200M | | | | MKT CAP GREATER THAN 200M | | | |
| STOCK NAME | VOLUME INDEX | PRICE ($) | MKT CAP ($M) | STOCK NAME | VOLUME INDEX | PRICE ($) | MKT CAP ($M) |
| PIONEER SUGAR MILLS LTD | 35.77 | 2.54 | 304 | BARRACK MINES LTD | 9.49 | 4.10 | 283 |
| BONDS COATS PATONS LTD | 20.01 | 5.84 | 226 | CITY RESOURCES LTD | 7.09 | 2.40 | 274 |
| DAVID JONES LTD | 8.32 | 10.10 | 1054 | HILL 50 GOLD MINE N.L | 6.14 | 1.88 | 231 |
| MONIER LIMITED | 5.41 | 4.15 | 649 | C.S.R LTD | 3.97 | 4.05 | 2679 |
| SOUTHERN FARMERS GROUP LTD | 5.28 | 7.14 | 399 | AZTEC EXPLORATION LTD | 3.55 | 1.70 | 204 |
| MIRAGE RESORTS TRUST | 5.14 | 2.55 | 230 | METALS EXPLORATION LTD | 2.97 | 1.85 | 283 |
| ADELAIDE STEAMSHIP CO.LTD; THE | 4.95 | 8.20 | 1222 | POSEIDON MINING LTD | 2.73 | 5.50 | 600 |
| BRICK & PIPE INDUSTRIES LTD | 4.54 | 3.00 | 201 | NORTH KALGURLI MINES LTD | 2.31 | 1.80 | 697 |
| SUNSHINE AUSTRALIA LTD | 4.21 | 2.55 | 271 | GIANT RESOURCES LTD | 2.19 | 2.80 | 848 |
| LINTER GROUP LTD | 4.15 | 8.10 | 371 | NORTH FLINDERS MINES LTD | 2.07 | 12.00 | 429 |
| HELM CORPORATION | 4.02 | 4.70 | 229 | NIUGINI MINING LTD | 1.92 | 11.50 | 705 |
| KERN CORPORATION LTD | 3.88 | 2.90 | 402 | PARAGON RESOURCES NL | 1.83 | 1.08 | 299 |
| D/S PROPERTIES TRUST | 3.30 | 11.00 | 209 | HARTOGEN ENERGY LTD | 1.67 | 3.40 | 312 |
| BURSWOOD PROPERTY TRUST | 2.81 | 0.59 | 238 | EMPEROR MINES LTD | 1.59 | 8.70 | 293 |
| MAYNE NICKLESS LTD | 2.44 | 4.05 | 790 | SANTOS LTD | 1.52 | 8.82 | 1801 |
| MKT CAP 50M - 200M | | | | MKT CAP 50M - 200M | | | |
| STOCK NAME | VOLUME INDEX | PRICE ($) | MKT CAP ($M) | STOCK NAME | VOLUME INDEX | PRICE ($) | MKT CAP ($M) |
| LATEC INVESTMENTS LTD | 15.63 | 0.31 | 125 | ALCAN AUSTRALIAN LTD | 7.61 | 1.20 | 182 |
| METRO INDUSTRIES LTD | 14.29 | 2.05 | 83 | DOMINION MINING & OIL NL | 5.03 | 2.30 | 193 |
| B.T. INSURANCE HOLDINGS LTD | 12.31 | 1.28 | 82 | CONSOLIDATED EQUITY & FINANCE CORP. | 4.52 | 2.60 | 81 |
| JONRAY HOLDINGS LTD | 8.01 | 1.80 | 98 | JIMBERLANA MINERALS NL | 3.84 | 0.57 | 156 |
| BOTENA INVESTMENTS LTD | 7.48 | 4.40 | 156 | KIA PACIFIC GOLD LTD | 3.38 | 0.53 | 52 |
| KEMTRON LTD | 7.28 | 0.30 | 67 | GOLCONDA MINERALS NL | 3.22 | 1.50 | 111 |
| JOHN HOLLAND HOLDINGS LTD | 7.23 | 2.25 | 167 | ACORN SECURITIES LTD | 2.98 | 2.30 | 90 |
| PARBURY HENTY HOLDINGS LTD | 6.81 | 2.00 | 84 | SOUTHERN PACIFIC PETROLEUM NL | 2.98 | 0.80 | 176 |
| INCOMES GROUP LTD | 6.80 | 3.08 | 51 | SQUARE GOLD & MINERALS LTD | 2.84 | 0.62 | 71 |
| UNIVERSAL WALDECK LTD | 6.52 | 1.38 | 67 | NORMANDY RESOURCES NL | 2.68 | 3.00 | 139 |
| PINE VALE INVESTMENT LTD | 6.49 | 0.58 | 56 | HUNTER RESOURCES LTD | 2.53 | 1.39 | 127 |
| AUSTCORP PROPERTY TRUST | 5.85 | 0.73 | 93 | GRANTS PATCH MINING | 2.41 | 0.60 | 70 |
| MACMAHON HOLDINGS LTD | 5.33 | 0.04 | 76 | GOLDEN VALLEY MINES NL | 2.38 | 0.95 | 60 |
| CHUAN HUP AUSTRALIA LTD | 5.15 | 1.40 | 113 | KALIMANTAN GOLD NL | 2.19 | 0.44 | 61 |
| DEFIANCE MILLS LTD | 5.01 | 2.20 | 67 | ENTERPRISE GOLD MINES NL | 2.16 | 1.75 | 141 |
| MKT CAP LESS THAN 50M | | | | MKT CAP LESS THAN 50M | | | |
| STOCK NAME | VOLUME INDEX | PRICE ($) | MKT CAP ($M) | STOCK NAME | VOLUME INDEX | PRICE ($) | MKT CAP ($M) |
| MULTI TRANSPORT HOLDINGS LIMITED | 62.48 | 0.45 | 2 | MOUNT PLEASANT GOLD TRUST | 86.82 | 0.50 | 22 |
| CONTINENTAL VENTURE CAPITAL LTD | 52.00 | 0.37 | 23 | RAVENSTHORPE MINING & INVESTMENT | 14.09 | 0.48 | 7 |
| ENTERPRISE INVESTMENTS (S.A) LTD | 51.99 | 0.48 | 7 | NEW AUSTRALIAN RESOURCES NL | 13.04 | 2.30 | 32 |
| VANGUARD INSURANCE CO.LTD | 50.60 | 1.00 | 14 | SOUTHERN CROSS EXPLORATION N.L | 10.15 | 0.16 | 6 |
| MILDURA GRAND HOTEL LTD | 38.10 | 8.50 | 9 | WESTERN GULF OIL & MINING LTD | 9.74 | 0.20 | 18 |
| AIR INTERNATIONAL GROUP LTD | 34.01 | 0.57 | 14 | STRATA OIL N.L | 8.28 | 0.20 | 13 |
| CP VENTURES LTD | 33.34 | 1.20 | 41 | KALBARA MINING NL | 6.00 | 0.55 | 20 |
| EQUITABLE PROPERTY TRUST | 28.83 | 1.80 | 31 | MACQUARIE OIL NL | 5.82 | 0.50 | 12 |
| MURCHISON HOLDINGS LTD | 23.71 | 1.20 | 3 | BAMBOO CREEK HOLDINGS LTD | 5.74 | 0.50 | 11 |
| EQUITY FINANCE LTD | 17.78 | 1.15 | 45 | STRAITS OIL AND GAS LTD | 5.06 | 0.17 | 12 |
| MUTINEST CORPORATION LTD | 16.28 | 0.39 | 13 | ESPERANCE MINERALS NL | 4.72 | 0.30 | 9 |
| SNOW WHITE (HOLDINGS) LTD | 14.55 | 0.56 | 5 | KITCHENER MINING NL | 4.57 | 1.10 | 18 |
| FELTEX INTERNATIONAL LTD | 11.46 | 2.60 | 2 | CENTURY METALS AND MINING NL | 4.50 | 0.48 | 21 |
| BABET CORPORATION LTD | 11.44 | 0.63 | 4 | MARY KATHLEEN URANIUM | 4.16 | 0.20 | 15 |
| AUSWARD LTD | 11.37 | 0.45 | 4 | ZAPOPAN NL | 4.13 | 0.90 | 12 |

FIGURE 7

HIGH VOLUME STOCKS - LAST 5 WEEKS                                                     11.7.87

INDUSTRIAL STOCKS - M.CAP > 200M

| STOCK NAME | VOLUME INDEX | PRICE ($) | M.CAP (MILL) |
|---|---|---|---|
| BONDS COATS PATONS LTD | 17.90 | 6.40 | 247 |
| EMAIL LIMITED | 9.63 | 2.90 | 503 |
| PIONEER SUGAR MILLS LIMITED | 6.55 | 2.50 | 299 |
| TOOTH & CO LIMITED | 6.35 | 7.92 | 612 |
| ACMEX HOLDINGS LIMITED | 5.08 | 8.00 | 207 |
| GEORGE WESTON FOODS LIMITED | 3.92 | 4.20 | 277 |
| HELM CORPORATION | 3.74 | 8.00 | 292 |
| BOND CORPORATION HOLDINGS LIMITED | 3.62 | 2.65 | 1121 |
| MONIER LIMITED | 3.49 | 4.15 | 849 |
| SUNSHINE AUSTRALIA LIMITED | 3.23 | 2.65 | 282 |
| F H. FAULDING & COMPANY LIMITED | 3.03 | 5.00 | 218 |
| AFP INVESTMENT CORPORATION LIMITED | 3.03 | 2.95 | 1411 |
| MCPHERSONS LIMITED | 3.01 | 1.50 | 205 |
| BORAL LIMITED | 2.99 | 5.52 | 3081 |
| CINTEX LIMITED | 2.88 | 6.00 | 239 |

INDUSTRIAL STOCKS - M. CAP. BETWEEN 50M AND 200M

| STOCK NAME | VOLUME INDEX | PRICE ($) | M.CAP (MILL) |
|---|---|---|---|
| METRO INDUSTRIES LTD | 60.80 | 2.05 | 83 |
| KINGSGATE INTERNATIONAL CORPORATION LIMITED | 11.92 | 0.45 | 115 |
| MALCO INDUSTRIES LIMITED | 7.42 | 2.20 | 52 |
| EQUITY FINANCE LIMITED | 7.27 | 1.85 | 72 |
| ABBOTT HOLDINGS LIMITED | 6.85 | 1.75 | 79 |
| DARRELL JAMES LIMITED | 6.72 | 4.30 | 52 |
| AUSTORE PROPERTY TRUST | 6.67 | 0.83 | 106 |
| INTER-PACIFIC EQUITY LIMITED | 6.14 | 3.05 | 150 |
| CHUAN HUP AUSTRALIA LTD | 5.78 | 1.59 | 126 |
| ENACON LIMITED | 5.67 | 1.00 | 85 |
| PARBURY HENTY HOLDINGS LIMITED | 5.26 | 2.15 | 101 |
| B T. INSURANCE HOLDINGS LIMITED | 4.98 | 0.32 | 71 |
| SEA WORLD PROPERTY TRUST | 4.80 | 0.70 | 130 |
| RAPTIS GROUP LIMITED | 4.49 | 1.12 | 64 |
| SPOTLESS GROUP LIMITED | 4.34 | 1.40 | 147 |

INDUSTRIAL STOCKS-M. CAP LESS THAN 50M

| STOCK NAME | VOLUME INDEX | PRICE ($) | M.CAP (MILL) |
|---|---|---|---|
| FELTEX INTERNATIONAL LIMITED | 123.33 | 2.60 | 2 |
| AUSTRAL GROUP LIMITED | 27.89 | 1.25 | 28 |
| ENTERPRISE INVESTMENTS (SOUTH AUSTRALIA) LIMITED | 25.55 | 0.44 | 7 |
| REDWEAVER INVESTMENTS LIMITED | 23.92 | 1.85 | 7 |
| STIRLING PROPERTY TRUST | 21.08 | 1.35 | 39 |
| JACK CHIA (AUSTRALIA) LIMITED | 16.50 | 0.23 | 37 |
| JOYCE CORPORATION LIMITED | 15.57 | 1.95 | 10 |
| DENTRAC INDUSTRIES LIMITED | 15.41 | 0.45 | 3 |
| EQUITABLE PROPERTY TURST | 14.66 | 1.80 | 31 |
| ALTRACK LIMITED | 14.15 | 1.50 | 41 |
| SOLANDER HOLDINGS LIMITED | 13.77 | 1.20 | 12 |
| AUTOARC INTERNATIONAL LIMITED | 13.55 | 0.28 | 2 |
| TRANS-PACIFIC FINANCE CORPORATION LIMITED | 10.81 | 2.30 | 26 |
| CONTINENTAL VENTURE CAPITAL LIMITED | 10.43 | 0.28 | 18 |
| RIA INTERNATIONAL LIMITED | 10.16 | 1.00 | 14 |

MINING AND OIL-M. CAP. > 200M

| STOCK NAME | VOLUME INDEX | PRICE ($) | M.CAP (MILL) |
|---|---|---|---|
| BELL RESOURCES LIMITED | 6.08 | 5.25 | 3504 |
| HILL 50 GOLD MINE N L | 5.07 | 2.50 | 344 |
| ANGLO AMERICAN PACIFIC LIMITED | 3.58 | 2.35 | 269 |
| ALCAN AUSTRALIAN LIMITED | 3.35 | 1.55 | 299 |
| BARRACK MINES LIMITED | 2.80 | 4.80 | 266 |
| CITY RESOURCES LIMITED | 2.70 | 1.75 | 275 |
| CONSOLIDATED EXPLORATION LIMITED | 2.48 | 5.40 | 629 |
| DOMINION MINING & OIL N.L. | 2.32 | 2.80 | 235 |
| C S R LIMITED | 2.29 | 3.95 | 2750 |
| QUEENSLAND COAL TRUST | 2.19 | 1.58 | 789 |
| NORTH KALGURLIE MINES LIMITED | 2.16 | 1.83 | 788 |
| C R A LIMITED | 2.13 | 10.50 | 5840 |
| GIANT RESOURCES LIMITED | 2.08 | 3.30 | 1022 |
| METALS EXPLORATION LIMITED | 1.98 | 1.80 | 248 |
| NORTH FLINDERS MINES LIMITED | 1.98 | 14.80 | 530 |

MINING AND OIL-M. CAP. BETWEEN 50M AND 200M

| STOCK NAME | VOLUME INDEX | PRICE ($) | M.CAP (MILL) |
|---|---|---|---|
| ACORN SECURITIES LTD | 5.55 | 2.65 | 105 |
| CONSOLIDATED EQUITY & FINANCE CORPORATION | 4.03 | 3.00 | 87 |
| CONSOLIDATED RUTILE LIMITED | 2.80 | 7.00 | 145 |
| HOME ENERGY COMPANY LIMITED | 2.78 | 0.65 | 65 |
| HELM RESOURCES LIMITED | 2.77 | 1.35 | 70 |
| INDEPENDENT RESOURCES LIMITED | 2.85 | 10.00 | 107 |
| WALHALLA MINING COMPANY N L | 2.50 | 2.50 | 78 |
| NORMANDY RESOURCES NL | 2.40 | 3.70 | 173 |
| TRIAD MINERALS | 2.34 | 3.15 | 95 |
| SQUARE GOLD & MINERALS LIMITED | 2.26 | 0.77 | 88 |
| STRATEGIC MINERALS CORPORATION N.L | 2.23 | 2.75 | 103 |
| JINGELLIC MINERALS N.L | 2.19 | 1.45 | 103 |
| EASTMET LIMITED | 2.12 | 2.70 | 135 |
| IMBERLANA MINERALS N.L | 2.00 | 0.65 | 183 |
| CHASE MINERALS N.L. | 1.88 | 1.40 | 62 |

MINING AND OIL-M.CAP. LESS THAN 50M

| STOCK NAME | VOLUME INDEX | PRICE ($) | M.CAP (MILL) |
|---|---|---|---|
| MOUNT PLEASANT GOLD TRUST | 11.74 | 0.50 | 22 |
| MACQUARIE OIL NL | 9.57 | 0.79 | 19 |
| CENTURY METALS AND MINING NL | 7.02 | 0.43 | 21 |
| NEW AUSTRALIAN RESOURCES N. L | 6.53 | 2.60 | 36 |
| MARY KATHLEEN URANIUM | 6.41 | 0.17 | 13 |
| MAGNUM RESOURCES LIMITED | 6.32 | 3.80 | 30 |
| JERVOIS SULPHATES (N T) LIMITED | 5.90 | 0.38 | 38 |
| STRATA OIL N.L | 5.18 | 0.24 | 15 |
| GREAT AUSTRALIA RESOURCES N.L | 4.99 | 0.65 | 13 |
| CARBON MINERALS N L | 4.56 | 0.33 | 8 |
| GOLDRIM MINING AUSTRALIA LIMITED | 4.40 | 0.50 | 2 |
| EMU HILL GOLD MINES N L | 4.28 | 0.18 | 11 |
| SOUTHERN CROSS EXPLORATION N.L | 4.03 | 0.15 | 6 |
| KALBARA MINING N L | 3.81 | 0.43 | 18 |
| ESPERANCE MINERALS N L | 3.58 | 0.30 | 6 |

FIGURE 8

HIGH VOLUME STOCKS - LAST 13 WEEKS 17.7.87

INDUSTRIAL STOCKS - M.CAP > 200M

| STOCK NAME | VOLUME INDEX | PRICE ($) | M.CAP (MILL) |
|---|---|---|---|
| BONDS COATS PATONS LTD | 7.77 | 6.40 | 247 |
| MONIER LIMITED | 5.43 | 4.15 | 649 |
| ACMEX HOLDINGS LIMITED | 4.58 | 8.00 | 207 |
| GEORGE WESTON FOODS LIMITED | 4.32 | 4.20 | 277 |
| MIRAGE RESORTS TRUST | 3.91 | 2.80 | 252 |
| EMAIL LIMITED | 3.91 | 2.90 | 503 |
| DAVID JONES LIMITED | 3.88 | 11.90 | 1231 |
| TOOTH & CO LIMITED | 3.39 | 7.92 | 812 |
| PIONEER SUGAR MILLS LIMITED | 2.91 | 2.50 | 299 |
| COMPUTER POWERS LIMITED | 2.58 | 1.45 | 338 |
| FLETCHER CHALLENGE LIMITED | 2.53 | 4.85 | 4175 |
| F.H. FAULDING & COMPANY LIMITED | 2.53 | 5.00 | 216 |
| SCHRODER PROPERTY FINANCE | 2.52 | 3.45 | 540 |
| WATTIE INDUSTRIES LIMITED | 2.51 | 4.50 | 1205 |
| NATIONAL CONSOLIDATED LIMITED | 2.48 | 3.70 | 365 |

INDUSTRIAL STOCKS - M. CAP. BETWEEN 50M AND 200M

| STOCK NAME | VOLUME INDEX | PRICE ($) | M.CAP (MILL) |
|---|---|---|---|
| METRO INDUSTRIES LIMITED | 26.61 | 2.05 | 63 |
| LATEC INVESTMENTS LIMITED | 8.96 | 0.30 | 121 |
| EPSTEIN & CO. LIMITED | 7.93 | 2.80 | 54 |
| BOTENA INVESTMENTS LIMITED | 7.57 | 4.15 | 149 |
| INTER-PACIFIC EQUITY LIMITED | 5.39 | 3.05 | 150 |
| MALCO INDUSTRIES LIMITED | 4.91 | 2.20 | 52 |
| KINGSGATE INTERNATIONAL CORPORATION LIMITED | 4.90 | 0.45 | 115 |
| AUSTORE PROPERTY TRUST | 4.30 | 0.83 | 106 |
| AUSTRALIAN RACING AND BREEDING STABLES LIMITED | 4.27 | 3.00 | 87 |
| ABBOTT HOLDINGS LIMITED | 4.22 | 1.75 | 70 |
| FINE METALS CORPORATION LIMITED | 3.94 | 2.50 | 83 |
| EQUITY FINANCE LIMITED | 3.84 | 1.85 | 72 |
| DARRELL JAMES LIMITED | 3.93 | 4.30 | 52 |
| PARBURY HENTY HOLDINGS LIMITED | 3.74 | 2.15 | 101 |
| PINE VALE INVESTMENTS LIMITED | 3.72 | 0.60 | 60 |

INDUSTRIAL STOCKS - M. CAP LESS THAN 50M

| STOCK NAME | VOLUME INDEX | PRICE ($) | M.CAP (MILL) |
|---|---|---|---|
| FELTEX INTERNATIONAL LIMITED | 56.81 | 2.60 | 2 |
| DENTRAC INDUSTRIES LIMITED | 14.21 | 0.45 | 3 |
| ENTERPRISE INVESTMENTS (SOUTH AUSTRALIA) LIMITED | 12.11 | 0.44 | 7 |
| REDWEAVER INVESTMENTS LIMITED | 11.54 | 1.93 | 7 |
| AUSTLAND PROPERTY DEVELOPMENT FUND | 10.99 | 4.50 | 3 |
| SOLANDER HOLDINGS LIMITED | 10.81 | 1.20 | 12 |
| AUSTRAL GROUP LIMITED | 10.72 | 1.25 | 26 |
| ALTRACK LIMITED | 10.59 | 1.50 | 41 |
| VANGUARD INSURANCE COMPANY LIMITED | 10.36 | 1.00 | 14 |
| STIRLING PROPERTY TRUST | 9.49 | 1.35 | 39 |
| FOREMOST HOLDINGS LIMITED | 8.23 | 0.48 | 5 |
| EQUITABLE PROPERTY TRUST | 8.10 | 1.80 | 31 |
| MILDURA GRAND HOTEL LIMITED | 7.96 | 8.00 | 9 |
| JACK CHIA (AUSTRALIA) LIMITED | 7.85 | 0.23 | 37 |
| JOYCE CORPORATION LIMITED | 6.92 | 1.95 | 10 |

MINING AND OIL - M. CAP. > 200M

| STOCK NAME | VOLUME INDEX | PRICE ($) | M.CAP (MILL) |
|---|---|---|---|
| ANGLO AMERICAN PACIFIC LIMITED | 6.81 | 2.35 | 269 |
| DOMINION MINING & OIL N.L. | 4.71 | 2.80 | 235 |
| NORTH KALGURLIE MINES LIMITED | 3.58 | 1.93 | 799 |
| BELL RESOURCES LIMITED | 3.52 | 5.28 | 3504 |
| NORANDA PACIFIC LIMITED | 3.19 | 4.25 | 540 |
| METALS EXPLORATION LIMITED | 3.04 | 1.90 | 246 |
| HILL 50 GOLD MINE N.L. | 2.95 | 2.50 | 344 |
| HARTOGEN ENERGY LIMITED | 2.78 | 3.78 | 344 |
| SPARGOS EXPLORATION N.L. | 2.75 | 0.89 | 216 |
| ALCAN AUSTRALIAN LIMITED | 2.48 | 1.55 | 269 |
| BARRACK MINES LIMITED | 2.27 | 4.50 | 269 |
| NORTH FLINDERS MINES LIMITED | 2.17 | 14.80 | 530 |
| M.I.M HOLDINGS LIMITED | 2.16 | 2.88 | 2613 |
| CITY RESOURCES LIMITED | 2.12 | 1.75 | 275 |
| PARAGON RESOURCES N.L. | 2.07 | 1.15 | 316 |

MINING AND OIL - M. CAP. BETWEEN 50M AND 200M

| STOCK NAME | VOLUME INDEX | PRICE ($) | M.CAP (MILL) |
|---|---|---|---|
| EROMANGA HYDROCARBONS N.L. | 6.35 | 0.32 | 77 |
| GOLDEN GROVE MINING N.L. | 4.29 | 3.60 | 74 |
| ACORN SECURITIES LIMITED | 3.85 | 2.88 | 105 |
| BARCOO PETROLEUM N.L. | 3.74 | 0.48 | 53 |
| AZTEC EXPLORATION LIMITED | 3.70 | 1.85 | 187 |
| GENOA OIL N.L. | 3.55 | 0.78 | 152 |
| INDEPENDENT RESOURCES LIMITED | 3.30 | 10.00 | 107 |
| HANNANS GOLD LIMITED | 3.28 | 2.85 | 88 |
| CONSOLIDATED EQUITY AND FINANCE CORPORATION LTD | 3.11 | 3.00 | 87 |
| EASTMET LIMITED | 3.04 | 2.70 | 135 |
| RAMSGATE RESOURCES LIMITED | 2.94 | 0.95 | 54 |
| JINGELLIC MINERALS N.L. | 2.78 | 1.45 | 103 |
| INDIAN OCEAN RESOURCES (1962) LIMITED | 2.47 | 1.32 | 88 |
| A.O.G MINERALS LIMITED | 2.43 | 0.80 | 88 |
| MID-EAST MINERALS NO LIABILITY | 2.34 | 1.15 | 73 |

MINING AND OIL - M.CAP. LESS THAN 50M

| STOCK NAME | VOLUME INDEX | PRICE ($) | M.CAP (MILL) |
|---|---|---|---|
| KALBARA MINING N.L. | 7.59 | 0.43 | 16 |
| OCEAN RESOURCES N.L. | 8.43 | 0.80 | 8 |
| MACQUARIE OIL N.L. | 8.17 | 0.79 | 19 |
| KIA PACIFIC GOLD LIMITED | 8.06 | 0.47 | 46 |
| MISTRAL MINES N.L. | 5.88 | 0.55 | 25 |
| NEW AUSTRALIAN RESOURCES N.L. | 5.28 | 2.80 | 36 |
| CONSOLIDATED PETROLEUM AUSTRALIA N.L | 5.24 | 0.22 | 21 |
| MOUNT PLEASANT GOLD TRUST | 5.07 | 0.50 | 22 |
| PHOENIX OIL & GAS N.L. | 4.75 | 1.00 | 42 |
| EAST COAST MINERALS N.L. | 4.72 | 0.30 | 11 |
| MINERAL COMMODITIES LIMITED | 4.63 | 0.28 | 17 |
| SOUTHERN CROSS EXPLORATION N.L. | 4.61 | 0.15 | 8 |
| MARY KATHLEEN URANIUM | 4.59 | 0.17 | 13 |
| CHARTERS TOWERS MINES N.L. | 4.48 | 0.80 | 29 |
| ESPERANCE MINERALS N.L. | 4.21 | 0.30 | 8 |

FIGURE 9  HIGH CHANGE OF OWNERSHIP - LAST WEEK  17.7.87

INDUSTRIAL STOCKS - M.CAP. > 200M

| STOCK NAME | C/O INDEX | PRICE ($) | M.CAP (MILL) |
|---|---|---|---|
| EMAIL LIMITED | 16.33 | 2.90 | 503 |
| HELM CORPORATION | 4.41 | 6.00 | 292 |
| AUSTRALIAN ASSET MANAGEMENT LIMITED | 1.76 | 1.60 | 249 |
| CUMBERLAND CREDIT CORPORATION LIMITED | 1.76 | 0.92 | 235 |
| BOND CORPORATION HOLDINGS LIMITED | 1.67 | 2.65 | 1121 |
| FAI INSURANCE LIMITED | 1.67 | 6.50 | 1434 |
| WESTPAC BANKING CORPORATION | 1.46 | 5.48 | 3122 |
| SCHRODER PROPERTY FINANCE | 1.37 | 3.45 | 540 |
| BORAL LIMITED | 1.25 | 5.52 | 3081 |
| CLAYTON ROBARD LIMITED | 1.19 | 8.40 | 435 |
| AFP INVESTMENT CORPORATION LIMITED | 1.03 | 2.95 | 1411 |
| AUSTRALIA & NEW ZEALAND BANKING GROUP LIMITED | 1.02 | 4.42 | 3065 |
| NATIONAL AUSTRALIA BANK LIMITED | 0.98 | 5.00 | 2652 |
| ACMEX HOLDINGS LIMITED | 0.95 | 6.00 | 207 |
| T N T LIMITED | 0.95 | 5.18 | 2610 |

INDUSTRIAL STOCKS - M. CAP. BETWEEN 50M AND 200M

| STOCK NAME | C/O INDEX | PRICE ($) | M.CAP (MILL) |
|---|---|---|---|
| DARRELL JAMES LIMITED | 10.78 | 4.30 | 52 |
| METRO INDUSTRIES LIMITED | 5.65 | 2.06 | 83 |
| KINGSGATE INTERNATIONAL CORPORATION LIMITED | 4.65 | 0.45 | 115 |
| OVERSEAS STRATEGIC HOLDINGS LIMITED | 3.92 | 1.90 | 79 |
| MONTORO RESOURCES LIMITED | 3.16 | 0.76 | 71 |
| FIRST NATIONAL RESOURCE TRUST | 2.88 | 1.30 | 130 |
| ABBOTT HOLDINGS LIMITED | 2.61 | 1.75 | 79 |
| FIRST INVESTORS SECURITY LIMITED | 2.53 | 1.45 | 89 |
| EQUITY FINANCE LIMITED | 2.30 | 1.85 | 72 |
| TTL CORPORATION LIMITED | 2.21 | 3.34 | 63 |
| CHUAN HUP AUSTRALIA LIMITED | 2.09 | 1.58 | 128 |
| FORTUNA CORPORATION LIMITED | 1.88 | 2.80 | 76 |
| B.T. INSURANCE HOLDINGS LIMITED | 1.71 | 0.32 | 71 |
| GILTNET LIMITED | 1.51 | 1.65 | 82 |
| WESTERN CAPITAL LIMITED | 1.44 | 3.30 | 91 |

INDUSTRIAL STOCKS - M. CAP LESS THAN 50M

| STOCK NAME | C/O INDEX | PRICE ($) | M.CAP (MILL) |
|---|---|---|---|
| RUA INTERNATIONAL LIMITED | 32.97 | 1.00 | 14 |
| AMERICAN CORPORATE LIMITED | 10.51 | 0.55 | 37 |
| COMMUNICATIONS AND ENTERTAINMENT LIMITED | 8.55 | 0.60 | 37 |
| TRANS-PACIFIC FINANCE CORPORATION LIMITED | 8.20 | 2.30 | 26 |
| EUROPEAN CORPORATE LIMITED | 7.96 | 0.56 | 37 |
| CORD HOLDINGS LIMITED | 7.87 | 0.30 | 11 |
| ALLIED PACIFIC INVESTMENTS LIMITED | 5.81 | 1.70 | 35 |
| LASER-TECH AUSTRALIA LIMITED | 4.91 | 0.15 | 2 |
| DELTA WEST LIMITED | 4.69 | 2.40 | 18 |
| CHARTERHALL AUSTRALIA LIMITED | 4.65 | 0.33 | 24 |
| PETTIT AND SEVITT INDUSTRIES LIMITED | 4.35 | 1.70 | 1 |
| CAMPAIGN HOLDINGS LIMITED | 3.97 | 0.27 | 12 |
| JOHN SHEARER (HOLDINGS) LIMITED | 3.42 | 1.70 | 18 |
| WOODMASONS LIMITED | 3.35 | 6.30 | 23 |
| EASTERN RESOURCES OF AUSTRALIA LIMITED | 3.26 | 0.12 | 6 |

MINING AND OIL - M. CAP. > 200M

| STOCK NAME | C/O INDEX | PRICE ($) | M.CAP (MILL) |
|---|---|---|---|
| HILL 50 GOLD MINE N.L | 8.76 | 2.50 | 344 |
| BELL RESOURCES LIMITED | 6.14 | 5.28 | 3504 |
| FORSAYTH N.L | 2.62 | 4.90 | 400 |
| PARINGA MINING AND EXPLORATION COMPANY P.L.C | 2.59 | 5.70 | 221 |
| DOMINION MINING & OIL N.L | 2.08 | 2.80 | 235 |
| NORTH KALGURLIE MINES LIMITED | 2.08 | 1.83 | 788 |
| WESTERN MINING CORPORATION HOLDINGS LIMITED | 1.77 | 8.42 | 5471 |
| OIL SEARCH LIMITED | 1.76 | 2.05 | 392 |
| CONSOLIDATED EXPLORATION LIMITED | 1.81 | 5.40 | 629 |
| PAN AUSTRALIA MINING LIMITED | 1.35 | 4.00 | 300 |
| EMPEROR MINES LIMITED | 1.32 | 8.20 | 398 |
| ABERFOYLE LIMITED | 1.29 | 6.90 | 473 |
| ELDERS RESOURCES LIMITED | 1.27 | 3.70 | 1068 |
| POSEIDON MINING LIMITED | 1.22 | 5.70 | 622 |
| PEKO OIL LIMITED | 1.14 | 1.75 | 438 |

MINING AND OIL - M. CAP. BETWEEN 50M AND 200M

| STOCK NAME | C/O INDEX | PRICE ($) | M.CAP (MILL) |
|---|---|---|---|
| STRATEGIC MINERALS CORPORATION N.L | 8.51 | 2.75 | 103 |
| GREAT FINGALL MINING COMPANY N.L | 5.12 | 0.73 | 62 |
| MAWSON PACIFIC LIMITED | 5.02 | 3.35 | 55 |
| EASTMET LIMITED | 4.83 | 2.70 | 135 |
| SQUARE GOLD & MINERALS LIMITED | 4.40 | 0.77 | 88 |
| WALHALLA MINING COMPANY N. | 4.06 | 2.50 | 78 |
| ACORN SECURITIES LIMITED | 3.51 | 2.88 | 105 |
| CARR BOYD MINERALS LIMITED | 2.73 | 2.05 | 130 |
| JULIA MINES N.L | 2.65 | 2.88 | 128 |
| CHASE MINERALS N.L | 2.62 | 1.40 | 62 |
| LITTLE RIVER GOLDFIELDS N.L | 2.54 | 2.35 | 76 |
| RAMSGATE RESOURCES LIMITED | 2.32 | 0.85 | 54 |
| NORMANDY RESOURCES N.L | 2.28 | 3.70 | 173 |
| MONTAGUE GOLD N.L | 1.98 | 0.49 | 61 |
| ENTERPRISE GOLD MINES N.L | 1.80 | 1.80 | 145 |

MINING AND OIL.CAP. LESS THAN 50M

| STOCK NAME | C/O INDEX | PRICE ($) | M.CAP (MILL) |
|---|---|---|---|
| MOUNT PLEASANT GOLD TRUST | 11.80 | 0.50 | 22 |
| GONDWANA RESOURCES N.L | 8.04 | 0.55 | 15 |
| PERSEVERANCE CORPORATION LIMITED | 8.41 | 3.25 | 21 |
| GOLDQUEST TECHNOLOGY LIMITED | 7.12 | 0.80 | 33 |
| SOUTHERN GOLDFIELDS LIMITED | 6.02 | 0.46 | 45 |
| NEW HOLLAND MINING N.L | 5.98 | 1.35 | 29 |
| SABMINCO N.L | 5.70 | 0.75 | 18 |
| SOUTHWEST GOLD MINES N.L | 4.83 | 0.23 | 6 |
| NORTHLAND MINERALS LIMITED | 4.79 | 1.10 | 13 |
| MOUNT KERSEY MINING N L | 4.79 | 1.40 | 34 |
| CENTRAL MINING CORPORATION N.L | 4.54 | 0.52 | 14 |
| AUSTRALIAN CHINA CLAY LIMITED | 4.54 | 0.70 | 12 |
| KIWI GOLD N.L | 4.06 | 2.40 | 31 |
| NOSSEMAN GOLD MINES NO LIABILITY | 4.03 | 1.80 | 40 |
| REGENT MINING LIMITED | 3.97 | 1.10 | 14 |

FIGURE 10

HIGH CHANGE OF OWNERSHIP - LAST 5 WEEKS                                                                                   17.7.87

INDUSTRIAL STOCKS-M.CAP > 200M

| STOCK NAME | C/O INDEX | PRICE ($) | M.CAP (MILL) |
|---|---|---|---|
| CUMBERLAND CREDIT CORPORATION LIMITED | 21.27 | 0.92 | 235 |
| BONDS COATS PATONS LIMITED | 17.48 | 8.40 | 247 |
| EMAIL LIMITED | 16.63 | 2.80 | 503 |
| PIONEER SUGAR MILLS LIMITED | 14.30 | 2.50 | 299 |
| BOND CORPORATION HOLDINGS LIMITED | 12.03 | 2.85 | 1121 |
| MCPHERSONS LIMITED | 10.55 | 1.50 | 205 |
| SUNSHINE AUSTRALIA LIMITED | 9.88 | 2.65 | 282 |
| HELM CORPORATION | 8.73 | 8.00 | 292 |
| AFP INVESTMENT CORPORATION LIMITED | 9.05 | 2.95 | 1411 |
| MONIER LIMITED | 5.87 | 4.15 | 949 |
| ELDERS IXL LIMITED | 5.74 | 4.60 | 4322 |
| HOOKER CORPORATION LIMITED | 4.88 | 4.10 | 829 |
| NATIONAL AUSTRALIA BANK LIMITED | 4.60 | 5.00 | 2652 |
| TOOTH & CO LIMITED | 4.48 | 7.92 | 612 |
| T N T LIMITED | 4.42 | 5.16 | 2610 |

INDUSTRIAL STOCKS-M. CAP. BETWEEN 50M AND 200M

| STOCK NAME | C/O INDEX | PRICE ($) | M.CAP (MILL) |
|---|---|---|---|
| METRO INDUSTRIES LIMITED | 95.09 | 2.05 | 63 |
| EQUITY FINANCE LIMITED | 28.34 | 1.85 | 72 |
| OVERSEAS STRATEGIC HOLDINGS LIMITED | 13.98 | 1.90 | 79 |
| ROTHWELLS LIMITED | 13.52 | 3.45 | 105 |
| MINPROC HOLDINGS LIMITED | 13.13 | 2.05 | 121 |
| DARRELL JAMES LIMITED | 11.92 | 4.30 | 52 |
| TTL CORPORATION LIMITED | 9.95 | 3.34 | 83 |
| KINGSGATE INTERNATIONAL CORPORATION LIMITED | 8.78 | 0.45 | 115 |
| MALCO INDUSTRIES LIMITED | 8.75 | 2.20 | 52 |
| SEA WORLD PROPERTY TRUST | 8.56 | 0.70 | 130 |
| SPOTLESS GROUP LIMITED | 7.36 | 1.40 | 147 |
| MONTORO RESOURCES LIMITED | 6.53 | 0.78 | 71 |
| ENACON LIMITED | 6.37 | 1.00 | 85 |
| CHALLENGE BANK LIMITED | 6.34 | 2.40 | 103 |
| KEMTRON LIMITED | 6.21 | 0.33 | 74 |

INDUSTRIAL STOCKS-M. CAP LESS THAN 50M

| STOCK NAME | C/O INDEX | PRICE ($) | M.CAP (MILL) |
|---|---|---|---|
| MULTI TRANSPORT HOLDINGS LIMITED | 46.20 | 0.48 | 3 |
| AUTOARC INTERNATIONAL LIMITED | 38.48 | 0.28 | 2 |
| AUSTRAL GROUP LIMITED | 37.11 | 1.25 | 28 |
| AUSTRALIAN RESORT DEVELOPMENT LIMITED | 33.79 | 1.00 | 14 |
| RIA INTERNATIONAL LIMITED | 33.79 | 1.00 | 14 |
| STIRLING PROPERTY TRUST | 33.54 | 1.35 | 39 |
| DGA AUSTRALIA LIMITED | 23.88 | 1.00 | 11 |
| REGENCY INVESTMENTS LIMITED | 20.05 | 0.15 | 1 |
| CORD HOLDINGS LIMITED | 19.74 | 0.30 | 11 |
| BADEN PACIFIC LIMITED | 18.80 | 0.65 | 3 |
| PROVENDER HOLDINGS LIMITED | 17.78 | 1.10 | 9 |
| COMMUNICATIONS AND ENTERTAINMENT LIMITED | 16.68 | 0.80 | 37 |
| TRANS-PACIFIC FINANCE CORPORATION LIMITED | 16.39 | 2.30 | 28 |
| PENN SECURITIES LIMITED | 16.04 | 0.17 | 2 |
| EQUITABLE PROPERTY TRUST | 14.90 | 1.80 | 31 |

MINING AND OIL-M. CAP. > 200M

| STOCK NAME | C/O INDEX | PRICE ($) | M.CAP (MILL) |
|---|---|---|---|
| HILL 50 GOLD MINE N.L | 24.35 | 2.50 | 344 |
| POSEIDON MINING LIMITED | 12.21 | 5.70 | 622 |
| WESTERN MINING CORPORATION HOLDINGS LIMITED | 10.97 | 8.42 | 5471 |
| FORSAYTH N.L | 9.90 | 4.90 | 400 |
| BELL RESOURCES LIMITED | 8.98 | 5.28 | 3504 |
| EMPEROR MINES LIMITED | 8.65 | 8.20 | 388 |
| DOMINION MINING & OIL N.L | 8.41 | 2.80 | 235 |
| QUEENSLAND COAL TRUST | 7.67 | 1.59 | 789 |
| NORTH KALGURLIE MINES LIMITED | 7.13 | 1.83 | 798 |
| PARINGA MINING AND EXPLORATION COMPANY PLC | 7.08 | 5.70 | 221 |
| NILGIRNI MINING LIMITED | 8.68 | 14.80 | 833 |
| WHIM CREEK CONSOLIDATED N.L | 6.80 | 12.40 | 385 |
| CONSOLIDATED EXPLORATION LIMITED | 6.44 | 5.40 | 629 |
| METANA MINERALS N.L | 6.16 | 14.70 | 412 |
| C S R LIMITED | 5.86 | 3.95 | 2750 |

MINING AND OIL-M. CAP. BETWEEN 50M AND 200M

| STOCK NAME | C/O INDEX | PRICE ($) | M.CAP (MILL) |
|---|---|---|---|
| MAWSON PACIFIC LIMITED | 20.81 | 3.35 | 55 |
| STRATEGIC MINERALS CORPORATION N.L | 14.90 | 2.75 | 103 |
| ACORN SECURITIES LIMITED | 13.88 | 2.68 | 105 |
| HELM RESOURCES LIMITED | 11.73 | 1.35 | 70 |
| GREAT FINGALL MINING COMPANY N.L | 10.82 | 0.73 | 62 |
| EASTMET LIMITED | 10.82 | 2.70 | 135 |
| SQUARE GOLD & MINERALS LIMITED | 10.59 | 0.77 | 88 |
| CHASE MINERALS N.L | 10.38 | 1.40 | 62 |
| JASON MINING LIMITED | 9.49 | 2.80 | 117 |
| ASTRO MINING N.L | 9.38 | 2.75 | 100 |
| TRAKO RESOURCES LIMITED | 9.03 | 0.83 | 59 |
| LITTLE RIVER GOLDFIELDS N.L | 8.80 | 2.35 | 78 |
| GRANTS PATCH MINING | 8.98 | 0.68 | 80 |
| RAMSGATE RESOURCES LIMITED | 8.26 | 0.95 | 54 |
| NORTH QUEENSLAND RESOURCES N.L | 7.90 | 1.85 | 57 |

MINING AND OIL-M.CAP. LESS THAN 50M

| STOCK NAME | C/O INDEX | PRICE ($) | M.CAP (MILL) |
|---|---|---|---|
| MOUNT PLEASANT GOLD TRUST | 65.44 | 0.50 | 22 |
| PERSEVERANCE CORPORATION LIMITED | 27.87 | 3.25 | 21 |
| NEW AUSTRALIAN RESOURCES N.L | 25.97 | 2.80 | 38 |
| EMU HILL GOLD MINES N.L | 25.33 | 0.28 | 11 |
| REGENT MINING LIMITED | 24.35 | 1.10 | 14 |
| AUSTRALIAN UNITED GOLD N.L | 21.42 | 0.57 | 19 |
| CENTURY METALS AND MINING N.L | 18.83 | 0.43 | 21 |
| WESTRALIAN GOLD MINES LIMITED | 18.00 | 0.22 | 8 |
| GOLDQUEST TECHNOLOGY LIMITED | 17.40 | 0.90 | 33 |
| NEW HOLLAND MINING N.L | 15.96 | 1.35 | 29 |
| NORTHLAND MINERALS LIMITED | 15.43 | 1.10 | 13 |
| AUDIMCO LIMITED | 15.04 | 0.25 | 11 |
| KALBARA MINING N.L | 14.16 | 0.43 | 18 |
| PIONEER RESOURCES N.L | 14.10 | 0.14 | 6 |
| GONDWANA RESOURCES N.L | 13.82 | 0.55 | 15 |

FIGURE 11    HIGH CHANGE OF OWNERSHIP - LAST 13 WEEKS    17.7.87

INDUSTRIAL STOCKS - M.CAP > 200M

| STOCK NAME | C/O INDEX | PRICE ($) | M.CAP (MILL) |
|---|---|---|---|
| MONIER LIMITED | 11.04 | 4.15 | 649 |
| LEND LEASE CORPORATION LIMITED | 7.23 | 15.96 | 2056 |
| AUSTRALIAN ASSET MANAGEMENT LIMITED | 5.77 | 1.60 | 249 |
| CUMMBERLAND CREDIT CORPORATION LIMITED | 5.02 | 0.92 | 235 |
| NATIONAL AUSTRALIA BANK LIMITED | 4.34 | 5.00 | 2852 |
| DAVID JONES LIMITED | 3.83 | 11.60 | 1231 |
| BOND CORPORATION HOLDINGS LIMITED | 3.31 | 2.65 | 1121 |
| SUNSHINE AUSTRALIA LIMITED | 2.83 | 2.66 | 282 |
| ADELAIDE STEAMSHIP COMPANY LIMTIED; THE | 2.72 | 8.90 | 1326 |
| HELM CORPORATION | 2.70 | 6.00 | 292 |
| BATTERY GROUP LIMITED | 2.70 | 2.20 | 203 |
| KERN CORPORATION LIMITED | 2.67 | 3.35 | 464 |
| AUSTRALIA & NEW ZEALAND BANKING GROUP LIMTIED | 2.63 | 4.42 | 3085 |
| WESTPAC BAKING CORPORATION | 2.60 | 5.46 | 3122 |
| A C INTERANATIONAL LIMITED | 2.58 | 4.30 | 1713 |

INDUSTRIAL STOCKS - M. CAP. BETWEEN 50M AND 200M

| STOCK NAME | C/O INDEX | PRICE ($) | M.CAP (MILL) |
|---|---|---|---|
| METRO INDUSTRIES LIMITED | 29.53 | 2.05 | 83 |
| LATEC INVESTMENTS LIMITED | 15.99 | 0.30 | 121 |
| AUSTRALIAN RACING AND BREEDING STABLES LIMITED | 9.23 | 3.00 | 87 |
| CHALLENGE BANK LIMITED | 9.18 | 2.40 | 103 |
| NZI-BRIC SECURITIES PROPERTY TRUST | 7.98 | 1.05 | 83 |
| EQUITY FINANCE LIMITED | 7.53 | 1.85 | 72 |
| MINPROC HOLDINGS LIMITED | 6.52 | 2.05 | 121 |
| TTL CORPORATION LIMITED | 5.35 | 3.34 | 83 |
| COMREALTY LIMITED | 5.19 | 3.50 | 127 |
| OVERSEAS STRATEGIC HOLDINGS LIMITED | 5.08 | 1.90 | 76 |
| SHERWIN PASTORAL COMPANY LIMITED | 4.05 | 1.00 | 72 |
| B T INSURANCE HOLDINGS LIMITED | 3.95 | 0.32 | 71 |
| AIRSHIP INDUSTRIES LIMITED | 3.45 | 0.78 | 183 |
| BOTENA INVESTMENTS LIMITED | 3.45 | 4.15 | 149 |
| ASCOT MANAGEMENT CORPORATION LIMITED | 3.04 | 4.10 | 54 |

INDUSTRIAL STOCKS - M. CAP LESS THAN 50M

| STOCK NAME | C/O INDEX | PRICE ($) | M.CAP (MILL) |
|---|---|---|---|
| AUSTRAL GROUP LIMITED | 24.94 | 1.25 | 26 |
| ADELAIDE PROPERTY LIMITED | 16.39 | 0.92 | 5 |
| VICTORY ARMAMENTS LIMITED | 14.50 | 0.95 | 9 |
| CORD HOLDINGS LIMITED | 14.48 | 0.30 | 11 |
| ASSOCIATED ELECTRONIC SERVICES LIMITED | 13.37 | 0.18 | 2 |
| AUSTRALIAN RESORT DEVELOPMENT LIMITED | 13.24 | 1.00 | 14 |
| FINANCE AND DEVELOPMENT LIMITED | 12.92 | 0.70 | 6 |
| PENN SECURITIES LIMITED | 12.85 | 0.17 | 2 |
| GOLDEN MILE MARINE LIMITED | 12.53 | 0.49 | 5 |
| EUROPEAN CORPORATE LIMITED | 11.78 | 0.56 | 37 |
| COMMUNICATIONS AND ENTERTAINMENT LIMITED | 10.69 | 0.60 | 37 |
| CHARTERHALL AUSTRALIA LIMITED | 10.14 | 0.33 | 24 |
| KELPIE INDUSTRIES LIMITED | 8.46 | 4.20 | 41 |
| GOLDMIN INVESTMENTS LIMITED | 8.42 | 0.45 | 7 |
| TRANS-PACIFIC FINANCE CORPORATION LIMITED | 8.29 | 2.30 | 26 |

MINING AND OIL - M. CAP. > 200M

| STOCK NAME | C/O INDEX | PRICE ($) | M.CAP (MILL) |
|---|---|---|---|
| DOMINION MINING & OIL N.L | 27.77 | 2.60 | 235 |
| NORTH KALGURLIE MINES LIMITED | 8.51 | 1.83 | 798 |
| CENTAUR MINING & EXPLORATION LIMITED | 8.08 | 3.00 | 285 |
| EMPEROR MINES LIMITED | 7.37 | 8.20 | 368 |
| HILL 50 GOLD MINE N.L | 7.37 | 2.50 | 344 |
| METALS EXPLORATION LIMITED | 7.14 | 1.80 | 246 |
| POSEIDON MINING LIMITED | 8.21 | 5.70 | 622 |
| WESTERN MINING CORPORATION HOLDINGS LIMITED | 5.98 | 8.42 | 5471 |
| MUGIN MINING LIMITED | 5.27 | 14.60 | 833 |
| BELL RESOURCES LIMITED | 4.51 | 5.28 | 3504 |
| MIM HOLDINGS LIMITED | 4.39 | 2.88 | 2613 |
| METANA MINERALS N.L | 4.28 | 14.70 | 412 |
| QUEENSLAND COAL TRUST | 3.99 | 1.58 | 789 |
| PANCONTINENTAL MINING LIMITED | 3.68 | 4.05 | 651 |
| PAN AUSTRALIA MINING LIMITED | 3.45 | 4.00 | 300 |

MINING AND OIL - M. CAP. BETWEEN 50M AND 200M

| STOCK NAME | C/O INDEX | PRICE ($) | M.CAP (MILL) |
|---|---|---|---|
| MAWSON PACIFIC LIMITED | 15.20 | 3.35 | 55 |
| NORTH QUEENSLAND RESOURCES N.L. | 13.34 | 1.85 | 57 |
| HELM RESOURCES LIMITED | 11.45 | 1.35 | 70 |
| GOLDEN GROVE MINING N.L | 9.24 | 3.80 | 74 |
| ASTRO MINING N.L | 8.94 | 2.75 | 100 |
| LITTLE RIVER GOLDFIELDS N.L | 7.06 | 2.35 | 76 |
| JULIA MINING N.L | 6.78 | 2.88 | 128 |
| RAMSGATE RESOURCES LIMITED | 6.65 | 0.95 | 54 |
| CHASE MINERALS N.L | 6.19 | 1.40 | 62 |
| ACORN SECURITIES LIMITED | 5.83 | 2.66 | 105 |
| GREAT FINGALL MINING COMPANY N.L | 5.50 | 0.73 | 62 |
| AUSTPAC GOLD N.L | 5.47 | 0.83 | 71 |
| COOPERS RESOURCES NO LIABILITY | 5.43 | 6.00 | 90 |
| AZTEC EXPLORATION LIMITED | 5.30 | 1.55 | 187 |
| SEDIMENTARY HOLDINGS LIMITED | 5.11 | 1.00 | 81 |

MINING AND OIL - M. CAP. LESS THAN 50M

| STOCK NAME | C/O INDEX | PRICE ($) | M.CAP (MILL) |
|---|---|---|---|
| OCEAN RESOURCES N.L. | 45.39 | 0.50 | 6 |
| KALBARA MINING N.L | 18.30 | 0.43 | 18 |
| METAL TRADERS AUSTRALASIA LIMITED | 18.19 | 0.32 | 18 |
| NEW AUSTRALIAN RESOURCES N.L | 17.63 | 2.60 | 36 |
| SOUTHERN RESOURCES LIMITED | 15.54 | 2.70 | 49 |
| GOLDQUEST TECHNOLOGY LIMITED | 15.13 | 0.90 | 30 |
| MOUNT PLEASANT GOLD TRUST | 15.02 | 0.50 | 22 |
| CENTRAL VICTORIAN GOLD MINES N.L | 14.95 | 0.23 | 18 |
| EURALBA MINING LIMITED | 13.07 | 0.37 | 15 |
| AUSTRALIAN UNITED GOLD N.L | 12.22 | 0.57 | 16 |
| NORTHLAND MINERALS LIMITED | 12.18 | 1.10 | 13 |
| SABMINCO N.L | 12.02 | 0.15 | 19 |
| PERSERVERANCE CORPORATION LIMITED | 11.91 | 3.25 | 21 |
| DENISON RESOURCES N.L | 11.61 | 0.60 | 26 |
| SIRIUS CORPORATION N.L | 11.36 | 0.12 | 6 |

FIGURE 12

TAKEOVER WATCH                                                                                                    17.7.87

| INDUSTRIAL STOCKS—M.CAP > 200M | | | |
|---|---|---|---|
| STOCK NAME | 13 WEEK VOLUME INDEX | PRICE ($) | M.CAP (MILL) |
| MONIER LIMITED | 5.43 | 4.15 | 848 |
| ACMEX HOLDINGS LIMITED | 4.58 | 6.00 | 207 |
| GEORGE WEST FOODS LIMITED | 4.32 | 4.20 | 277 |
| EMAIL LIMITED | 3.91 | 2.90 | 503 |
| SCHRODER PROPERTY FINANCE | 2.52 | 3.45 | 540 |
| HELM CORPORATION | 2.43 | 6.00 | 292 |
| APP INVESTMENT CORPORATION LIMITED | 2.19 | 2.95 | 1411 |
| BOND CORPORATION HOLDINGS LIMITED | 2.12 | 2.65 | 1121 |
| BORAL LIMITED | 2.01 | 5.52 | 3061 |
| NATIONAL AUSTRALIA BANK LIMITED | 1.88 | 5.00 | 2652 |
| AUSTRALIA & NEW ZEALAND BANKING GROUP LIMITED | 1.88 | 4.42 | 3065 |
| SUNSHINE AUSTRALIA LIMITED | 1.85 | 2.85 | 282 |
| TNT LIMITED | 1.68 | 5.18 | 2610 |
| AUSTRALIAN ASBEST MANAGEMENT LIMITED | 1.63 | 1.60 | 248 |
| WESTPAC BANKING LIMITED | 1.37 | 5.48 | 3122 |
| CUMBERLAND CREDIT CORPORATION LIMITED | 0.94 | 0.92 | 235 |

| INDUSTRIAL STOCKS—M. CAP. BETWEEN 50M AND 200M | | | |
|---|---|---|---|
| STOCK NAME | 13 WEEK VOLUME INDEX | PRICE ($) | M.CAP (MILL) |
| METRO INDUSTRIES LIMITED | 20.61 | 2.05 | 63 |
| LATEC INVESTMENTS LIMITED | 8.66 | 0.30 | 121 |
| BOTENA INVESTMENTS LIMITED | 7.57 | 3.00 | 148 |
| INTER-PACIFIC EQUITY LIMITED | 5.39 | 2.40 | 150 |
| KINGSGATE INTERNATIONAL CORPORATION LIMITED | 4.60 | 1.05 | 115 |
| ABBOTT HOLDINGS LIMITED | 4.22 | 1.85 | 79 |
| EQUITY FINANCE LIMITED | 3.94 | 2.05 | 72 |
| DARRELL JAMES LIMITED | 3.93 | 3.34 | 52 |
| CHUAN HUP AUSTRALIA LIMITED | 3.29 | 3.50 | 128 |
| B.T. INSURANCE HOLDINGS LIMITED | 2.50 | 1.90 | 71 |
| OVERSEAS STRATEGIC HOLDINGS LIMITED | 2.15 | 1.00 | 79 |
| TTL CORPORATION LIMITED | 1.88 | 0.32 | 65 |
| MONTORO RESOURCES LIMITED | 1.28 | 0.76 | 71 |
| CHALLENGE BANK LIMITED | 1.13 | 4.15 | 103 |
| MINPROC HOLDINGS LIMITED | 0.43 | 4.10 | 121 |

| INDUSTRIAL STOCKS—M. CAP LESS THAN 50M | | | |
|---|---|---|---|
| STOCK NAME | 13 WEEK VOLUME INDEX | PRICE ($) | M.CAP (MILL) |
| REDWEAVER INVESTMENTS LIMITED | 11.54 | 1.25 | 7 |
| SOLANDER HOLDINGS LIMITED | 10.91 | 0.92 | 12 |
| AUSTRAL GROUP LIMITED | 10.72 | 0.95 | 28 |
| JOYCE CORPORATION LIMITED | 6.92 | 0.30 | 10 |
| AUSTRALIAN RESORT DEVELOPMENT LIMITED | 5.40 | 0.18 | 14 |
| RIA INTERNATIONAL LIMITED | 4.40 | 1.00 | 14 |
| TRANS-PACIFIC FINANCE CORPORATION LIMITED | 4.19 | 0.70 | 28 |
| CHARTERHALL AUSTRALIA LIMITED | 3.42 | 0.17 | 24 |
| COMMUNICATIONS AND ENTERTAINMENT LIMITED | 2.35 | 0.49 | 37 |
| CORD HOLDINGS LIMITED | 2.30 | 0.56 | 11 |
| EUROPEAN CORPORATE LIMITED | 1.57 | 0.60 | 37 |
| PENN SECURITIES LIMITED | 1.11 | 0.33 | 2 |

| MINING AND OIL—M.CAP. > 200M | | | |
|---|---|---|---|
| STOCK NAME | 13 WEEK VOLUME INDEX | PRICE ($) | M.CAP (MILL) |
| ANGLO AMERICAN PACIFIC LIMITED | 6.61 | 2.35 | 269 |
| DOMINION MINING & OIL NL | 4.71 | 2.80 | 235 |
| NORTH KALGURLI MINES LIMITED | 3.58 | 1.83 | 768 |
| BELL RESOURCES LIMITED | 3.52 | 5.28 | 3504 |
| HILL 50 GOLD MINE N.L. | 2.85 | 2.50 | 344 |
| ALCAN AUSTRALIAN LIMITED | 2.46 | 1.55 | 289 |
| BARRACK MINES LIMITED | 2.27 | 4.50 | 289 |
| GIANT RESOURCES LIMITED | 2.05 | 3.30 | 1022 |
| MUGINI MINING LIMITED | 1.98 | 14.80 | 833 |
| WESTERN MINING CORPORATION HOLDINGS LIMITED | 1.73 | 8.42 | 5471 |
| EMPEROR MINES LIMITED | 1.68 | 8.20 | 968 |
| QUEENSLAND COAL TRUST | 1.65 | 1.98 | 769 |
| CONSOLIDATED EXPLORATION LIMITED | 1.55 | 5.40 | 629 |
| PARINGA MINING AND EXPLORATION COMPANY P.L.C. | 1.18 | 5.70 | 221 |
| METANA MINERALS N.L. | 1.18 | 14.70 | 412 |
| POSEIDON MINING LIMITED | 1.12 | 5.70 | 622 |
| PAN AUSTRALIA MINING LIMITED | 1.10 | 4.00 | 300 |
| FORSAYTH N.L. | 1.04 | 4.90 | 400 |

| MINING AND OIL—M. CAP. BETWEEN 50M AND 200M | | | |
|---|---|---|---|
| STOCK NAME | 13 WEEK VOLUME INDEX | PRICE ($) | M.CAP (MILL) |
| ACORN SECURITIES LIMITED | 3.85 | 2.68 | 105 |
| EASTMET LIMITED | 3.04 | 2.70 | 135 |
| RAMSGATE RESOURCES LIMITED | 2.94 | 0.95 | 54 |
| JINGELLIC MINERALS N.L. | 2.78 | 1.45 | 103 |
| LITTLE RIVER GOLDFIELDS N.L. | 2.32 | 2.35 | 78 |
| HOME ENERGY COMPANY LIMITED | 2.30 | 0.65 | 65 |
| NORMANDY RESOURCES N.L. | 2.18 | 3.70 | 173 |
| TRIAD MINERALS | 1.98 | 3.15 | 95 |
| WALHALLA MINING COMPANY N.L. | 1.87 | 2.50 | 78 |
| CHASE MINERALS N.L. | 1.96 | 1.40 | 62 |
| SQUARE GOLD & MINERALS LIMITED | 1.91 | 0.77 | 88 |
| CONSOLIDATED RUTILE LIMITED | 1.81 | 7.00 | 145 |
| MAWSON PACIFIC LIMITED | 1.77 | 3.35 | 55 |
| HELM RESOURCES LIMITED | 1.68 | 1.35 | 70 |
| GREAT FINGALL MINING COMPANY N.L. | 1.45 | 0.73 | 62 |
| NORTH QUEENSLAND RESOURCES N.L. | 1.42 | 1.85 | 57 |
| STRATEGIC MINERALS CORPORATION N.L. | 1.19 | 2.75 | 103 |
| JULIA MINES N.L. | 1.08 | 2.98 | 128 |
| ASTRO MINING N.L. | 0.68 | 2.75 | 100 |

| MINING AND OIL—M.CAP. LESS THAN 50M | | | |
|---|---|---|---|
| STOCK NAME | 13 WEEK VOLUME INDEX | PRICE ($) | M.CAP (MILL) |
| KALBARA MINING N.L. | 7.59 | 0.43 | 18 |
| MACQUARIE OIL N.L. | 6.17 | 0.79 | 19 |
| NEW AUSTRALIAN RESOURCES N.L. | 5.28 | 2.90 | 38 |
| MOUNT PLEASANT GOLD TRUST | 5.07 | 0.50 | 22 |
| ESPERANCE MINERALS N.L. | 4.21 | 0.30 | 6 |
| SABMINCO N.L. | 3.66 | 0.75 | 18 |
| MAGNUM RESOURCES LIMITED | 3.53 | 3.80 | 30 |
| GOLDRIM MINING AUSTRALIA LIMITED | 3.15 | 0.50 | 2 |
| GREAT AUSTRALIA RESOURCES LIMITED | 3.07 | 0.65 | 13 |
| JERVOIS SULPHATES (N.T) LIMITED | 2.75 | 0.38 | 38 |
| GOLDQUEST TECHNOLOGY LIMITED | 2.30 | 0.90 | 33 |
| REGENT MINING LIMITED | 2.23 | 1.10 | 14 |
| AUSTRALIAN UNITED GOLD N.L. | 2.19 | 0.57 | 16 |
| NORTHLAND MINERALS LIMITED | 1.77 | 1.10 | 13 |
| PERSERVERANCE CORPORATION LIMITED | 1.15 | 3.25 | 21 |
| GONDWANA RESOURCES LIMITED | 1.13 | 0.55 | 15 |
| NEW HOLLAND N.L. | 0.67 | 1.35 | 29 |

FIGURE 13

STOCKS NEAR BOOK VALUE
17.7.87

INDUSTRIAL STOCKS - M.CAP > 200M

| STOCK NAME | NTA/PRICE | PRICE ($) | M.CAP (MILL) |
|---|---|---|---|
| NATIONAL AUSTRALIA BANK LIMITED | 0.98 | 5.00 | 2652 |
| TUBEMAKERS OF AUSTRALIA LIMITED | 0.95 | 1.73 | 369 |
| CALTEX AUSTRALIA LIMITED | 0.93 | 2.50 | 450 |
| AUSTRALIA & NEW ZEALAND BANKING GROUP LIMITED | 0.92 | 4.42 | 3066 |
| WESTPAC BANKING CORPORATION | 0.87 | 5.48 | 3122 |
| SUNSHINE AUSTRALIA LIMITED | 0.80 | 2.65 | 282 |
| CLYDE INDUSTRIES LIMITED | 0.78 | 2.25 | 207 |
| WORMALD INTERNATIONAL LIMITED | 0.78 | 3.40 | 480 |
| AUSTRALIAN FOUNDATION INVESTMENT CO | 0.77 | 1.48 | 332 |
| AUSTRALIAN GAS LIGHT COMPANY; THE | 0.75 | 4.15 | 536 |
| AUSTRALIAN GUARANTEE CORPORATION LIMITED | 0.74 | 2.80 | 988 |
| JENNINGS INDUSTRIES LIMITED | 0.73 | 2.45 | 348 |
| GENERAL PROPERTY TRUST | 0.72 | 3.35 | 1358 |
| D.J.'S PROPERTIES LIMITED | 0.72 | 11.00 | 206 |
| WOOLWORTHS LIMITED | 0.71 | 3.30 | 763 |

INDUSTRIAL STOCKS - M. CAP. BETWEEN 50M AND 200M

| STOCK NAME | NTA/PRICE | PRICE ($) | M.CAP (MILL) |
|---|---|---|---|
| A.P.A HOLDINGS LIMITED | 1.85 | 0.70 | 88 |
| G E CRANE HOLDINGS LIMITED | 1.37 | 4.30 | 52 |
| LEIGHTON HOLDINGS LIMITED | 1.19 | 0.93 | 110 |
| STANDARD CHARTERED BANK AUSTRALIA LIMITED | 1.17 | 1.15 | 116 |
| MILTON CORPORATION LIMITED | 1.16 | 5.20 | 63 |
| AUSTORE PROPERTY TRUST | 1.12 | 0.83 | 106 |
| WALTONS BOND LIMITED | 1.04 | 0.95 | 61 |
| AUSTRALIA UNITED INVESTMENT COMPANY LIMITED | 1.02 | 1.25 | 53 |
| MITSUBISHI MOTORS AUSTRALIA LIMITED | 0.99 | 2.20 | 131 |
| BUNDABERG SUGAR COMPANY LIMITED | 0.99 | 2.65 | 178 |
| ENTRAD CORPORATION LIMITED | 0.98 | 1.60 | 124 |
| PETER KURTS PROPERTIES LIMITED | 0.98 | 1.10 | 50 |
| CARLTON INVESTMENTS LIMITED | 0.98 | 31.50 | 82 |
| MALCOLM REID & CO. LIMITED | 0.98 | 1.80 | 54 |
| AMALGAMATED HOLDINGS LIMITED | 0.96 | 6.80 | 101 |

INDUSTRIAL STOCKS - M. CAP LESS THAN 50M

| STOCK NAME | NTA/PRICE | PRICE ($) | M.CAP (MILL) |
|---|---|---|---|
| EMBELTON LIMITED | 4.72 | 0.21 | 0 |
| TAG PACIFIC LIMITED | 3.46 | 0.80 | 18 |
| JACK CHIA (AUSTRALIA) LIMITED | 3.13 | 0.23 | 37 |
| AUSTECH VENTURES LIMITED | 2.27 | 0.42 | 3 |
| SME DAREY AUSTRALIA LIMITED | 2.07 | 1.00 | 7 |
| ASIATIC PACIFIC INDUSTRIES LIMITED | 2.05 | 0.96 | 9 |
| QUEST INVESTMENTS LIMITED | 2.01 | 0.42 | 6 |
| BRIDGESTONE AUSTRALIA LIMITED | 2.00 | 1.25 | 46 |
| TAL HOLDINGS LIMITED | 1.81 | 0.85 | 17 |
| GEARHART AUSTRALIA LIMITED | 1.78 | 0.31 | 5 |
| AUSTRALIAN MERCHANT HOLDINGS LIMITED | 1.74 | 0.65 | 30 |
| JOHN SHEARER (HOLDINGS) LIMITED | 1.74 | 1.70 | 16 |
| AMI TOYOTA LIMITED | 1.65 | 2.25 | 27 |
| BRISTILE LIMITED | 1.62 | 1.45 | 35 |
| VISCOUNT HOLDINGS LIMITED | 1.59 | 0.50 | 13 |

MINING AND OIL - M. CAP. > 200M

| STOCK NAME | NTA/PRICE | PRICE ($) | M.CAP (MILL) |
|---|---|---|---|
| C S R LIMITED | 0.78 | 3.95 | 2750 |
| BELL RESOURCES LIMITED | 0.64 | 5.28 | 3504 |
| AUSTRALIAN OIL AND GAS CORPORATION LIMITED | 0.63 | 2.80 | 494 |
| PEKO-WALLSEND LIMITED | 0.63 | 7.80 | 1386 |
| MIM HOLDINGS LIMITED | 0.61 | 2.88 | 2913 |
| C R A LIMITED | 0.58 | 10.50 | 5840 |
| HARTOGEN ENERGY LIMITED | 0.57 | 3.75 | 344 |
| QUEENSLAND COAL TRUST | 0.52 | 1.56 | 789 |
| TMOC RESOURCES LIMITED | 0.47 | 4.35 | 340 |
| WOODSIDE PETROLEUM LIMITED | 0.47 | 2.20 | 1467 |
| HOWARD SMITH LIMITED | 0.47 | 5.40 | 607 |
| BRIDGE OIL LIMITED | 0.46 | 1.90 | 626 |
| BOUGAINVILLE COPPER LIMITED | 0.45 | 4.78 | 1917 |
| ENERGY RESOURCES OF AUSTRALIA LIMITED | 0.42 | 2.80 | 1148 |
| NORTH BROKEN HILL HOLDINGS LIMITED | 0.41 | 3.70 | 1967 |

MINING AND OIL - M. CAP. BETWEEN 50M AND 200M

| STOCK NAME | NTA/PRICE | PRICE ($) | M.CAP (MILL) |
|---|---|---|---|
| PETROZ N.L | 1.44 | 0.08 | 57 |
| OAKBRIDGE LIMITED | 1.41 | 0.59 | 101 |
| MUSWELLBROOK ENERGY AND MINERALS LIMITED | 1.25 | 1.45 | 124 |
| COAL & ALLIED INDUSTRIES LIMITED | 1.05 | 4.70 | 148 |
| OIL COMPANY OF AUSTRALIA N.L | 0.78 | 0.80 | 81 |
| MID-EAST MINERALS NO LIABILITY | 0.75 | 1.15 | 73 |
| BEACH PETROLEUM LIMITED | 0.58 | 0.74 | 82 |
| GREENBUSHES TIN LIMITED | 0.53 | 1.00 | 61 |
| WESTRALIAN SANDS LIMITED | 0.44 | 2.45 | 116 |
| COSTAIN AUSTRALIA LIMITED | 0.39 | 2.80 | 108 |
| CUDGEN R Z LIMITED | 0.28 | 5.80 | 70 |
| MAGELLAN PETROLEUM AUSTRALIA LIMITED | 0.28 | 4.05 | 124 |
| CONSOLIDATED RUTILE LIMITED | 0.22 | 7.00 | 145 |
| MINCIL SECURITIES N.L | 0.19 | 0.78 | 175 |
| WINDSOR RESOURCES N.L | 0.08 | 1.80 | 64 |

MINING AND OIL - M.CAP. LESS THAN 50M

| STOCK NAME | NTA/PRICE | PRICE ($) | M.CAP (MILL) |
|---|---|---|---|
| CONSOLIDATED RESOURCES N.L | 3.00 | 0.05 | 5 |
| AUSTEN & BUTTA LIMITED | 1.97 | 1.15 | 37 |
| PETROCARB EXPLORATION N.L | 1.69 | 0.15 | 8 |
| ALLIED QUEENSLAND COALFIELDS LIMITED | 1.46 | 0.50 | 13 |
| BLIGH COAL LIMITED | 1.11 | 0.24 | 3 |
| VAM LIMITED | 0.92 | 0.48 | 15 |
| TARGET PETROLEUM N.L | 0.89 | 0.80 | 24 |
| PACIFIC GOLD MINES N.L | 0.88 | 0.19 | 23 |
| VICTORIA EXPLORATION N.L | 0.83 | 0.30 | 10 |
| NICRON RESOURCES LIMITED | 0.68 | 0.50 | 31 |
| GREENVALE MINING N.L | 0.66 | 0.35 | 6 |
| MARY KATHLEEN URANIUM | 0.66 | 0.17 | 13 |
| PIONEER RESOURCES N.L | 0.56 | 0.14 | 6 |
| COMMAND PETROLEUM N.L | 0.52 | 0.60 | 18 |
| MINERALS MINING & METALLURGY LIMITED | 0.40 | 2.90 | 29 |

FIGURE 14

LOW P/E STOCKS 17.7.87

INDUSTRIAL STOCKS - M.CAP > 200M

| STOCK NAME | P/E RATIO | PRICE ($) | M.CAP (MILL) |
|---|---|---|---|
| WESTPAC BANKING CORPORATION | 7.49 | 5.48 | 3122 |
| WORMWALD INTERNATIONAL LIMITED | 7.60 | 3.40 | 480 |
| NATIONAL AUSTRALIA BANK LIMITED | 7.87 | 5.00 | 2852 |
| AUSTRALIA & NEW ZEALAND BANKING GROUP LIMITED | 8.21 | 4.42 | 3035 |
| ADELAIDE STEAMSHIP COMPAY LIMITED, THE | 8.28 | 8.00 | 1328 |
| SUNSHINE AUSTRALIA LIMITED | 9.45 | 2.85 | 282 |
| MIRAGE RESORTS TRUST | 9.71 | 2.80 | 252 |
| NATIONAL CONSOLIDATED LIMITED | 10.27 | 3.70 | 385 |
| AUSTRALIAN GUARANTEE CORPORATION LIMITED | 10.51 | 2.90 | 889 |
| DAVID JONES LIMITED | 10.90 | 11.80 | 1231 |
| WOOLWORTHS LIMITED | 11.58 | 3.30 | 783 |
| AMPOL LIMITED | 11.71 | 3.30 | 1158 |
| TUBEMAKERS OF AUSTRALIA LIMITED | 11.92 | 1.73 | 369 |
| CHASE CORPORATION LIMITED | 12.12 | 3.20 | 1452 |
| HUMES LIMITED | 12.28 | 2.85 | 573 |

INDUSTRIAL STOCKS - M. CAP. BETWEEN 50M AND 200M

| STOCK NAME | P/E RATIO | PRICE ($) | M.CAP (MILL) |
|---|---|---|---|
| A.P.A HOLDINGS LIMITED | 5.11 | 0.70 | 86 |
| AUSTRALIAN RACING AND BREEDING STABLES LIMITED | 5.70 | 3.00 | 87 |
| PARRY CORPORATION LIMITED | 6.02 | 0.96 | 104 |
| CHUAN HUP AUSTRALIA LIMITED | 6.06 | 1.58 | 126 |
| WESTINGHOUSE BRAKE & SIGNAL COMPANY (AUSTRALIA) | 8.16 | 6.80 | 53 |
| MACMAHON HOLDINGS LIMITED | 8.30 | 0.95 | 77 |
| HASTINGS DEERING FINANCE AND INVESTMENT CO. LTD | 8.58 | 1.05 | 68 |
| ROTHWELLS LIMITED | 8.84 | 3.45 | 105 |
| HASTINGS DEERING CORPORATION LIMITED | 9.19 | 1.30 | 181 |
| GROUP PROPERTY SERVICES LIMITED | 9.87 | 2.80 | 54 |
| GKN KWIKFORM INDUSTRIES LIMITED | 9.99 | 4.70 | 70 |
| AUSTORE PROPERTY TRUST | 10.34 | 0.33 | 106 |
| G.E. CRANE HOLDINGS LIMITED | 10.63 | 4.30 | 52 |
| ICAL LIMITED | 11.08 | 1.80 | 72 |
| PETER KURTS PROPERTIES LIMITED | 11.48 | 1.10 | 50 |

INDUSTRIAL STOCKS - M. CAP LESS THAN 50M

| STOCK NAME | P/E RATIO | PRICE ($) | M.CAP (MILL) |
|---|---|---|---|
| VEALLS SECURITIES AND FINANCE LIMITED | 1.65 | 0.48 | 7 |
| NETMAP CORPORATION LIMITED | 1.87 | 0.90 | 31 |
| SEGENHOE LIMITED | 2.21 | 0.67 | 38 |
| A.T.S RESOURCES LIMITED | 2.70 | 1.35 | 18 |
| FINABAR INTERNATIONAL LIMITED | 2.80 | 0.20 | 26 |
| TAB PACIFIC LIMITED | 3.71 | 0.98 | 18 |
| EMBELTON LIMITED | 4.59 | 0.21 | 0 |
| AMI TOYOTA LIMITED | 4.66 | 2.25 | 27 |
| PIONEER PROPERTY GROUP LIMITED | 4.71 | 0.35 | 13 |
| JEFFERIES INDUSTRIES LIMITED | 5.25 | 1.25 | 4 |
| EASTCOURT LIMITED | 5.32 | 0.55 | 12 |
| JACK CHIA (AUSTRALIA) LIMITED | 5.32 | 0.23 | 37 |
| HENRY & WALKER | 6.01 | 0.75 | 34 |
| ARCHIE MARTIN AND SONS (HOLDINGS) LIMITED | 6.54 | 1.00 | 8 |
| MURRAY RIVER DEVELOPMENTS LIMITED | 7.01 | 2.00 | 4 |

MINING AND OIL - M.CAP. > 200M

| STOCK NAME | P/E RATIO | PRICE ($) | M.CAP (MILL) |
|---|---|---|---|
| QUEENSLAND COAL TRUST | 9.13 | 1.58 | 789 |
| BELL RESOURCES LIMITED | 10.05 | 5.28 | 3504 |
| C S R LIMITED | 15.29 | 3.95 | 2750 |
| KIDSTON GOLD MINES LIMITED | 15.49 | 7.50 | 837 |
| BROKEN HILL PROPRIETARY COMPANY LIMITED, THE | 16.09 | 10.40 | 16183 |
| ELDERS RESOURCES LIMITED | 17.16 | 3.70 | 1066 |
| PEKO-WALLSEND LIMITED | 17.33 | 7.80 | 1386 |
| HOWARD SMITH LIMITED | 17.90 | 5.40 | 607 |
| AMPOL EXPLORATION LIMITED | 19.77 | 6.00 | 705 |
| SANTOS LIMITED | 20.78 | 7.68 | 2022 |
| CRUSADER LIMITED | 21.58 | 3.15 | 288 |
| SONS OF GWALIA N.L. | 22.48 | 13.60 | 397 |
| PANCONTINENTAL MINING LIMITED | 22.75 | 4.05 | 651 |
| ENERGY RESOURCES OF AUSTRALIA LIMITED | 22.77 | 2.60 | 1148 |
| WHIM CREEK CONSOLIDATED N.L. | 22.88 | 12.40 | 385 |

MINING AND OIL - M. CAP. BETWEEN 50M AND 200M

| STOCK NAME | P/E RATIO | PRICE ($) | M.CAP (MILL) |
|---|---|---|---|
| GRANTS PATCH MINING | 5.38 | 0.68 | 80 |
| COAL & ALLIED INDUSTRIES LIMITED | 8.24 | 4.70 | 148 |
| OIL COMPANY OF AUSTRALIA N.L. | 8.86 | 0.80 | 81 |
| EROMANGA HYDROCARBONS N.L. | 10.02 | 0.32 | 77 |
| BEACH PETROLEUM LIMITED | 12.45 | 0.74 | 62 |
| CUDGEN R2 LIMITED | 12.91 | 5.60 | 70 |
| WESTRALIAN SANDS LIMITED | 12.97 | 2.45 | 116 |
| CONSOLIDATED RUTILE LIMITED | 14.22 | 7.00 | 145 |
| COSTAIN AUSTRALIA LIMITED | 14.47 | 2.80 | 108 |
| GREAT VICTORIA GOLD LIMITED | 18.49 | 1.85 | 150 |
| CARR BOYD MINERALS LIMITED | 18.99 | 2.05 | 130 |
| KIA ORA GOLD CORPORATION N.L. | 19.78 | 1.05 | 71 |
| WESTERN AUSTRALIAN DIAMOND TRUST | 21.10 | 1.25 | 61 |
| MUSWELLBROOK ENERGY AND MINERALS LIMITED | 22.18 | 1.45 | 124 |
| JIMBERLANA MINERALS N.L. | 23.01 | 0.85 | 183 |

MINING AND OIL - M.CAP. LESS THAN 50M

| STOCK NAME | P/E RATIO | PRICE ($) | M.CAP (MILL) |
|---|---|---|---|
| GOLD & MINERAL EXPLORATION N.L. | 3.48 | 0.40 | 8 |
| CULTUS RESOURCES N.L. | 3.99 | 0.40 | 38 |
| ENERGY OIL & GAS N.L. | 5.17 | 0.30 | 13 |
| AUSTRALIAN MINING INVESTMENTS LIMITED | 5.88 | 0.54 | 48 |
| CONSOLIDATED PETROLEUM AUSTRALIA N L | 7.10 | 0.22 | 21 |
| COHO AUSTRALIA LIMITED | 7.54 | 0.30 | 12 |
| JERVOIS SULPHATES (N.T) LIMITED | 8.17 | 0.38 | 38 |
| PLENTY RIVER MINING COMPANY N.L. | 8.65 | 0.34 | 46 |
| ALLIED QUEENSLAND COALFIELDS LIMITED | 9.56 | 0.50 | 13 |
| VAM LIMITED | 11.01 | 0.48 | 15 |
| GOLDEN PLATEAU N.L. | 12.52 | 0.55 | 20 |
| CONSOLIDATED RESOURCES N.L. | 12.75 | 0.05 | 5 |
| OTTER EXPLORATION N.L. | 13.59 | 0.70 | 25 |
| UNITED GOLDFIELDS CORPORATION N.L. | 14.55 | 2.30 | 25 |
| LAUREL BAY PETROLEUM LIMITED | 19.30 | 0.20 | 20 |

FIGURE 15

HIGH P/E STOCKS 17.7.87

INDUSTRIAL STOCKS-M.CAP > 200M

| STOCK NAME | P/E RATIO | PRICE ($) | M.CAP (MILL) |
|---|---|---|---|
| SARICH TECHNOLOGIES TRUST | 1612.26 | 3.05 | 534 |
| DALGETY FARMERS LIMITED | 1073.44 | 8.40 | 2067 |
| HELM CORPORATION | 781.82 | 6.00 | 292 |
| WESTFIELD HOLDINGS LIMITED | 218.79 | 11.00 | 1047 |
| ACMEX HOLDINGS LIMITED | 158.75 | 6.00 | 207 |
| AFP INVESTMENT CORPORATION LIMITED | 99.71 | 2.95 | 1411 |
| CINTEX LIMITED | 78.90 | 6.00 | 239 |
| J.N. TAYLOR HOLDINGS LIMITED | 58.53 | 6.00 | 372 |
| INDUSTRIAL & PASTROL HOLDINGS LIMITED | 58.32 | 3.97 | 334 |
| KERN CORPORATION LIMITED | 54.88 | 3.35 | 484 |
| EQUITICORP TASMAN LIMITED | 51.52 | 1.15 | 402 |
| S.A. BREWING HOLDINGS LIMITED | 44.40 | 3.62 | 898 |
| BTR NYLEX LIMITED | 38.71 | 10.80 | 2413 |
| CLAYTON ROBARD LIMITED | 38.38 | 6.40 | 435 |
| ARGO INVESTMENTS LIMITED | 34.00 | 2.65 | 269 |

INDUSTRIAL STOCKS-M. CAP. BETWEEN 50M AND 200M

| STOCK NAME | P/E RATIO | PRICE ($) | M.CAP (MILL) |
|---|---|---|---|
| BARRACK TECHNOLOGY LIMITED | 2813.66 | 4.50 | 198 |
| WESTMEX LIMITED | 210.79 | 2.10 | 188 |
| BOTENA INVESTMENTS LIMITED | 202.51 | 4.15 | 149 |
| CORONET AUSTRALIA LIMITED | 182.87 | 1.15 | 88 |
| PINE VALE INVESTMENTS LIMITED | 150.58 | 0.60 | 60 |
| ABBOTT HOLDINGS LIMITED | 121.37 | 1.75 | 79 |
| DARLING DOWNS T.V. LIMITED | 69.71 | 5.50 | 76 |
| ASPERMONT LIMITED | 58.07 | 7.00 | 67 |
| BISLEY INVESTMENT CORPORATION LIMITED | 56.92 | 1.10 | 108 |
| OCEANIC EQUITY LIMITED | 56.03 | 2.00 | 63 |
| INTERWEST LIMITED | 53.30 | 0.45 | 73 |
| ADELAIDE & WALLAROO FERTILISERS LIMITED | 49.00 | 2.20 | 68 |
| JUPITERS TRUST | 45.73 | 1.45 | 149 |
| QUEENSLAND TRADING & HOLDINGS COMPANY LIMITED | 45.15 | 6.50 | 146 |
| REIL CORPORATION LIMITED | 43.21 | 4.50 | 168 |

INDUSTRIAL STOCKS-M. CAP LESS THAN 50M

| STOCK NAME | P/E RATIO | PRICE ($) | M.CAP (MILL) |
|---|---|---|---|
| EURO-NATIONAL AUSTRALIA LIMITED | 11755.43 | 2.65 | 38 |
| QUEENSLAND SCIENCE AND TECHNOLOGY LIMITED | 1552.81 | 4.70 | 49 |
| INDUSTRIAL SECURITIES LIMITED | 263.51 | 0.75 | 34 |
| BRIDGESTONE AUSTRALIA LIMITED | 237.49 | 1.25 | 46 |
| GREETINGS GROUP LIMITED | 220.37 | 0.52 | 6 |
| MANGROVITE INDUSTRIES LIMITED | 105.54 | 0.85 | 10 |
| IMPERIAL HOLDINGS LIMITED | 100.53 | 0.48 | 18 |
| FOXWELL LIMITED | 98.23 | 0.95 | 27 |
| BISLEY PROPERTIES LIMITED | 84.48 | 0.18 | 18 |
| GUNNS KILNDRIED TIMBER INDUSTRIES LIMITED | 83.56 | 2.20 | 39 |
| MCDONNELL & EAST LIMITED | 77.11 | 1.55 | 33 |
| A.L. VINCENT INDUSTRIES LIMITED | 76.55 | 2.30 | 2 |
| RALPH MCKAY LIMITED | 78.11 | 1.70 | 40 |
| SIME DARBY AUSTRALIA LIMITED | 71.56 | 1.00 | 7 |
| DAINFORD HOLDINGS LIMITED | 71.21 | 1.50 | 18 |

MINING AND OIL-M CAP. > 200M

| STOCK NAME | P/E RATIO | PRICE ($) | M.CAP (MILL) |
|---|---|---|---|
| NORTH FLINDERS MINES LIMITED | 3834.72 | 14.80 | 530 |
| FORSAYTH N.L. | 2824.09 | 4.90 | 400 |
| PAN AUSTRALIA MINING LIMITED | 2827.29 | 4.00 | 300 |
| AUSTRALIAN DEVELOPMENT LIMITED | 1687.11 | 5.20 | 201 |
| POSEIDON MINING LIMITED | 1238.19 | 5.70 | 622 |
| OIL SEARCH LIMITED | 838.70 | 2.05 | 392 |
| NORANDA PACIFIC LIMITED | 650.19 | 4.25 | 540 |
| ARMCO N.L. | 532.44 | 3.80 | 226 |
| AUSTRALIAN CONSOLIDATED MINERALS LIMITED | 349.65 | 7.78 | 864 |
| HILL 50 GOLD MINE N L | 296.59 | 2.50 | 344 |
| PARINGA MINING AND EXPLORATION COMPANY P.L.C | 279.74 | 5.70 | 221 |
| SPARGOS EXPLORATION N.L. | 223.14 | 0.88 | 216 |
| WESTERN MINING CORPORATION HOLDINGS LIMITED | 177.51 | 8.42 | 5471 |
| NORTH BROKEN HILL HOLDINGS LIMITED | 170.33 | 3.70 | 1967 |
| GIANT RESOURCES LIMITED | 168.50 | 3.30 | 1022 |

MINING AND OIL-M. CAP. BETWEEN 50M AND 200M

| STOCK NAME | P/E RATIO | PRICE ($) | M.CAP (MILL) |
|---|---|---|---|
| MAGELLAN PETROLEUM AUSTRALIA LIMITED | 1701.579 | 4.05 | 124 |
| AUGOLD N.L. | 2095.10 | 2.05 | 57 |
| THAMES MINING N.L. | 691.30 | 0.95 | 79 |
| BROKEN HILL METALS N.L. | 284.44 | 3.70 | 130 |
| CLIMAX MINING LIMITED | 266.92 | 1.15 | 102 |
| KALIMANTAN GOLD N.L. | 234.99 | 0.46 | 63 |
| NORTHERN QUEENLAND COMPANY LIMITED; THE | 200.04 | 0.55 | 90 |
| BALLARAT GOLDFIELDS LIMITED | 183.62 | 1.60 | 51 |
| MOUNT MARTIN GOLDMINE N.L. | 128.53 | 1.40 | 56 |
| CENTRAL PACIFIC MINERALS N.L. | 109.88 | 1.85 | 195 |
| SOUTHERN PACIFIC PETROLEUM N.L. | 88.42 | 0.82 | 182 |
| TRIAKO RESOURCES LIMITED | 78.87 | 0.83 | 59 |
| QUEEN MARGARET GOLD MINES N.L. | 78.10 | 1.08 | 81 |
| A.U.R. N.L. | 70.00 | 1.30 | 67 |
| GOLCONDA MINERALS N.L. | 69.84 | 1.33 | 130 |

MINING AND OIL-M.CAP. LESS THAN 50M

| STOCK NAME | P/E RATIO | PRICE ($) | M.CAP (MILL) |
|---|---|---|---|
| NULLABOR HOLDINGS LIMITED | 767.77 | 1.05 | 13 |
| A.R.J LIMITED | 688.32 | 1.00 | 33 |
| MAGNUM RESOURCES LIMITED | 319.20 | 3.80 | 30 |
| EAST COAST MINERALS N.L. | 312.85 | 0.30 | 11 |
| MINERALS MINING & METALLURGY LIMITED | 298.75 | 2.80 | 29 |
| GEOMETALS N.L. | 287.44 | 0.55 | 13 |
| WESTERN REEFS LIMITED | 237.67 | 0.23 | 12 |
| ADELAIDE PETROLEUM | 179.13 | 0.75 | 20 |
| CARBON MINERALS N.L. | 167.42 | 0.33 | 8 |
| CRACOW GOLD LIMITED | 143.37 | 0.90 | 18 |
| GREAT NORTHERN MINING CORPORATION N.L. | 139.79 | 0.70 | 8 |
| MUMBIL MINING CORPORATION LIMITED | 127.62 | 0.28 | 14 |
| INVINCIBLE GOLD N.L. | 98.99 | 0.80 | 39 |
| CLACKLINE REFRACTORIES LIMITED | 94.80 | 0.82 | 28 |
| EXPL OIL N.L. | 93.82 | 1.10 | 25 |

FIGURE 16

HIGH DIVIDEND YIELD STOCKS 17.7.87

INDUSTRIAL STOCKS - M.CAP > 200M

| STOCK NAME | YIELD | EF.TAX | PRICE | M.CAP (MILL) |
|---|---|---|---|---|
| MIRAGE RESORTS TRUST | 8.92 | 0.00 | 2.80 | 252 |
| WESTFILED TRUST | 6.90 | 0.00 | 2.25 | 683 |
| STOCKLAND TRUST | 6.85 | 0.00 | 2.35 | 497 |
| GENERAL PROPERTY TRUST | 6.44 | 0.00 | 3.35 | 1358 |
| WORMALD INTERNATIONAL LIMITED | 5.78 | 18.94 | 3.40 | 460 |
| WESTPAC BANKING CORPORATION | 5.13 | 40.09 | 5.46 | 3122 |
| PETERSVILLE SLEIGH LIMITED | 5.08 | 33.12 | 2.85 | 430 |
| WOOLWORTHS LIMITED | 4.98 | 40.08 | 3.30 | 783 |
| CLYDE INDUSTRIES LIMITED | 4.95 | 38.43 | 2.25 | 207 |
| HUMES LIMITED | 4.91 | 44.78 | 2.68 | 573 |
| NATIONAL AUSTRALIA BANK LIMITED | 4.83 | 39.15 | 5.00 | 2652 |
| AUSTRALIA & NEW ZEALAND BANKING GROUP LIMITED | 4.73 | 42.37 | 4.42 | 3095 |
| DJ'S PROPERTIES LIMITED | 4.73 | -44.27 | 11.00 | 209 |
| SUNSHINE AUSTRALIA LIMITED | 4.53 | 4.31 | 2.65 | 282 |
| TOOTH &CO LIMITED | 4.42 | 28.81 | 7.82 | 812 |

INDUSTRIAL STOCKS - M. CAP. BETWEEN 50M AND 200M

| STOCK NAME | YIELD | EF.TAX | PRICE | M.CAP (MILL) |
|---|---|---|---|---|
| CHAMBERLAIN HOLDINGS LIMITED | 13.33 | 0.07 | 0.30 | 91 |
| LEIGHTON HOLDINGS LIMITED | 12.09 | 12.09 | 0.93 | 110 |
| PENNANT PROPERTY TRUST | 11.28 | 0.00 | 0.84 | 90 |
| QUEENSLAND INVESTMENT TRUST | 10.88 | 0.00 | 1.05 | 65 |
| CAPITA PRIME PROPERTY FUND | 10.84 | 0.00 | 2.83 | 72 |
| AUSTORE PROPERTY TRUST | 9.64 | 0.00 | 0.83 | 108 |
| HOOKER PROPERTY TRUST | 9.10 | 0.00 | 1.05 | 105 |
| HASTINGS DEERING FINANCE & INVESTMENT CO. LTD | 7.57 | 0.00 | 1.05 | 69 |
| NATIONAL MUTUAL PROPERTY TRUST | 7.02 | 0.00 | 1.40 | 177 |
| GROUP PROPERTY SERVICES LIMITED | 6.53 | 45.72 | 2.80 | 54 |
| ENTRAD CORPORATION LIMITED | 6.26 | 39.82 | 1.90 | 124 |
| A.P.A HOLDINGS LIMITED | 6.13 | 40.23 | 0.70 | 86 |
| ICAL LIMITED | 5.93 | 39.29 | 1.80 | 72 |
| MACMAHON HOLDINGS LIMITED | 5.82 | 3.97 | 0.95 | 77 |
| COCKBURN CEMENT LIMITED | 5.71 | 41.52 | 1.75 | 52 |

INDUSTRIAL STOCKS - M.CAP LESS THAN 50M

| STOCK NAME | YIELD | EF.TAX | PRICE | M.CAP (MILL) |
|---|---|---|---|---|
| SEGENHOE LIMITED | 113.71 | 46.32 | 0.67 | 36 |
| QUEENSLAND MERCHANT HOLDINGS LIMITED | 35.00 | 0.00 | 0.10 | 8 |
| TAG PACIFIC LIMITED | 15.38 | 45.22 | 0.60 | 18 |
| EMBELTON LIMITED | 14.88 | 36.03 | 0.21 | 0 |
| ABIGROUP LIMITED | 11.90 | 0.00 | 0.21 | 13 |
| CANBERRA COMMERCIAL PROPERTY TRUST | 11.52 | 0.00 | 1.05 | 3 |
| ADELAIDE PROPERTY TRUST | 11.68 | 0.00 | 0.92 | 5 |
| J&B RECORDS LIMITED | 11.33 | 47.55 | 0.76 | 9 |
| EASTCOURT LIMITED | 10.91 | 0.38 | 0.55 | 12 |
| VEALLS SECURITIES AND FINANCE LIMITED | 10.87 | 0.00 | 0.46 | 7 |
| MCNAMARA PROPERTY TRUST | 10.79 | 0.00 | 1.15 | 43 |
| EQUITABLE PROPERTY TRUST | 10.68 | 0.00 | 1.80 | 31 |
| IEL PROPERTY TRUST; THE | 10.50 | 0.00 | 1.05 | 9 |
| ASIATIC PACIFIC INDUSTRIES LIMITED | 10.42 | 46.70 | 0.96 | 8 |
| COMREALTY PROPERTY TRUST | 10.05 | 0.00 | 1.00 | 23 |

MINING AND OIL - M CAP. > 200M

| STOCK NAME | YIELD | EF.TAX | PRICE | M.CAP (MILL) |
|---|---|---|---|---|
| QUEENSLAND COAL TRUST | 15.10 | 0.00 | 1.58 | 789 |
| KIDSTON GOLD MINES LIMITED | 4.93 | 0.26 | 7.50 | 937 |
| C S R LIMITED | 4.52 | 39.30 | 3.95 | 2750 |
| HOWARD SMITH LIMITED | 4.21 | 37.27 | 5.40 | 607 |
| ENERGY RESOURCES OF AUSTRALIA LIMITED | 3.57 | 49.76 | 2.60 | 1148 |
| CENTRAL NORSEMAN GOLD CORPORATION | 3.54 | -0.16 | 3.00 | 624 |
| BOUGAINVILLE COPPER LIMITED | 3.06 | 39.79 | 4.78 | 1817 |
| BROKEN HILL PROPRIETARY COMPANY LIMITED; THE | 2.70 | 45.65 | 10.40 | 16163 |
| PEKO-WALLSEND LIMITED | 2.58 | 35.92 | 7.80 | 1388 |
| SONS OF GWALIA NL | 2.41 | 0.00 | 13.50 | 397 |
| BELL RESOURCES LIMITED | 2.38 | 30.49 | 5.28 | 3504 |
| SANTOS LIMITED | 2.06 | 48.16 | 7.66 | 2022 |
| VAMGAS LIMITED | 1.54 | 58.66 | 3.90 | 282 |
| NORTH BROKEN HILL HOLDINGS LIMITED | 1.32 | 27.84 | 3.70 | 1997 |
| C R A LIMITED | 1.23 | 47.19 | 10.50 | 5940 |

MINING AND OIL - M. CAP. BETWEEN 50M AND 200M

| STOCK NAME | YIELD | EF.TAX | PRICE | M.CAP (MILL) |
|---|---|---|---|---|
| WESTERN AUSTRALIA DIAMOND TRUST | 7.76 | 0.00 | 1.25 | 81 |
| COAL & ALLIED INDUSTRIES LIMITED | 6.33 | 40.04 | 4.70 | 145 |
| CUDGEN RZ. LIMITED | 3.93 | 43.80 | 5.60 | 70 |
| CONSOLIDATED RUTILE LIMITED | 3.93 | 45.46 | 7.00 | 145 |
| WESTRALIAN SANDS LIMITED | 2.72 | 17.52 | 2.45 | 118 |
| GREAT VICTORIA GOLD LIMITED | 2.70 | 0.00 | 1.85 | 150 |
| COSTAIN AUSTRALIA LIMITED | 1.98 | 31.74 | 2.80 | 108 |

MINING AND OIL - M.CAP. LESS THAN 50M

| STOCK NAME | YIELD | EF.TAX | PRICE | M.CAP (MILL) |
|---|---|---|---|---|
| MARY KATHLEEN URANIUM | 17.65 | 0.00 | 0.17 | 13 |
| AUSTRALIAN MINING INVESTMENTS LIMITED | 6.33 | 0.00 | 0.54 | 48 |
| AUSTEN & BUTTA LIMITED | 2.17 | 83.20 | 1.15 | 37 |
| PACIFIC MINING LIMITED | 1.50 | 0.00 | 0.50 | 7 |
| SOUTHERN GOLDFIELDS LIMITED | 0.62 | 0.00 | 0.45 | 45 |

FIGURE 17

LOW DIVIDEND YIELD STOCKS 17.7.87

INDUSTRIAL STOCKS - M.CAP > 200M

| STOCK NAME | YIELD | EF.TAX | PRICE | M.CAP (MILL) |
|---|---|---|---|---|
| AFP INVESTMENT CORPORATION LIMITED | 0.08 | 0.00 | 2.95 | 1411 |
| NEWS CORPORATION LIMITED, THE | 0.25 | 16.42 | 20.10 | 8543 |
| WESTFIELD HOLDINGS LIMITED | 0.33 | 13.12 | 11.00 | 1047 |
| FAI INSURANCES LIMITED | 0.35 | 28.75 | 8.50 | 1434 |
| CLAYTON ROBARD LIMITED | 0.46 | 35.24 | 8.40 | 435 |
| BELL GROUP LIMITED, THE | 0.65 | 27.04 | 8.70 | 3118 |
| BTR NYLEX LIMITED | 0.72 | 32.47 | 10.80 | 2413 |
| KRAFT INCORPORATED | 0.78 | 0.00 | 75.00 | 12358 |
| JOHN FAIRFAX LIMITED | 0.81 | 38.95 | 4.95 | 1485 |
| SOUTHERN FARMERS GROUP LIMITED | 1.07 | 4.99 | 7.50 | 419 |
| J.N. TAYLOR HOLDINGS LIMITED | 1.11 | 51.98 | 6.00 | 372 |
| UNTER GROUP LIMITED | 1.14 | 1.50 | 8.20 | 377 |
| INDUSTRIAL EQUITY LIMITED | 1.16 | 4.98 | 9.50 | 3249 |
| CHASE CORPORATION LIMITED | 1.35 | 0.00 | 3.20 | 1452 |
| DALGETY FARMERS LIMITED | 1.37 | 0.00 | 8.40 | 2067 |

INDUSTRIAL STOCKS - M.CAP. BETWEEN 50M AND 200M

| STOCK NAME | YIELD | EF.TAX | PRICE | M.CAP (MILL) |
|---|---|---|---|---|
| REIL CORPORATION LIMITED | 0.55 | 28.04 | 4.50 | 168 |
| INCOMES GROUP LIMITED | 0.66 | 0.00 | 1.98 | 50 |
| CHEETHAM LIMITED | 0.84 | 48.62 | 3.40 | 104 |
| HJ REECE (HOLDINGS) LIMITED | 1.03 | 49.33 | 5.70 | 114 |
| ASPERMONT LIMITED | 1.04 | 28.24 | 7.00 | 67 |
| BISLEY INVESTMENT CORPORATION LIMITED | 1.14 | 31.39 | 1.10 | 109 |
| DARLING DOWNS T.V. LIMITED | 1.14 | 35.41 | 5.50 | 76 |
| BDC INVESTMENTS LIMITED | 1.18 | 2.28 | 3.00 | 146 |
| AMALGAMATED HOLDINGS LIMITED | 1.26 | 48.32 | 8.80 | 101 |
| GOWING BROS. LIMITED | 1.28 | 34.99 | 3.90 | 66 |
| FIRST INVESTORS SECURITY LIMITED | 1.38 | 0.00 | 1.45 | 66 |
| DARRELL JAMES LIMITED | 1.40 | 48.13 | 4.50 | 52 |
| METROL INDUSTRIES LIMITED | 1.42 | 40.61 | 2.05 | 63 |
| DAVIES BROTHERS LIMITED | 1.43 | 41.59 | 18.00 | 66 |
| GREATER PACIFIC INVESTMENTS LIMITED | 1.49 | 35.04 | 1.00 | 112 |

INDUSTRIAL STOCKS - M.CAP LESS THAN 50M

| STOCK NAME | YIELD | EF.TAX | PRICE | M.CAP (MILL) |
|---|---|---|---|---|
| WHITEFIELD LIMITED | 0.33 | 0.00 | 1.00 | 37 |
| SOUTH AUSTRALIAN GAS COMPANY | 0.52 | 1.01 | 13.80 | 34 |
| SOUTHGATE INVESTMENTS LIMITED | 0.62 | 29.75 | 7.52 | 16 |
| SMITH & LANE HOLDINGS LIMITED | 0.64 | 0.00 | 0.78 | 13 |
| MURCHISON HOLDINGS LIMITED | 0.65 | 0.00 | 1.20 | 4 |
| SIETEL SALES LIMITED | 0.87 | 0.00 | 0.80 | 7 |
| PETERS (W.A.) LIMITED | 0.87 | 1317.88 | 2.30 | 40 |
| INDUSTRIAL SECURITIES LIMITED | 1.07 | 0.00 | 0.75 | 34 |
| MACKAY TELEVISION LIMITED | 1.07 | 29.39 | 25.00 | 50 |
| EGLO ENGINEERING (SERVICES) LIMITED | 1.21 | 47.96 | 3.45 | 27 |
| AL VINCENT INDUSTRIES LIMITED | 1.30 | 0.00 | 2.30 | 2 |
| STODDARTS HOLDINGS LIMITED | 1.32 | 10.37 | 2.25 | 34 |
| GUNNS KILNDRIED TIMBER INDUSTRIES LIMITED | 1.36 | 33.04 | 2.20 | 39 |
| MILDURA GRAND HOTEL LIMITED | 1.39 | 0.00 | 9.00 | 8 |
| GARRAT'S LIMITED | 1.40 | 0.00 | 12.50 | 11 |

MINING AND OIL - M.CAP. > 200M

| STOCK NAME | YIELD | EF.TAX | PRICE | M.CAP (MILL) |
|---|---|---|---|---|
| ABERFOYLE LIMITED | 0.20 | 31.82 | 8.90 | 473 |
| COMALCO LIMITED | 0.25 | 44.40 | 4.05 | 2270 |
| WESTERN MINING CORPORATION HOLDINGS LIMITED | 0.44 | -4.08 | 8.42 | 5471 |
| EMPEROR MINES LIMITED | 0.49 | 0.00 | 8.20 | 368 |
| METANA MINERALS N.L. | 0.68 | 0.00 | 14.70 | 412 |
| BRIDGE OIL LIMITED | 0.79 | 19.05 | 1.90 | 628 |
| CRUSADOR LIMITED | 0.79 | 48.65 | 3.15 | 299 |
| TMOC RESOURCES LIMITED | 0.79 | 32.80 | 4.35 | 340 |
| HARTOGEN ENERGY LIMITED | 0.80 | 0.00 | 3.75 | 344 |
| RENISON GOLDFIELDS CONSOLIDATED LIMITED | 0.85 | 35.35 | 11.40 | 1446 |
| WHIM CREEK CONSOLIDATED N.L | 0.87 | 0.00 | 12.40 | 385 |
| M.I.M HOLDINGS LIMITED | 0.93 | 36.13 | 2.88 | 2813 |
| POSEIDON MINING LIMITED | 1.10 | 0.00 | 5.70 | 622 |
| GOLD MINES OF KALGOORLIE LIMITED | 1.22 | -1.59 | 9.80 | 550 |
| CRA LIMITED | 1.23 | 47.19 | 10.50 | 5840 |

MINING AND OIL - M. CAP. BETWEEN 50M AND 200M

| STOCK NAME | YIELD | EF.TAX | PRICE | M.CAP (MILL) |
|---|---|---|---|---|
| COSTAIN AUSTRALIA LIMITED | 1.98 | 31.74 | 2.80 | 106 |
| GREAT VICTORIA GOLD LIMITED | 2.70 | 0.00 | 1.85 | 150 |
| WESTRALIAN SANDS LIMITED | 2.72 | 17.52 | 2.45 | 119 |
| CONSOLIDATED RUTILE LIMITED | 3.53 | 45.48 | 7.00 | 145 |
| CUDGEN R.Z. LIMITED | 3.63 | 43.80 | 5.60 | 70 |
| COAL & ALLIED INDUSTRIES LIMITED | 6.36 | 40.04 | 4.70 | 148 |
| WESTERN AUSTRALIAN DIAMOND TRUST | 7.78 | 0.00 | 1.25 | 61 |

MINING AND OIL - M.CAP. LESS THAN 50M

| STOCK NAME | YIELD | EF.TAX | PRICE | M.CAP (MILL) |
|---|---|---|---|---|
| SOUTHERN GOLDFIELDS LIMITED | 0.62 | 0.00 | 0.45 | 45 |
| PACIFIC MINING LIMITED | 1.50 | 0.00 | 0.50 | 7 |
| AUSTEN & BUTTA LIMITED | 2.17 | 83.20 | 1.15 | 37 |
| AUSTRALIAN MINING INVESTMENTS LIMITED | 6.33 | 0.00 | 0.54 | 48 |
| MARY KATHLEEN URANIUM | 17.65 | 0.00 | 0.17 | 13 |

FIGURE 18                    HIGH INCOME AND CAPITAL GAIN STOCK                                            17.7.87

| INDUSTRIAL STOCKS | | | | MINING AND OIL | | | |
|---|---|---|---|---|---|---|---|
| STOCK NAME | DIVIDEND | YIELDS | %COMP ANN. PRICE RISE | STOCK NAME | DIVIDEND | YIELDS | %COMP ANN. PRICE RISE |
| J & B RECORDS LIMITED | 14.65 | 11.33 | 1.22 | WESTERN AUSTRALIA DIAMOND TRUST | 20.21 | 7.78 | 1.25 |
| GPT SPLIT TRUST | 22.52 | 7.83 | 1.20 | KIDSTON GOLD MINES LIMITED | 3.56 | 4.63 | 1.33 |
| MURRAY RIVER DEVELOPMENTS LIMITED | 9.56 | 7.27 | 1.20 | HOWARD SMITH LIMITED | 4.64 | 4.21 | 1.23 |
| WESTFIELD TRUST | 10.05 | 6.90 | 1.28 | OUDGEN R.Z. LIMITED | 4.71 | 3.93 | 1.48 |
| STOCKLAND TRUST | 9.21 | 6.65 | 1.22 | CONSOLIDATED RUTILE LIMITED | 5.67 | 3.93 | 1.53 |
| GENERAL PROPERTY TRUST | 9.45 | 6.44 | 1.28 | ENERGY RESOURCES OF AUSTRALIA LIMITED | 8.25 | 3.57 | 1.32 |
| REID BROS HOLDINGS LIMITED | 5.33 | 5.58 | 1.25 | CENTRAL NORSEMAN GOLD CORPORATION | 4.74 | 3.54 | 1.80 |
| THORN EMI (AUSTRALIA) LIMITED | 7.69 | 5.59 | 1.18 | BOUGAINVILLE COPPER LIMITED | 4.23 | 3.08 | 1.54 |
| CAPITAL PROPERTY TRUST | 7.63 | 5.38 | 1.30 | | | | |
| PETERSVILLE SLEIGH LIMITED | 6.84 | 5.08 | 1.25 | | | | |
| YORK MOTORS (HOLDING) LIMITED | 6.15 | 5.00 | 1.20 | | | | |
| ALLWOOD FURNITURE HOLDINGS LIMITED | 10.31 | 5.00 | 1.44 | | | | |
| LATEC INVESTMENTS LIMITED | 8.60 | 5.00 | 1.34 | | | | |
| HUMES LIMITED | 6.94 | 4.91 | 1.21 | | | | |
| NATIONAL PROPERTIES LIMITED | 7.30 | 4.85 | 1.31 | | | | |
| NATIONAL AUSTRALIA BANK LIMITED | 8.49 | 4.83 | 1.19 | | | | |
| AUSTRALIA & NEW ZEALAND BANKING GROUP LIMITED | 8.44 | 4.73 | 1.18 | | | | |
| PENFOLD PRINTERS LIMITED | 5.96 | 4.73 | 1.19 | | | | |
| STIRLING PROPERTIES LIMITED | 7.74 | 4.67 | 1.47 | | | | |
| DATAMATIC NORTHROP LIMITED | 4.22 | 4.44 | 1.22 | | | | |
| CHALMERS LIMITED | 5.52 | 4.43 | 1.25 | | | | |
| TOOTH & CO LIMITED | 6.25 | 4.42 | 1.19 | | | | |
| WESTINGHOUSE BRAKE & SIGNAL COMPANY (AUSTRALIA) | 6.87 | 4.41 | 1.28 | | | | |
| MELCAN HOLDINGS LIMITED | 6.68 | 4.34 | 1.56 | | | | |
| EDWARDS DUNLOP AND COMPANY LIMITED | 6.10 | 4.34 | 1.19 | | | | |
| TUBEMAKERS OF AUSTRALIA LIMITED | 6.83 | 4.34 | 1.28 | | | | |
| HARVEST CORPORATION LIMITED | 7.69 | 4.29 | 1.34 | | | | |
| ELPHINSTONES LIMITED | 5.20 | 4.20 | 1.18 | | | | |
| MCPHERSONS LIMITED | 6.78 | 4.17 | 1.33 | | | | |
| HANCOCK & GORE LIMITED | 6.68 | 4.12 | 1.55 | | | | |

FIGURE 19A                TIMELY BROKERS' RECOMMENDATIONS - SELL                17.7.87

INDUSTRIAL STOCKS-M.CAP. > 200M

| STOCK NAME | BROKER | CLOSE PR | RECOM PR | PRMIUM | M.CAP (MILL) |
|---|---|---|---|---|---|
| WOOLWORTHS LIMITED | MC CAUGHAN DY | 3.30 | 2.38 | 0.387 | 763 |
| WOOLWORTHS LIMITED | RIVKIN JAMES | 3.30 | 3.50 | -0.057 | 763 |
| BURSWOOD PROPERTY TRUST | RIVKIN | 0.60 | 0.45 | 0.333 | 242 |
| BURSWOOD PROPERTY TRUST | RIVKIN | 0.60 | 0.60 | 0.000 | 242 |
| PIONEER SUGAR MILLS LIMITED | HORDEN UTZ | 2.50 | 2.00 | 0.250 | 269 |
| CLYDE INDUSTRIES LIMITED | CLARKE VICKE | 2.25 | 1.80 | 0.250 | 207 |
| NATIONAL AUSTRALIA BANK LIMITED | RIVKIN | 5.00 | 4.14 | 0.208 | 2852 |
| LINTER GROUP LIMITED | RIVKIN | 8.20 | 7.50 | 0.093 | 377 |
| AMCOR LIMITED | RIVKIN | 4.90 | 4.50 | 0.088 | 1835 |
| AUSTRALIAN NATIONAL INDUSTRIES | CLARKE VICKE | 2.13 | 1.96 | 0.087 | 887 |
| MONIER LIMITED | MC CAUGHAN DY | 4.15 | 3.90 | 0.064 | 649 |

INDUSTRIAL STOCKS-M.CAP. BETWEEN 50M AND 200M

| STOCK NAME | BROKER | CLOSE PR | RECOM PR | PRMIUM | M.CAP (MILL) |
|---|---|---|---|---|---|
| BUNDABERG SUGAR COMPANY LIMITED | HOLDER UTZ | 2.65 | 2.45 | 0.082 | 178 |

MINING AND OIL-M.CAP. > 200M

| STOCK NAME | BROKER | CLOSE PR | RECOM PR | PRMIUM | M.CAP (MILL) |
|---|---|---|---|---|---|
| NIUGINI MINING LIMITED | MCCAUGHAN DY | 14.80 | 4.05 | 2.654 | 833 |
| HILL 50 GOLD MINE N.L. | MCCAUGHAN DY | 2.50 | 1.70 | 0.471 | 344 |
| ASHTON MINING LIMITED | RIVKIN/JAMES | 3.50 | 2.85 | 0.220 | 710 |
| SONS OF GWALIA N.L. | RAY PORTER | 13.50 | 11.50 | 0.184 | 397 |
| HOWARD SMITH LIMITED | RIVKIN | 5.40 | 4.80 | 0.125 | 907 |

MINING AND OIL-M.CAP. BETWEEN 50M AND 200M

| STOCK NAME | BROKER | CLOSE PR | RECOM PR | PRMIUM | M.CAP (MILL) |
|---|---|---|---|---|---|
| OAKBRIDGE LIMITED | JACKSONS | 0.59 | 0.55 | 0.073 | 101 |
| EASTMET LIMITED | CLARKE VICKE | 2.70 | 2.60 | 0.038 | 135 |

FIGURE 19B

TIMELY BROKERS' RECOMMENDATIONS - BUY 17.7.87

INDUSTRIAL STOCKS-M.CAP > 200M

| STOCK NAME | BROKER | CLOSE PR | RECOM PR | DISCNT | M.CAP. (MILL) |
|---|---|---|---|---|---|
| QUATRO LIMITED | PHILLIPS HEN | 1 70 | 1 80 | 0 058 | 457 |
| MCPHERSON'S LIMITED | ROACH TILLEY | 1 50 | 1 50 | 0 000 | 205 |
| AUSTRALIAN GAS LIGHT COMPANY | BAIN COY | 4 16 | 3 95 | -0 051 | 536 |
| F P FAULDING & COMPANY LIMITED | ORD MINNETT | 5 00 | 7 90 | 0 387 | 216 |
| AUSTRALIA & NEW ZEALAND BANK | MAY MELLOR | 4 42 | 4 16 | -0 065 | 3085 |
| AUSTRALIA & NEW ZEALAND BANK | MC CAUGHAN D | 4 42 | 3 94 | -0 122 | 3085 |
| ARIADNE AUSTRALIA LIMITED | A C GOODE | 2 80 | 3 58 | 0 274 | 1264 |
| ARIADNE AUSTRALIA LIMITED | POTTERS | 2 80 | 3 20 | 0 168 | 1264 |
| SARICH TECHNOLOGIES TRUST | POTTERS | 3 05 | 4 00 | 0 238 | 534 |
| SARICH TECHNOLOGIES TRUST | CLARKE VICKE | 3 05 | 3 00 | -0 017 | 534 |
| NORTHERN STAR HOLDINGS LIMITEI | MC CAUGHAN D | 2 60 | 2 45 | -0 061 | 634 |
| WORMWALD INTERNATIONAL LIMITE | A C GOODE | 3 40 | 4 10 | 0 171 | 460 |
| ELDERS IXL LIMITED | A C GOODE | 4 80 | 5 60 | 0 127 | 4322 |
| ELDERS IXL LIMITED | PRUDENTIAL B | 4 80 | 4 85 | 0 010 | 4322 |
| ELDERS IXL LIMITED | RIVKIN | 4 80 | 4 60 | -0 045 | 4322 |
| ELDERS IXL LIMITED | BACHE CORTIS | 4 80 | 4 50 | -0 067 | 4322 |

INDUSTRIAL STOCKS-M.CAP. BETWEEN 50M AND 200M

| STOCK NAME | BROKER | CLOSE PR | RECOM PR | DISCNT | M.CAP. (MILL) |
|---|---|---|---|---|---|
| KINGSGATE INTERNATION CORP | BAIN AND COY | 0 45 | 0 78 | 0 423 | 115 |
| KINGSGATE INTERNATION CORP | BAIN COY | 0 45 | 0 49 | 0 082 | 116 |
| MALCOLM REID & CO LIMITED | REYNOLDS | 1 60 | 2 40 | 0 333 | 54 |
| OCEANIC EQUITY LIMITED | PATERSON ORD | 2 00 | 3 00 | 0 333 | 63 |
| CHUAN HUP AUSTRALIA LIMITED | BAIN CO | 1 56 | 1 70 | 0 082 | 126 |
| CHUAN HUP AUSTRALIA LIMITED | ROACH TILLEY | 1 56 | 1 60 | 0 025 | 126 |
| FINE METALS CORPORATION LTI | WORTHS | 2.50 | 0 75 | -2 333 | 63 |
| FINE METALS CORPORATION LTI | WORTHS | 2 50 | 0 67 | -2 731 | 63 |
| AUSTEC INTERNATIONAL LTD | PATERSON ORD | 1 75 | 2 10 | 0 167 | 62 |
| PANFIDA LIMITED | BAILLIEU | 0 86 | 1.00 | 0 140 | 110 |
| MARKALINGA TRUST | D J CARMICHA | 1 51 | 1 75 | 0 137 | 54 |
| AUSPHARM INTERNATIONAL LTD | PATERSON ORD | 1 00 | 1 12 | 0 107 | 56 |
| AIRSHIP INDUSTRIES LIMITED | JACKSONS | 0.76 | 0 85 | 0.106 | 193 |
| INTERNWEST LIMITED | RIVKIN | 0 45 | 0 50 | 0 100 | 73 |
| MACMAHON HOLDINGS LIMITED | TODD PARTNER | 0 95 | 1 05 | 0 095 | 77 |
| MACMAHON HOLDINGS LIMITED | MOFFAT MAOG | 0.95 | 1 00 | 0.050 | 77 |
| MACMAHON HOLDINGS LIMITED | MAC DOUGALL | 0 95 | 0 58 | -0.638 | 77 |
| DANOMIC INVESTMENTS LIMITEI | WORTHS | 1 60 | 1 75 | 0.086 | 154 |

INDUSTRIAL STOCKS-M.CAP LESS THAN 50M

| STOCK NAME | BROKER | CLOSE PR | RECOM PR | DISCNT | M.CAP. (MILL) |
|---|---|---|---|---|---|
| ICOM LIMITED | CUTTEN PENTZ | 0 26 | 0 36 | 0 278 | 10 |
| BBJ COMPUTER INTERNATIONAL LT | MC CAUGHAN | 0 65 | 0 90 | 0 278 | 11 |
| CHARTERHALL AUSTRALIA LTD | A C GOODE | 0 33 | 0 45 | 0 267 | 24 |
| CHARTERHALL AUSTRALIA LTD | BAIN COY | 0 33 | 0 38 | 0 132 | 24 |
| SMITH AND MILES HOLDINGS LTD | REYNOLDS | 0 85 | 1 10 | 0 227 | 11 |
| PLASTECH ENGINEERS LIMITED | BRIDGES SON | 0 32 | 0.40 | 0 200 | 3 |
| MRSA LIMITED | RAY FORTER | 0 75 | 0 90 | 0 167 | 32 |
| REDWEAVER INVESTMENTS LTD | PAUL MACGOA | 1.85 | 1 65 | -0 121 | 7 |

MINING AND OIL-M-CAP, > 200M

| STOCK NAME | BROKER | CLOSE PR | RECOM PR | DISCNT | M.CAP. (MILL) |
|---|---|---|---|---|---|
| FORSAYTH N L | BAIN COY | 4 90 | 3 80 | -0 289 | 400 |
| WESTERN MINING CORPORATION | WILSON COY | 8 42 | 6 30 | -0 377 | 5471 |
| WESTERN MINING CORPORATION | MAC DOUGALL | 8 42 | 6 20 | -0 358 | 5471 |
| WESTERN MINING CORPORATION | JACKSONS | 8 42 | 5 88 | -0 432 | 5471 |
| WESTERN MINING CORPORATION | MC CAUGHAN D | 8 42 | 5 68 | -0 480 | 5471 |
| CENTAUR MINING & EXPLORATION | MC CAUGHAN D | 3 00 | 3 10 | 0 032 | 285 |
| SONS OF GWALIA N L | MAY MELLOR | 13 50 | 15 00 | 0.100 | 397 |
| BELL RESOURCES LIMITED | BACHE CORTIS | 5.28 | 4 80 | -0 098 | 3504 |
| BELL RESOURCES LIMITED | RIVKIN | 5 28 | 4 90 | -0 022 | 3504 |
| GIANT RESOURCES LIMITED | RIVKIN | 3 30 | 3 60 | 0 083 | 1022 |
| GIANT RESOURCES LIMITED | CLARKE VICKE | 3 30 | 2 70 | -0 222 | 1022 |
| GIANT RESOURCES LIMITED | CLARKE VICKE | 3 30 | 2 60 | -0.269 | 1022 |
| WHIM CREEK CONSOLIDATED N L | MAY MELLOR | 12 40 | 13 50 | 0 081 | 385 |
| METANA MINERALS N.L | RIVKIN | 14 70 | 15 80 | 0 070 | 412 |
| METANA MINERALS N L | RIVKIN | 14 70 | 13 00 | -0 131 | 412 |
| METANA MINERALS N L | CUTTEN PENTE | 14 70 | 12.50 | -0 176 | 412 |
| AUSTRALIAN CONSOLIDATED MINE | BORDERN UTZ | 7 76 | 5 20 | -0.492 | 864 |
| NORTH KALGURLI MINES LIMITED | JACKSONS | 1 83 | 1 90 | 0.037 | 796 |
| C S R LIMITED | CLARKE VICKE | 3 95 | 4 06 | 0 027 | 2760 |
| C S R LIMITED | BATTERSLEY M | 3 95 | 3 95 | . | 2760 |
| PLACER PACIFIC LIMITED | CLARKE VICKE | 4 12 | 4 15 | 0 007 | 2472 |
| PLACER PACIFIC LIMITED | WILSON COY | 4 12 | 3 75 | -0.099 | 2472 |
| PLACER PACIFIC LIMITED | MC CAUGHAN D' | 4 12 | 3 25 | -0.268 | 2472 |

MINING AND OIL-M.CAP BETWEEN 50M AND 200M

| STOCK NAME | BROKER | CLOSE PR | RECOM PR | DISCNT | M.CAP. (MILL) |
|---|---|---|---|---|---|
| CLAREMONT PETROLEUM N.L | BAIN COY | 1.36 | 1 45 | 0 069 | 187 |
| CLAREMONT PETROLEUM N L | RAY PORTER | 1 35 | 1 20 | -0 125 | 187 |
| CLIMAX MINING LIMITED | POTTERS | 1 15 | 1 75 | 0 343 | 102 |
| CLIMAX MINING LIMITED | RIVKIN | 1 15 | 1.50 | 0 261 | 102 |
| CLIMAX MINING LIMITED | GRESHAM PART | 1 15 | 1 10 | -0 045 | 102 |
| WESTRALIAN SANDS LIMITED | BRIDGES SON | 2 45 | 2 60 | 0 058 | 116 |
| DEVEX LIMITED | RIVKIN | 1 46 | 1 93 | 0 235 | 127 |
| GRANTS PATCH MINING | A C GOODE | 0 68 | 0 87 | 0 218 | 80 |
| GRANTS PATCH MINING | A C GOODE | 0 68 | 0.72 | 0 056 | 80 |
| GRANTS PATCH MINING | COUNTY SECS | 0 68 | 0 58 | -0 172 | 80 |
| CARR BOYD MINERALS LIMITED | CLARKE VICKE | 2 05 | 2 60 | 0 212 | 130 |
| CARR BOYD MINERALS LIMITED | MAY MELLOR | 2.05 | 2.60 | 0 212 | 130 |
| CARR BOYD MINERALS LIMITED | RIVKIN | 2 05 | 1 70 | -0 206 | 130 |
| MONOIL SECURITIES N.L | JACKSONS | 0 78 | 0 67 | -0 164 | 175 |
| KIA ORA GOLD CORPORATION N | COUNTY SECS | 1 05 | 1.25 | 0 160 | 71 |
| AUSTPAC GOLD N L | JACKSONS | 0 83 | 0 98 | 0 153 | 71 |
| HUNTER RESOURCES LIMITED | MCCAUGHAN D' | 1 60 | 1 85 | 0 135 | 146 |
| HUNTER RESOURCES LIMITED | POTTER PARTN | 1 60 | 1 35 | -0 185 | 149 |
| BARCOO PETROLEUM N L | BATTERSLEY M | 0 48 | 0 55 | 0 127 | 63 |
| MANSON PACIFIC LIMITED | JACKSONS | 3 35 | 3 80 | 0 118 | 56 |
| MANSON PACIFIC LIMITED | RIVKIN | 3 35 | 3 75 | 0 107 | 66 |
| APEX SECURITIES LIMITED | POTTERS | 0 42 | 0.45 | 0 067 | 84 |

MINING AND OIL-M.CAP LESS THAN 50M

| STOCK NAME | BROKER | CLOSE PR | RECOM PR | DISCNT | M.CAP. (MILL) |
|---|---|---|---|---|---|
| TIO2 CORPORATION N L | RIVKINE | 0 41 | 0 45 | 0 085 | 26 |
| SOUTHWEST GOLD MINES N L | KMEVITTS | 0 23 | 0 40 | 0 425 | 6 |
| SOUTHWEST GOLD MINES N.L | RIVKIN | 0 23 | -0 33 | 0 303 | 6 |
| KITCHENER MINING N L | BRIDGES | 0 95 | 1 45 | 0 345 | 16 |
| KITCHENER MINING N L | BRIDGES SON | 0 95 | 1 05 | 0 095 | 16 |
| KAOMIN N L | BORDERN UTZ | 0 40 | 0.58 | 0 310 | 5 |
| KAOMIN N.L | BORDERN UTZ | 0 40 | 0 50 | 0 200 | 5 |
| NOBLE RESOURCES N L | SAM JAMES | 0 83 | 1 12 | 0 259 | 23 |
| AUSTRALIAN CHINA CLAY LTD | BAIN AND COY | 0 70 | 0 90 | 0.222 | 12 |
| MOAGE LIMITED | BAIN COY | 0 97 | 1.20 | 0 192 | 35 |
| MOAGE LIMITED | LANCASTER | 0 97 | 0.75 | -0 293 | 35 |
| WESTRALIAN GOLD MINES LIMITED | BAIN AND COY | 0 22 | 0.27 | 0 185 | 6 |
| EXPO OIL N L | CRAN GREEN | 1 10 | 1 30 | 0 154 | 25 |
| BUGH OIL & MINERALS N.L | CUTTEN PENTE | 0 85 | 1 00 | 0 150 | 37 |
| DELTA GOLD N L | MC NALL HO | 0 58 | 0 68 | 0.147 | 37 |
| DELTA GOLD N L | GRESHAM SEC | 0 58 | 0.39 | -0.487 | 37 |
| MATQUEST LIMITED | BORDERN UTZ | 0.95 | 1.10 | 0 136 | 19 |

FIGURE 20

BEST PERFORMING STOCKS - LAST WEEK 17.7.87

INDUSTRIAL STOCKS - M.CAP > 200M

| STOCK NAME | % RISE | PRICE | M.CAP (MILL) |
|---|---|---|---|
| JONES (ROBERTS) INVESTMENTS LIMITED | 15.15 | 1.90 | 824 |
| J.N. TAYLOR HOLDINGS LIMITED | 13.21 | 6.00 | 372 |
| TUBEMAKERS OF AUSTRALIA LIMITED | 11.61 | 1.73 | 369 |
| DAVID JONES LIMITED | 10.28 | 11.80 | 1231 |
| APP INVESTMENT CORPORATION LIMITED | 9.26 | 2.95 | 1411 |
| COMPUTER POWERS LIMITED | 9.02 | 1.45 | 335 |
| SOFTWOOD HOLDINGS LIMITED | 8.51 | 2.55 | 281 |
| CHASE CORPORATION LIMITED | 8.47 | 3.20 | 1452 |
| PACIFIC DUNLOP LIMITED | 8.33 | 5.45 | 2767 |
| BRIERLEY INVESTMENTS LIMITED | 7.35 | 3.65 | 4046 |
| NATIONAL CONSOLIDATED LIMITED | 7.25 | 3.70 | 365 |
| F.H. FAULDING & COMPANY LIMITED | 6.38 | 5.00 | 218 |
| CALTEX AUSTRALIA LIMITED | 6.38 | 2.50 | 450 |
| KERN CORPORATION LIMITED | 6.38 | 3.35 | 464 |
| QUATRO LIMITED | 6.25 | 1.70 | 457 |

INDUSTRIAL STOCKS - M.CAP. BETWEEN 50M AND 200M

| STOCK NAME | % RISE | PRICE | M.CAP (MILL) |
|---|---|---|---|
| QUEENSLAND TRADING & HOLDINGS COMPANY LIMITED | 22.64 | 6.50 | 148 |
| PEPTIDE TECHNOLOGY LIMITED | 17.65 | 2.00 | 77 |
| PACIFIC ASSETS LIMITED | 17.65 | 1.00 | 90 |
| COMREALITY LIMITED | 16.67 | 3.50 | 127 |
| SHERWIN PASTORAL COMPANY LIMITED | 16.28 | 1.00 | 72 |
| FARBURY HENTY HOLDINGS LIMITED | 16.22 | 2.15 | 101 |
| LATEC INVESTMENTS LIMITED | 15.38 | 0.30 | 121 |
| OVERSEAS STRATEGIC HOLDINGS LIMITED | 15.15 | 1.90 | 79 |
| B.T INSURANCE HOLDINGS LIMITED | 14.29 | 0.32 | 71 |
| OAKMINSTER HOLDINGS LIMITED | 14.29 | 0.60 | 54 |
| KINGSGATE INTERNATIONAL CORPORATION LIMITED | 12.50 | 0.45 | 115 |
| CORONET EQUITIES NEW ZEALAND LIMITED | 12.50 | 0.45 | 74 |
| FORTUNA CORPORATION LIMITED | 12.00 | 2.80 | 78 |
| MONTORO RESOURCES LIMITED | 11.76 | 0.78 | 71 |
| BWD INDUSTRIES LIMITED | 11.63 | 4.80 | 167 |

INDUSTRIAL STOCKS - M.CAP LESS THAN 50M

| STOCK NAME | % RISE | PRICE | M.CAP (MILL) |
|---|---|---|---|
| WOODMASONS LIMITED | 404.00 | 8.30 | 23 |
| SOFTWARE CORPORATION OF AUSTRALIA LIMITED | 65.64 | 0.18 | 3 |
| FORBES SECURITIES LIMITED | 63.85 | 2.00 | 3 |
| RESOURCE INFORMATION UNIT LIMITED | 50.00 | 0.75 | 1 |
| BLAKISTONS LIMITED | 47.37 | 1.40 | 9 |
| E.P.T GROUP HOLDINGS LIMITED | 37.50 | 0.55 | 49 |
| WINSPORT LIMITED | 33.33 | 0.20 | 4 |
| VALET INTERNATIONAL LIMITED | 30.00 | 0.26 | 5 |
| HENRY & WALKER | 25.00 | 0.75 | 34 |
| RM INTERNATIONAL LIMITED | 25.00 | 1.00 | 14 |
| HAWKINS COURT LIMITED | 25.00 | 0.80 | 2 |
| AMERICAN CORPORATE LIMITED | 22.22 | 0.55 | 37 |
| IMPERIAL HOLDINGS LIMITED | 20.00 | 0.48 | 18 |
| MICROBEE SYSTEMS LIMITED | 20.00 | 0.12 | 2 |
| EQUITY AND PROPERTY INVESTMENT CORPORATION LTD | 20.00 | 3.00 | 39 |

MINING AND OIL - M.CAP. > 200M

| STOCK NAME | % RISE | PRICE | M.CAP (MILL) |
|---|---|---|---|
| ANGLO AMERICAN PACIFIC LIMITED | 27.03 | 2.35 | 269 |
| OIL SEARCH LIMITED | 23.49 | 2.05 | 392 |
| GIANT RESOURCES LIMITED | 22.22 | 3.30 | 1022 |
| DOMINION MINING & OIL N.L | 16.67 | 2.80 | 235 |
| HILL 50 GOLD MINE N L | 16.28 | 2.50 | 344 |
| ELDERS RESOURCES LIMITED | 15.63 | 3.70 | 1068 |
| BHP GOLD MINES LIMITED | 15.38 | 1.50 | 1455 |
| WHIM CREEK CONSOLIDATED N.L | 14.81 | 12.40 | 385 |
| ALCAN AUSTRALIAN LIMITED | 14.81 | 1.55 | 269 |
| NORTH KALGURLI MINES LIMITED | 14.37 | 1.83 | 798 |
| CONSOLIDATED EXPLORATION LIMITED | 13.21 | 5.40 | 628 |
| BRIDGE OIL LIMITED | 13.10 | 1.90 | 628 |
| PEKO OIL LIMITED | 12.90 | 1.75 | 436 |
| WESTERN MINING CORPORATION HOLDINGS LIMITED | 12.87 | 8.42 | 5471 |
| POSEIDON MINING LIMITED | 12.65 | 5.70 | 622 |

MINING AND OIL - M. CAP. BETWEEN 50M AND 200M

| STOCK NAME | % RISE | PRICE | M.CAP (MILL) |
|---|---|---|---|
| HANNANS GOLD LIMITED | 35.90 | 2.65 | 86 |
| GREAT FINGALL MINING COMPANY N.L | 35.19 | 0.73 | 82 |
| BRUNSWICK OIL N.L | 29.23 | 1.88 | 130 |
| GOLDCONDA MINERALS N L | 28.67 | 1.33 | 130 |
| BENDIGO MINING N.L | 28.67 | 1.90 | 87 |
| BROKEN HILL METALS N L | 23.33 | 3.70 | 130 |
| NORTHERN QUEENSLAND COMPANY LIMITED; THE | 22.22 | 0.55 | 90 |
| GREAT VICTORIA GOLD LIMITED | 19.35 | 1.85 | 150 |
| SQUARE GOLD & MINERALS LIMITED | 16.46 | 0.77 | 88 |
| UMBERLANA MINERALS N.L | 16.18 | 0.65 | 183 |
| GRANTS PATCH MINING | 17.24 | 0.88 | 80 |
| MINORA RESOURCES N.L | 16.67 | 0.35 | 83 |
| MUSWELLBROOK ENERGY AND MINERALS LIMITED | 16.00 | 1.45 | 124 |
| JINGELLIC MINERALS N.L | 16.00 | 1.45 | 103 |
| GENOA OIL N.L | 14.71 | 0.78 | 152 |

MINING AND OIL - M.CAP. LESS THAN 50M

| STOCK NAME | % RISE | PRICE | M.CAP (MILL) |
|---|---|---|---|
| PLENTY RIVER MINING COMPANY N.L | 112.50 | 0.34 | 46 |
| JERVOIS SULPHATES (N.T) LIMITED | 65.22 | 0.38 | 36 |
| MOUNT BURGESS GOLD MINING COMPANY N L | 35.71 | 0.95 | 22 |
| PERSEVERANCE CORPORATION LIMITED | 35.42 | 3.25 | 21 |
| BAMBOO GOLD MINES N.L | 35.29 | 0.23 | 18 |
| EASTERN COPPER MINES N.L | 33.33 | 1.00 | 23 |
| UNITED REEFS N L | 33.33 | 0.60 | 22 |
| RESOURCE EXPLORATION OF AUSTRALIA N.L | 31.25 | 1.05 | 28 |
| SAMANTHA EXPLORATION N.L | 30.68 | 1.15 | 36 |
| NEW HOLLAND MINING N.L | 28.57 | 1.35 | 29 |
| TERREX RESOURCES N.L | 27.27 | 0.28 | 13 |
| AUSTRALIAN CHINA CLAY LIMITED | 27.27 | 0.70 | 12 |
| ALLSTATE EXPLORATIONS N.L | 26.32 | 1.20 | 15 |
| AR L LIMITED | 25.00 | 1.00 | 33 |
| LAKES OIL LIMITED | 22.73 | 1.35 | 22 |

FIGURE 21                BEST PERFORMING STOCKS - LAST 5 WEEKS                                    17.7.87

INDUSTRIAL STOCKS - M.CAP > 200M

| STOCK NAME | % RISE | PRICE | M.CAP (MILL) |
|---|---|---|---|
| BTR NYLEX LIMITED | 37.66 | 10.60 | 2413 |
| WESTFIELD HOLDINGS LIMITED | 34.15 | 11.00 | 1047 |
| CLAYTON ROBARD LIMITED | 33.33 | 8.40 | 435 |
| NEW ZEALAND FOREST PRODUCTS LIMITED | 28.57 | 3.60 | 1531 |
| FAI INSURANCE LIMITED | 27.95 | 8.50 | 1434 |
| WATTIE INDUSTRIES LIMITED | 27.66 | 4.60 | 1205 |
| HELM CORPORATION | 28.32 | 6.00 | 292 |
| ROTHMANS OF PALL MALL (AUSTRALIA) LIMITED | 25.37 | 8.40 | 815 |
| COMPUTER POWERS LIMITED | 20.83 | 1.45 | 330 |
| BURSWOOD PROPERTY TRUST | 20.00 | 0.60 | 242 |
| TUBEMAKERS OF AUSTRALIA LIMITED | 19.31 | 1.73 | 369 |
| NATIONAL COMMERCIAL UNION LIMITED | 18.88 | 1.70 | 307 |
| JONES (ROBERTS) INVESTMENTS LIMITED | 18.75 | 1.90 | 624 |
| JAMES HARDIE INDUSTRIES LIMITED | 18.34 | 4.00 | 978 |
| PIONEER CONCRETE SERVICES LIMITED | 18.18 | 3.90 | 2582 |

INDUSTRIAL STOCKS - M.CAP. BETWEEN 50M AND 200M

| STOCK NAME | % RISE | PRICE | M.CAP (MILL) |
|---|---|---|---|
| EQUITY FINANCE LIMITED | 236.36 | 1.85 | 72 |
| N. & K. VENTURES LIMITED | 100.00 | 1.30 | 76 |
| FORTUNA CORPORATION LIMITED | 45.83 | 2.60 | 76 |
| CLIFTON BRICK HOLDINGS LIMITED | 42.86 | 3.00 | 95 |
| COLLINS & LEAHY HOLDINGS LIMITED | 33.33 | 4.00 | 90 |
| PEPTIDE TECHNOLOGY LIMITED | 33.33 | 2.00 | 77 |
| QUEENSLAND TRADING & HOLDING COMPANY LIMITED | 27.45 | 6.50 | 148 |
| OVERSEAS STRATEGIC HOLDINGS LIMITED | 26.67 | 1.90 | 79 |
| MONTORO RESOURCES LIMITED | 26.67 | 0.76 | 71 |
| FIRST INVESTORS SECURITY LIMITED | 26.09 | 1.45 | 69 |
| COMREALITY LIMITED | 25.00 | 3.50 | 127 |
| TTL CORPORATION LIMITED | 23.70 | 3.34 | 83 |
| BISLEY INVESTMENT CORPORATION LIMITED | 22.22 | 1.10 | 109 |
| SHERWIN PASTORAL COMPANY LIMITED | 20.48 | 1.00 | 72 |
| THORN EMI (AUSTRALIA) LIMITED | 20.45 | 2.65 | 111 |

INDUSTRIAL STOCKS - M. CAP LESS THAN 50M

| STOCK NAME | % RISE | PRICE | M.CAP (MILL) |
|---|---|---|---|
| GASPOWER TECHNOLOGY LIMITED | 161.25 | 0.90 | 16 |
| A.P. GROUP LIMITED | 100.00 | 0.65 | 12 |
| SYLVASTATE LIMITED | 92.31 | 1.00 | 6 |
| OLMS CONSOLIDATED LIMITED | 85.00 | 1.85 | 11 |
| CAPITAL CITY PROPERTIES LIMITED | 81.25 | 0.58 | 16 |
| VALET INTERNATIONAL LIMITED | 73.33 | 0.26 | 5 |
| COMMONWEALTH SECURITIES & MORTGAGE TRUST NO. 1 | 69.57 | 1.65 | 2 |
| MURCHISON HOLDINGS LIMITED | 60.00 | 1.20 | 4 |
| FORBES SECURITIES LIMITED | 53.85 | 2.00 | 3 |
| HUNTER DOUGLAS LIMITED | 52.38 | 1.60 | 36 |
| SOFTWARE CORPORATION OF AUSTRALIA LIMITED | 50.00 | 0.18 | 9 |
| COMMUNICATIONS AND ENTERTAINMENT LIMITED | 48.34 | 0.90 | 37 |
| MEDICAL INNOVATIONS LIMITED | 44.44 | 0.65 | 16 |
| WESTMARK CORPORATION LIMITED | 44.00 | 0.54 | 25 |
| JACK CHIA (AUSTRALIA) LIMITED | 43.75 | 0.23 | 37 |

MINING AND OIL - M. CAP. > 200M

| STOCK NAME | % RISE | PRICE | M.CAP (MILL) |
|---|---|---|---|
| HILL 50 GOLD MINE N.L. | 54.32 | 2.50 | 344 |
| CONSOLIDATED EXPLORATION LIMITED | 44.00 | 5.40 | 829 |
| EMPEROR MINES LIMITED | 31.71 | 8.20 | 368 |
| ABERFOYLE LIMITED | 30.19 | 6.60 | 473 |
| OIL SEARCH LIMITED | 29.75 | 2.05 | 392 |
| ALCAN AUSTRALIAN LIMITED | 29.17 | 1.55 | 269 |
| BRIDGE OIL LIMITED | 28.67 | 1.90 | 828 |
| FORSAYTH N.L. | 22.50 | 4.90 | 400 |
| ELDERS RESOURCES LIMITED | 21.31 | 3.70 | 1068 |
| NORANDA PACIFIC LIMITED | 20.40 | 4.25 | 540 |
| BELL RESOURCES LIMITED | 19.55 | 5.28 | 3504 |
| AUSTRALIAN CONSOLIDATED MINERALS LIMITED | 19.33 | 7.78 | 884 |
| WHIM CREEK CONSOLIDATED N.L. | 18.91 | 12.40 | 385 |
| WESTERN MINING CORPORATION HOLDINGS LIMITED | 18.59 | 8.42 | 5471 |
| PEKO OIL LIMITED | 18.24 | 1.75 | 436 |

MINING AND OIL - M. CAP. BETWEEN 50M AND 200M

| STOCK NAME | % RISE | PRICE | M.CAP (MILL) |
|---|---|---|---|
| STRATEGIC MINERALS CORPORATION N.L. | 53.33 | 2.75 | 103 |
| CENTRAL PACIFIC MINERALS N.L. | 42.31 | 1.85 | 195 |
| HANNANS GOLD LIMITED | 39.60 | 2.85 | 86 |
| FIRST INVESTORS RESOURCES N.L. | 33.33 | 1.20 | 79 |
| HOME ENERGY COMPANY LIMITED | 30.00 | 0.85 | 85 |
| NORMANDY RESOURCES N.L. | 27.69 | 3.70 | 173 |
| EASTMET LIMITED | 25.58 | 2.70 | 135 |
| BALLARAT GOLDFIELDS LIMITED | 23.08 | 1.60 | 51 |
| CLAREMONT PETROLEUM N.L. | 22.73 | 1.35 | 167 |
| GOLCONDA MINERALS N.L. | 22.24 | 1.33 | 130 |
| MINORA RESOURCES N.L. | 20.69 | 0.35 | 63 |
| GREAT FINGALL MINING COMPANY N.L. | 19.67 | 0.73 | 62 |
| JASON MINING LIMITED | 18.18 | 2.60 | 117 |
| SOUTHERN PACIFIC PETROLEUM N.L. | 16.98 | 0.62 | 182 |
| ACORN SECURITIES LIMITED | 16.52 | 2.68 | 105 |

MINING AND OIL - M. CAP. LESS THAN 50M

| STOCK NAME | % RISE | PRICE | M.CAP (MILL) |
|---|---|---|---|
| GOLDEN CUE N.L. | 137.50 | 0.19 | 6 |
| PERSERVERANCE CORPORATION LIMITED | 80.56 | 3.25 | 21 |
| PLENTY RIVER MINING COMPANY N.L. | 78.95 | 0.34 | 46 |
| SAMANTHA EXPLORATION N.L. | 74.24 | 1.15 | 36 |
| MINCORP PETROLEUM N.L. | 60.00 | 0.32 | 21 |
| BAMBOO GOLD MINES LIMITED | 53.33 | 0.23 | 18 |
| CENTURY METALS AND MINING N.L. | 50.88 | 0.43 | 21 |
| NEW HOLLAND MINING N.L. | 50.00 | 1.35 | 28 |
| GREAT AUSTRALIA RESOURCES N.L. | 44.44 | 0.69 | 13 |
| MENZIES GOLD N.L. | 44.00 | 1.80 | 36 |
| MACQUARIE OIL N.L. | 43.64 | 0.78 | 19 |
| AUSTRALIAN CARBON LIMITED | 41.20 | 0.73 | 21 |
| STRATA OIL N.L. | 41.18 | 0.24 | 15 |
| NEW AUSTRALIAN RESOURCES N.L. | 40.54 | 2.60 | 36 |
| TERREX RESOURCES N.L. | 40.00 | 0.28 | 13 |

FIGURE 22                           BEST PERFORMING STOCKS - LAST 13 WEEKS                                              17.7.87

INDUSTRIAL STOCKS-M.CAP > 200M

| STOCK NAME | % RISE | PRICE | M.CAP (MILL) |
|---|---|---|---|
| JONES (ROBERTS) INVESTMENTS LIMITED | 58.33 | 1.90 | 624 |
| BONDS COATS PATONS LIMITED | 54.22 | 6.40 | 247 |
| MONIER LIMITED | 53.70 | 4.15 | 849 |
| BURSWOOD PROPERTY TRUST | 46.34 | 0.60 | 242 |
| ICI AUSTRALIA LIMITED | 45.82 | 5.00 | 1439 |
| S.A. BREWING HOLDINGS LIMITED | 43.54 | 3.62 | 898 |
| METAL MANUFACTURERS | 37.78 | 3.10 | 470 |
| BTR NYLEX LIMITED | 35.90 | 10.60 | 2413 |
| F.H. FAULDING & COMPANY LIMITED | 35.87 | 5.00 | 216 |
| KERN CORPORATION LIMITED | 34.00 | 3.35 | 464 |
| PETERSVILLE SLEIGH LIMITED | 31.11 | 2.95 | 430 |
| NEW ZEALAND FOREST PRODUCTS LIMITED | 30.61 | 3.60 | 1531 |
| TNT LIMITED | 30.68 | 5.18 | 2610 |
| TUBEMAKERS OF AUSTRALIA LIMITED | 28.15 | 1.73 | 389 |
| NATIONAL COMMERCIAL UNION LIMITED | 27.93 | 1.70 | 307 |

INDUSTRIAL STOCKS-M. CAP. BETWEEN 50M AND 200M

| STOCK NAME | % RISE | PRICE | M.CAP (MILL) |
|---|---|---|---|
| EQUITY FINANCE LIMITED | 270.00 | 1.85 | 72 |
| WESTERN UNITED HOLDINGS LIMITED | 130.00 | 1.15 | 59 |
| N. & K. VENTURES LIMITED | 100.00 | 1.30 | 76 |
| COMREALITY LIMITED | 89.19 | 3.50 | 127 |
| PINE METALS CORPORATION LIMITED | 70.42 | 2.50 | 83 |
| RAPTIS GROUP LIMITED | 67.92 | 1.12 | 84 |
| PALMER TUBE MILLS LIMITED | 60.35 | 1.65 | 159 |
| FORTUNA CORPORATION LIMITED | 59.09 | 2.80 | 76 |
| COLLINS & LEAHY HOLDINGS LIMITED | 56.86 | 4.00 | 90 |
| METRO INDUSTRIES LIMITED | 53.87 | 2.05 | 63 |
| AUST-WIDE TRUST | 43.90 | 0.59 | 85 |
| TTL CORPORATION LIMITED | 42.13 | 3.34 | 83 |
| MONTORO RESOURCES LIMITED | 40.74 | 0.78 | 71 |
| AUSTRALIAN CHEMICAL HOLDINGS LIMITED | 32.65 | 3.25 | 104 |
| GILTNET LIMITED | 32.00 | 1.65 | 62 |

INDUSTRIAL STOCKS-M. CAP. LESS THAN 50M

| STOCK NAME | % RISE | PRICE | M.CAP (MILL) |
|---|---|---|---|
| CHEW CORPORATION LIMITED | 340.00 | 0.88 | 9 |
| KELPIE INDUSTRIES LIMITED | 298.00 | 4.20 | 41 |
| GASPOWER TECHNOLOGY LIMITED | 200.00 | 0.90 | 18 |
| LEMARNE CORPORATION LIMITED | 168.10 | 1.00 | 12 |
| AQUASCAN LIMITED | 162.50 | 0.42 | 7 |
| ALTRACK LIMITED | 135.85 | 1.50 | 41 |
| ASIATIC PACIFIC INDUSTRIES LIMITED | 113.33 | 0.98 | 9 |
| FORBES SECURITIES LIMITED | 110.53 | 2.00 | 3 |
| A.P. GROUP LIMITED | 109.68 | 0.65 | 12 |
| GUNNS KILNDRIED TIMBER INDUSTRIES LIMITED | 108.52 | 2.20 | 39 |
| COMMONWEALTH SECURITIES & MORTGAGE TRUST NO.1 | 105.26 | 1.95 | 2 |
| SIETEL SALES LIMITED | 104.55 | 0.90 | 7 |
| AUSTLAND PROPERTY DEVELOPMENT FUND | 104.55 | 4.50 | 3 |
| DANFORD HOLDING LIMITED | 100.00 | 1.50 | 18 |
| HENRY & WALKER | 93.80 | 0.75 | 34 |

MINING AND OIL-M CAP. > 200M

| STOCK NAME | % RISE | PRICE | M.CAP (MILL) |
|---|---|---|---|
| OIL SEARCH LIMITED | 89.81 | 2.05 | 392 |
| NIUGINI MINING LIMITED | 72.09 | 14.60 | 833 |
| HILL 50 GOLD MINE N.L. | 66.67 | 2.50 | 344 |
| ABERFOYLE LIMITED | 60.95 | 6.90 | 473 |
| SANTOS LIMITED | 50.20 | 7.86 | 2022 |
| NORTH BROKEN HILL HOLDINGS LIMITED | 48.95 | 3.70 | 1967 |
| BRIDGE OIL LIMITED | 46.15 | 1.90 | 628 |
| AMPOL EXPLORATION LIMITED | 43.13 | 6.00 | 705 |
| CONSOLIDATED EXPLORATION LIMITED | 42.11 | 5.40 | 629 |
| PARAGON RESOURCES N.L. | 38.55 | 1.15 | 318 |
| WESTERN MINING CORPORATION HOLDINGS LIMITED | 37.36 | 8.42 | 5471 |
| M.I.M. HOLDINGS LIMITED | 37.14 | 2.88 | 2613 |
| CENTAUR MINING & EXPLORATION LIMITED | 36.36 | 3.00 | 285 |
| ALCAN AUSTRALIAN LIMITED | 34.78 | 1.55 | 269 |
| PEKO OIL LIMITED | 34.62 | 1.75 | 438 |

MINING AND OIL-M. CAP. BETWEEN 50M AND 200M

| STOCK NAME | % RISE | PRICE | M.CAP (MILL) |
|---|---|---|---|
| COOPERS RESOURCES NO LIABILITY | 160.87 | 6.00 | 90 |
| GOLDEN GROVE MINING N.L. | 109.02 | 3.80 | 74 |
| SOUTHERN PACIFIC PETROLEUM N.L. | 106.67 | 0.62 | 182 |
| AZTEC EXPLORATION LIMITED | 92.31 | 1.55 | 187 |
| CENTRAL PACIFIC MINERALS N.L. | 65.00 | 1.85 | 165 |
| RAMSGATE RESOURCES LIMITED | 72.41 | 0.85 | 54 |
| GOLDEN VALLEY MINES N.L. | 62.95 | 0.95 | 80 |
| ASTRO MINING N.L. | 61.76 | 2.75 | 100 |
| NORTH QUEENSLAND RESOURCES N.L. | 60.87 | 1.85 | 57 |
| STRATEGIC MINERALS CORPORATION N.L. | 57.14 | 2.75 | 103 |
| RIVERINA GOLD N.L. | 56.00 | 1.95 | 67 |
| CHASE MINERALS N.L. | 55.56 | 1.40 | 62 |
| HOME ENERGY COMPANY LIMITED | 51.16 | 0.85 | 65 |
| MAGELLAN PETROLEUM AUSTRALIA LIMITED | 50.00 | 4.05 | 124 |
| GREENBUSHES TIN LIMITED | 42.86 | 1.00 | 61 |

MINING AND OIL-M.CAP. LESS THAN 50M

| STOCK NAME | % RISE | PRICE | M.CAP (MILL) |
|---|---|---|---|
| NEW AUSTRALIAN RESOURCES N.L. | 550.00 | 2.60 | 38 |
| PERSERVERANCE CORPORATION LIMITED | 225.00 | 3.25 | 21 |
| GREAT AUSTRALIA RESOURCES N.L. | 160.00 | 0.65 | 13 |
| PHOENIX OIL & GAS N.L. | 150.00 | 1.00 | 42 |
| CHARTERS TOWERS MINES N.L. | 146.15 | 0.80 | 28 |
| LAKES OIL LIMITED | 145.45 | 1.35 | 22 |
| STRATA OIL N.L. | 118.18 | 0.24 | 15 |
| MALURA HOLDINGS LIMITED | 118.18 | 0.24 | 2 |
| SAMANTHA EXPLORATION N.L. | 109.09 | 1.15 | 36 |
| ASHBURTON MINING CORPORATION LIMITED | 109.09 | 1.15 | 37 |
| KIA PACIFIC GOLD LIMITED | 95.83 | 0.47 | 48 |
| BRUCE RESOURCES N.L. | 87.50 | 0.75 | 38 |
| AUSTRALIAN OVERSEAS MINING LIMITED | 85.71 | 0.78 | 19 |
| MINERALS MINING & METTALLURGY LIMITED | 70.59 | 2.90 | 29 |
| MOUNT EDON GOLD MINES AUSTRALIA N.L. | 66.62 | 1.15 | 40 |

FIGURE 23   BEST PERFORMING STOCKS - LAST 52 WEEKS   17.7.87

INDUSTRIAL STOCKS - M.CAP > 200M

| STOCK NAME | % RISE | PRICE | M.CAP (MILL) |
|---|---|---|---|
| ACMEX HOLDINGS LIMITED | 987.62 | 6.00 | 207 |
| BATTERY GROUP LIMITED | 653.42 | 2.20 | 203 |
| AFP INVESTMENT CORPORATION LIMITED | 413.04 | 2.65 | 1411 |
| BTR NYLEX LIMITED | 361.16 | 10.80 | 2413 |
| COMPUTER POWERS LIMITED | 262.50 | 1.45 | 336 |
| HELM CORPORATION | 233.33 | 6.00 | 292 |
| JOHN FAIRFAX LIMITED | 180.29 | 4.95 | 1485 |
| ADVERTISER NEWSPAPERS LIMITED | 166.67 | 8.40 | 667 |
| WESTFIELD HOLDINGS LIMITED | 144.96 | 11.00 | 1047 |
| ICI AUSTRALIA LIMITED | 143.07 | 5.00 | 1439 |
| QUATRO LIMITED | 132.24 | 1.70 | 457 |
| JONES (ROBERTS) INVESTMENTS LIMITED | 130.30 | 1.90 | 624 |
| LINTER GROUP LIMITED | 127.78 | 8.20 | 377 |
| BONDS COATS PATONS LIMITED | 120.89 | 8.40 | 247 |
| ROTHMANS OF PALL MALL (AUSTRALIA) LIMITED | 115.38 | 8.40 | 818 |

INDUSTRIAL STOCKS - M. CAP. BETWEEN 50M AND 200M

| STOCK NAME | % RISE | PRICE | M.CAP (MILL) |
|---|---|---|---|
| EQUITY FINANCE LIMITED | 1598.67 | 1.85 | 72 |
| OVERSEAS STRATEGIC HOLDINGS LIMITED | 1483.33 | 1.90 | 79 |
| TTL CORPORATION LIMITED | 889.80 | 3.34 | 83 |
| AUSTRALIA WIDE INDUSTRIES LIMITED | 662.71 | 1.90 | 168 |
| COMREALTY LIMITED | 586.27 | 3.50 | 127 |
| BWD INDUSTRIES LIMITED | 446.70 | 4.80 | 167 |
| RAPTIS GROUP LIMITED | 441.06 | 1.12 | 64 |
| WESTERN UNITED HOLDINGS LIMITED | 380.00 | 1.15 | 59 |
| CORPORATION DEVELOPMENT LIMITED | 354.55 | 7.50 | 82 |
| INTER-PACIFIC EQUITY LIMITED | 293.04 | 3.05 | 150 |
| CHARLES DAVIS LIMITED | 210.51 | 1.95 | 144 |
| CORONET AUSTRALIA LIMITED | 206.97 | 1.15 | 88 |
| N & K VENTURES LIMITED | 205.58 | 1.30 | 78 |
| BOTENA INVESTMENTS LIMITED | 197.49 | 4.15 | 149 |
| MEMTEC LIMITED | 187.29 | 5.40 | 160 |

INDUSTRIAL STOCKS - M. CAP LESS THAN 50M

| STOCK NAME | % RISE | PRICE | M.CAP (MILL) |
|---|---|---|---|
| CARPENTER INVESTMENT TRADING COMPANY LIMITED | 1323.08 | 1.11 | 25 |
| SOUTHERN BROADCASTING SYSTEMS LIMITED | 833.33 | 1.40 | 17 |
| CHERRY LANE FASHION GROUP LIMITED | 713.33 | 8.10 | 39 |
| CARRINGBUSH CORPORATION LIMITED | 631.71 | 0.60 | 38 |
| AQUASCAN LIMITED | 395.67 | 0.42 | 7 |
| WESTMARK CORPORATION LIMITED | 321.88 | 0.54 | 25 |
| CAPITAL CITY PROPERTIES LIMITED | 302.78 | 0.58 | 18 |
| SUNMARK CORPORATION LIMITED | 292.16 | 2.00 | 47 |
| ROTAIR TECHNOLOGIES LIMITED | 282.35 | 0.65 | 6 |
| MEDICAL RESEARCH INTERNATIONAL LIMITED | 267.85 | 1.25 | 12 |
| CAMPBELL GROUP LIMITED | 255.56 | 0.80 | 49 |
| TRANS-PACIFIC FINANCE CORPORATION LIMITED | 253.85 | 2.30 | 28 |
| IMPERIAL HOLDINGS LIMITED | 238.03 | 0.46 | 18 |
| HABEN CORPORATION LIMITED | 236.36 | 0.37 | 29 |
| FITWEAR LIMITED | 233.33 | 2.50 | 9 |

MINING AND OIL - M CAP. > 200M

| STOCK NAME | % RISE | PRICE | M.CAP (MILL) |
|---|---|---|---|
| CENTAUR MINING & EXPLORATION LIMITED | 1100.00 | 3.00 | 285 |
| PAN AUSTRALIA MINING LIMITED | 949.92 | 4.00 | 300 |
| HILL 50 GOLD MINE N.L. | 900.00 | 2.50 | 344 |
| ANGLO AMERICAN PACIFIC LIMITED | 803.85 | 2.35 | 269 |
| AUSTRALIAN DEVELOPMENT LIMITED | 796.55 | 5.20 | 201 |
| GIANT RESOURCES LIMITED | 718.86 | 3.30 | 1022 |
| FORSAYTH N.L. | 663.24 | 4.80 | 400 |
| OIL SEARCH LIMITED | 606.90 | 2.05 | 392 |
| ARIMCO N.L. | 603.70 | 3.80 | 226 |
| NORHT FLINDERS MINES LIMITED | 538.58 | 14.80 | 530 |
| POSEIDON MINING LIMITED | 531.23 | 5.70 | 622 |
| WETANA MINERALS N.L. | 512.50 | 14.70 | 412 |
| WHIM CREEK CONSOLIDATED N.L. | 480.07 | 12.40 | 385 |
| GOLD MINES OF KALGOORLIE LIMITED | 456.82 | 9.80 | 550 |
| NILIGINI MINING LIMITED | 448.15 | 14.80 | 893 |

MINING AND OIL - M. CAP. BETWEEN 50M AND 200M

| STOCK NAME | % RISE | PRICE | M.CAP (MILL) |
|---|---|---|---|
| HELIX RESOURCES N.L. | 1270.37 | 7.40 | 134 |
| MAWSON PACIFIC LIMITED | 1188.46 | 3.35 | 55 |
| NORTH QUEENSLAND RESOURCES N.L. | 1133.33 | 1.85 | 57 |
| COOPERS RESOURCES NO LIABILITY | 1100.00 | 9.00 | 90 |
| BROKEN HILL METALS N.L. | 1003.55 | 3.70 | 130 |
| AUGOLD N.L. | 925.00 | 2.05 | 57 |
| BENDIGO MINING N.L. | 879.38 | 1.90 | 67 |
| MT.CARRINGTON MINES LIMITED | 838.44 | 8.10 | 108 |
| STRATEGIC MINERALS CORPORATION N.L. | 787.10 | 2.75 | 103 |
| RAMSGATE RESOURCES LIMITED | 771.55 | 0.95 | 54 |
| GOLDEN GROVE MINING N.L. | 771.59 | 3.80 | 74 |
| RIVERINA GOLD N.L. | 751.53 | 1.85 | 67 |
| INDEPENDENT RESOURCES LIMITED | 733.33 | 10.00 | 107 |
| TRANSCONTINENTAL HOLDINGS LIMITED | 712.50 | 0.85 | 54 |
| LITTLE RIVER GOLDFIELDS N.L. | 658.06 | 2.35 | 76 |

MINING AND OIL - M.CAP. LESS THAN 50M

| STOCK NAME | % RISE | PRICE | M.CAP (MILL) |
|---|---|---|---|
| NEW AUSTRALIAN RESOURCES N.L. | 2500.00 | 2.80 | 38 |
| CHARTER MINING N.L. | 1576.47 | 0.57 | 12 |
| MAITLAND MINING N.L. | 958.82 | 1.80 | 44 |
| KALGOORLIE RESOURCES N.L. | 842.56 | 0.33 | 37 |
| FALCON AUSTRALIA LIMITED | 820.57 | 0.65 | 41 |
| AUDMCO LIMITED | 733.33 | 0.25 | 11 |
| GREAT AUSTRALIA RESOURCES N.L. | 712.50 | 0.65 | 13 |
| CENTRAL VICTORIAN GOLD MINES N.L. | 666.67 | 0.23 | 19 |
| M.C. MINING N.L. | 650.00 | 1.05 | 27 |
| ROEBUCK RESOURCES N.L. | 625.55 | 2.30 | 40 |
| A.R.I. LIMITED | 614.29 | 1.00 | 33 |
| AUSTRALIAN UNITED GOLD N.L. | 612.50 | 0.57 | 19 |
| TERN MINERALS LIMITED | 611.74 | 2.00 | 26 |
| ALLSTATE EXPLORATIONS N.L. | 568.67 | 1.20 | 15 |
| PAN PACIFIC PETROLEUM N.L. | 566.67 | 0.20 | 25 |

FIGURE 24                          WORST PERFORMING STOCKS - LAST WEEK                                    17.7.87

| INDUSTRIAL STOCKS - M.CAP > 200M | | | | MINING AND OIL - M.CAP. > 200M | | | |
|---|---|---|---|---|---|---|---|
| STOCK NAME | % FALL | PRICE | M.CAP (MILL) | STOCK NAME | % FALL | PRICE | M.CAP (MILL) |
| ADELAIDE BRIGHTON CEMENT HOLDINGS LIMITED | 8.00 | 2.30 | 313 | ASHTON MINING LIMITED | 5.26 | 3.80 | 710 |
| HUMES LIMITED | 5.38 | 2.85 | 573 | METALS EXPLORATION LIMITED | 2.70 | 1.80 | 246 |
| ARGO INVESTMENTS LIMITED | 5.00 | 2.85 | 259 | BOUGAINVILLE COPPER LIMITED | 2.45 | 4.78 | 1617 |
| ACMEX HOLDINGS LIMITED | 4.76 | 8.00 | 207 | C S R LIMITED | 0.08 | 3.95 | 2750 |
| A C I INTERNATIONAL LIMITED | 4.44 | 4.30 | 1713 | PEKO-WALLSEND LIMITED | 0.00 | 7.80 | 1368 |
| CUMBERLAND CREDIT CORPORATION LIMITED | 4.17 | 0.82 | 235 | ABERFOYLE LIMITED | 0.00 | 6.90 | 473 |
| ARIADNE AUSTRALIA LIMITED | 3.70 | 2.60 | 1284 | CENTAUR MINING & EXPLORATION LIMITED | 0.00 | 3.00 | 285 |
| MCPHERSONS LIMITED | 3.23 | 1.50 | 205 | BARRACK MINES LIMITED | 0.00 | 4.50 | 289 |
| AUSTRALIAN ASSEST MANAGEMENT LIMITED | 3.03 | 1.60 | 249 | C R A LIMITED | -0.48 | 10.50 | 5840 |
| JOHN FAIRFAX LIMITED | 2.94 | 4.95 | 1485 | ENERGY RESOURCES OF AUSTRALIA LIMITED | -1.82 | 2.80 | 1148 |
| LEND LEASE CORPORATION LIMITED | 2.74 | 15.95 | 2056 | HAMPTON AUSTRALIA LIMITED | -1.85 | 5.50 | 214 |
| JAMES HARDIE INDUSTRIES LIMITED | 2.44 | 4.00 | 978 | NIUGINI MINING LIMITED | -2.07 | 14.00 | 833 |
| INTERNATIONAL INCOME PROPERTY INC | 2.17 | 22.50 | 255 | NORTH FLINDERS MINES LIMITED | -2.07 | 14.50 | 530 |
| S A BREWING HOLDINGS LIMITED | 2.16 | 3.62 | 898 | WEEKS PETROLEUM LIMITED | -2.27 | 11.25 | 733 |
| AMCOR LIMITED | 2.00 | 4.90 | 1635 | SONS OF GWALIA N L | -2.27 | 13.50 | 397 |

| INDUSTRIAL STOCKS - M. CAP. BETWEEN 50M AND 200M | | | | MINING AND OIL - M. CAP. BETWEEN 50M AND 200M | | | |
|---|---|---|---|---|---|---|---|
| STOCK NAME | % FALL | PRICE | M.CAP (MILL) | STOCK NAME | % FALL | PRICE | M.CAP (MILL) |
| CHUAN HUP AUSTRALIA LIMITED | 15.69 | 1.50 | 126 | CLIMAX MINING LIMITED | 11.54 | 1.15 | 102 |
| PETER KURTS PROPERTIES LIMITED | 15.38 | 1.10 | 50 | OIL COMPANY OF AUSTRALIA N L | 11.11 | 0.80 | 81 |
| ENTRAD CORPORATION LIMITED | 13.51 | 1.60 | 124 | AUSTPAC GOLD N L | 10.75 | 0.83 | 71 |
| WALTONS BOND LIMITED | 10.26 | 0.35 | 81 | EROMANGA HYDROCARBONS N L | 8.57 | 0.32 | 77 |
| HEALTH AND LIFE CARE LIMITED | 9.68 | 1.40 | 77 | A.O.G. MINERALS LIMITED | 7.69 | 0.50 | 88 |
| DANOMIC INVESTMENTS LIMITED | 8.57 | 1.60 | 154 | KULIM LIMITED | 7.14 | 1.30 | 81 |
| JONRAY HOLDINGS LIMITED | 8.33 | 1.65 | 66 | RIVERINA GOLD N L | 7.14 | 1.95 | 67 |
| PRO-IMAGE STUDIO LIMITED | 8.00 | 2.30 | 153 | CHASE MINERALS N L | 6.67 | 1.40 | 62 |
| SEA WORLD PROPERTY TRUST | 6.67 | 0.70 | 130 | WEST COAST HOLDINGS LIMITED | 5.71 | 0.66 | 56 |
| TELECASTERS NORTH QUEENSLAND | 6.54 | 4.00 | 94 | ENTERPRISE GOLD MINES N L | 5.26 | 1.80 | 145 |
| QUEENSLAND INVESTMENT TRUST | 6.25 | 1.05 | 65 | ASTRO MINING N L | 5.17 | 2.75 | 100 |
| CITIES OF AUSTRALIA PROPERTY TRUST; THE | 6.25 | 0.75 | 107 | THAMES MINING N L | 5.00 | 0.65 | 79 |
| U.T.C. LIMITED | 5.88 | 1.60 | 73 | PETROLEUM SECURITIES AUSTRALIA LIMITED | 4.55 | 1.05 | 51 |
| GILTNET LIMITED | 5.71 | 1.65 | 82 | KIA ORA GOLD CORPORATION N L | 4.55 | 1.05 | 71 |
| NATIONAL PROPERTIES LIMITED | 5.56 | 2.50 | 78 | BARCOO PETROLEUM N L | 4.00 | 0.48 | 53 |

| INDUSTRIAL STOCKS - M. CAP LESS THAN 50M | | | | MINING AND OIL - M.CAP. LESS THAN 50M | | | |
|---|---|---|---|---|---|---|---|
| STOCK NAME | % FALL | PRICE | M.CAP (MILL) | STOCK NAME | % FALL | PRICE | M.CAP (MILL) |
| THOMPSONLAND LIMITED | 63.33 | 1.10 | 17 | MOGUL MINING N L | 40.00 | 0.30 | 3 |
| WATER HOLDINGS LIMITED | 58.33 | 1.50 | 8 | MEEKATHARRA MINERALS LIMITED | 17.24 | 1.20 | 23 |
| GEARHART AUSTRALIA LIMITED | 38.00 | 0.31 | 5 | HAWKSTONE INVESTMENTS LIMITED | 16.67 | 0.05 | 4 |
| PIPERCROSS TECHNOLOGY LIMITED | 35.71 | 0.18 | 5 | GOLDRIM MINING AUSTRALIA LIMITED | 16.67 | 0.50 | 2 |
| LASER LAB LIMITED | 28.57 | 0.25 | 3 | MARY KATHLEEN URANIUM | 15.00 | 0.17 | 13 |
| D.A. ULTRASONICIS LIMITED | 28.00 | 0.36 | 2 | CENTRAL VICTORIAN GOLD MINES N.L. | 14.81 | 0.23 | 18 |
| RANCOO LIMITED | 26.67 | 1.10 | 6 | ORCA PETROLEUM N L | 14.29 | 0.12 | 14 |
| NEWHAVEN PARK STUD LIMITED | 25.00 | 0.30 | 17 | STIRLING PETROLEUM N L | 14.29 | 0.06 | 10 |
| CASHMASTER LIMITED | 25.00 | 0.09 | 1 | KALBARRA MINING N L | 14.00 | 0.43 | 18 |
| CENTRECLEAN LIMITED | 21.05 | 0.30 | 6 | GEM EXPLORATION & MINERALS LIMITED | 12.90 | 1.35 | 28 |
| MONITRONIX LIMITED | 18.75 | 0.13 | 3 | GOLD PARTNERS N L | 12.50 | 0.35 | 9 |
| DAWEBANK INTERNATIONAL LIMITED | 18.67 | 0.61 | 15 | MOUNT KERBEY MINING N L | 12.50 | 1.40 | 34 |
| AUSTRALIAN METALS EXCHANGE LIMITED | 18.33 | 0.49 | 8 | WESTRALIAN GOLD MINES LIMITED | 12.00 | 0.22 | 8 |
| ACCESS TECHNOLOGY LIMITED | 18.18 | 0.18 | 3 | CHARTERS TOWERS MINES N L | 11.11 | 0.80 | 29 |
| VICTORY ARMAMENTS LIMITED | 17.39 | 0.95 | 6 | ZANEX LIMITED | 10.71 | 0.25 | 31 |

FIGURE 25                    WORST PERFORMING STOCKS - LAST 5 WEEKS                    17.7.87

INDUSTRIAL STOCKS - M.CAP > 200M

| STOCK NAME | % FALL | PRICE | M.CAP (MILL) |
|---|---|---|---|
| ARIADNE AUSTRALIA LIMITED | 19.50 | 2.80 | 1264 |
| QUATRO LIMITED | 12.81 | 1.70 | 457 |
| AUSTRALIAN ASSET MANAGEMENT LIMITED | 11.11 | 1.60 | 249 |
| INDUSTRIAL & PASTROL HOLDINGS LIMITED | 10.00 | 3.97 | 334 |
| C-C BOTTLERS LIMITED | 8.24 | 3.12 | 225 |
| F H FAULDING & COMPANY LIMITED | 8.59 | 5.00 | 216 |
| ACMEX HOLDINGS LIMITED | 8.25 | 6.00 | 207 |
| BATTERY GROUP LIMITED | 5.70 | 2.20 | 203 |
| ADELAIDE STEAMSHIP COMPANY LIMITED, THE | 4.30 | 6.80 | 1326 |
| ADELAIDE BRIGHTON CEMENT HOLDINGS LIMITED | 4.17 | 2.30 | 313 |
| WESTFIELD CAPITAL CORPORATION LIMITED | 3.85 | 1.25 | 527 |
| STOCKLAND TRUST | 3.67 | 2.38 | 497 |
| JOHN FAIRFAX LIMITED | 3.57 | 4.95 | 1495 |
| BRICK & PIPE INDUSTRIES LIMITED | 3.23 | 3.00 | 201 |
| QUEENSLAND CEMENT & LIME COMPANY LIMITED; THE | 2.56 | 3.80 | 272 |

INDUSTRIAL STOCKS - M. CAP. BETWEEN 50M AND 200M

| STOCK NAME | % FALL | PRICE | M.CAP (MILL) |
|---|---|---|---|
| CORONET EQUITIES NEW ZEALAND LIMITED | 35.71 | 0.45 | 74 |
| NZI-BRICK SECURITIES PROPERTY TRUST | 27.59 | 1.05 | 63 |
| A P A HOLDINGS LIMITED | 22.22 | 0.70 | 86 |
| GILTNEY LIMITED | 18.72 | 1.85 | 82 |
| OAKMINSTER HOLDINGS LIMITED | 18.37 | 0.80 | 54 |
| BARWOW FARMLANDS LIMITED | 18.18 | 0.45 | 78 |
| TELEVISION WOLLONGONG TRANSMISSION LIMITED | 17.86 | 1.15 | 66 |
| CORONET AUSTRALIA LIMITED | 17.86 | 1.15 | 88 |
| JONRAY HOLDINGS LIMITED | 17.50 | 1.86 | 68 |
| NATIONAL PROPERTIES LIMITED | 16.67 | 2.50 | 78 |
| U.T.C. LIMITED | 15.79 | 1.60 | 73 |
| WESTERN UNITED HOLDINGS LIMITED | 14.81 | 1.15 | 59 |
| LATEC INVESTMENTS LIMITED | 14.29 | 0.30 | 121 |
| BETATENE LIMITED | 14.28 | 3.00 | 86 |
| SCALZO AUTOMOTIVE RESEARCH LIMITED | 13.64 | 0.95 | 57 |

INDUSTRIAL STOCKS - M. CAP LESS THAN 50M

| STOCK NAME | % FALL | PRICE | M.CAP (MILL) |
|---|---|---|---|
| ACTION GOLD DEVELOPMENT LIMITED | 60.11 | 0.37 | 3 |
| CAMPBELL GROUP LIMITED | 56.22 | 0.80 | 49 |
| WATER HOLDINGS LIMITED | 56.33 | 1.50 | 8 |
| POWERLINE AUSTRALIA LIMITED | 52.94 | 0.08 | 1 |
| RACADO INVESTMENT & FINANCE LIMITED | 50.00 | 0.25 | 4 |
| ARMTECH LIMITED | 48.00 | 0.26 | 12 |
| MEDICAL RESEARCH INTERNATIONAL LIMITED | 45.65 | 1.25 | 12 |
| I.S.R. CORPORATION LIMITED | 42.22 | 2.60 | 11 |
| M P C HOLDINGS LIMITED | 42.00 | 0.29 | 5 |
| ALLEN COMMUNICATION LIMITED | 41.67 | 0.35 | 18 |
| EQUITY TRUSTEES EXECUTIVES AND AGENCY COMPANY | 41.18 | 5.00 | 28 |
| TELEVISION NEW ENGLAND LIMITED | 40.00 | 1.50 | 37 |
| VECTOR CAPITAL LIMITED | 39.39 | 1.00 | 10 |
| POWER INTERNATIONAL LIMITED | 38.40 | 0.77 | 27 |
| MONITRONIX LIMITED | 38.10 | 0.13 | 3 |

MINING AND OIL - M. CAP. > 200M

| STOCK NAME | % FALL | PRICE | M.CAP (MILL) |
|---|---|---|---|
| METALS EXPLORATION LIMITED | 12.20 | 1.80 | 246 |
| ASHTON MINING LIMITED | 4.00 | 3.60 | 710 |
| KIDSTON GOLD MINES LIMITED | 3.85 | 7.50 | 837 |
| CENTAUR MINING & EXPLORATION LIMITED | 3.23 | 3.00 | 285 |
| GOLD MINES OF KALGOORLIE LIMITED | 2.00 | 9.80 | 550 |
| HAMPTON AUSTRALIA LIMITED | 1.79 | 5.50 | 214 |
| BOUGAINVILLE COPPER LIMITED | 0.83 | 4.78 | 1917 |
| CENTRAL NORSEMAN GOLD CORPORATION | 0.00 | 3.00 | 624 |
| C S R LIMITED | 0.00 | 3.95 | 2750 |
| AUSTRALIAN DEVELOPMENT LIMITED | 0.00 | 5.20 | 201 |
| PELSART RESOURCES N L | 0.00 | 1.00 | 240 |
| BARRACK MINES LIMITED | 0.00 | 4.50 | 289 |
| AUSTRALIAN OIL AND GAS CORPORATION LIMITED | -1.96 | 2.60 | 484 |
| ANGLO AMERICAN PACIFIC LIMITED | -2.17 | 2.35 | 289 |
| WOODSIDE PETROLEUM LIMITED | -2.33 | 2.20 | 1467 |

MINING AND OIL - M. CAP. BETWEEN 50M AND 200M

| STOCK NAME | % FALL | PRICE | M.CAP (MILL) |
|---|---|---|---|
| EROMANGA HYDROCARBONS N L | 20.00 | 0.32 | 77 |
| PETROLEUM SECURITIES AUSTRALIA LIMITED | 18.23 | 1.05 | 51 |
| KULIM LIMITED | 18.13 | 1.30 | 91 |
| A.O.G. MINERALS LIMITED | 14.29 | 0.60 | 88 |
| METRAMAR MINERALS LIMITED | 13.88 | 1.55 | 50 |
| TRANSCONTINENTAL HOLDINGS LIMITED | 13.33 | 0.65 | 54 |
| BARCOO PETROLEUM N L | 12.73 | 0.48 | 53 |
| MUSWELLBROOK ENERGY AND MINERALS LIMITED | 12.12 | 1.45 | 124 |
| GREAT CENTRAL MINES N L | 12.12 | 2.90 | 73 |
| WEST COAST HOLDINGS LIMITED | 12.00 | 0.66 | 56 |
| GOLDEN DEEPS LIMITED | 11.72 | 1.28 | 71 |
| PETROZ N L | 11.11 | 0.08 | 57 |
| A.U.R. N L | 10.34 | 1.30 | 67 |
| HILL MINERALS N L | 9.37 | 1.45 | 71 |
| BOULDER GOLD N L | 8.09 | 3.00 | 97 |

MINING AND OIL - M.CAP. LESS THAN 50M

| STOCK NAME | % FALL | PRICE | M.CAP (MILL) |
|---|---|---|---|
| EAST COAST MINERALS N L | 40.00 | 0.30 | 11 |
| MOGUL MINING N.L. | 40.00 | 0.30 | 3 |
| OLYMPUS RESOURCES LIMITED | 36.71 | 0.50 | 6 |
| TAURUS RESOURCES N L | 35.19 | 0.35 | 20 |
| MOUNT KERSEY MINING N L | 30.00 | 1.40 | 34 |
| JOHNSONS WELL MINING N L | 30.00 | 1.40 | 43 |
| GOLD PARTNERS N L | 29.59 | 0.35 | 9 |
| BRUCE RESOURCES N L | 28.57 | 0.75 | 38 |
| CENTRAL VICTORIAN GOLD MINES N L | 28.13 | 0.23 | 18 |
| CAPE RANGE OIL N L | 28.00 | 0.90 | 37 |
| BARRACK ENERGY LIMITED | 25.93 | 0.40 | 39 |
| SOUTHWEST GOLD MINES N L | 25.81 | 0.23 | 6 |
| LAVERTON GOLD N L | 25.53 | 0.35 | 12 |
| MALLINA HOLDINGS LIMITED | 25.00 | 0.24 | 2 |
| AUSTRALIAN DIAMOND EXPLORATION N L | 25.00 | 0.60 | 27 |

FIGURE 26

WORST PERFORMING STOCKS - LAST 13 WEEKS 17.7.87

INDUSTRIAL STOCKS-M.CAP > 200M

| STOCK NAME | % FALL | PRICE | M.CAP (MILL) |
|---|---|---|---|
| ARIADNE AUSTRALIA LIMITED | 23.53 | 2.80 | 1284 |
| COMPUTER POWERS LIMITED | 21.62 | 1.45 | 336 |
| BATTERY GROUP LIMITED | 17.29 | 2.20 | 203 |
| WESTFIELD CAPITAL CORPORATION LIMITED | 16.67 | 1.25 | 527 |
| INDUSTRIAL & PASTORAL HOLDINGS LIMITED | 16.85 | 3.97 | 334 |
| C-C BOTTLERS LIMITED | 16.44 | 3.12 | 225 |
| SARICH TECHNOLOGIES TRUST | 16.44 | 3.05 | 534 |
| NORTHERN STAR HOLDINGS LIMITED | 16.13 | 2.60 | 534 |
| QUATRO LIMITED | 15.28 | 1.70 | 447 |
| ACMEX HOLDINGS LIMITED | 11.76 | 8.00 | 207 |
| ADELAIDE BRIGHTON CEMENT HOLDINGS LIMITED | 11.54 | 2.30 | 313 |
| J.N. TAYLOR HOLDINGS LIMITED | 9.09 | 6.00 | 372 |
| NEWS CORPORATION LIMITED; THE | 8.94 | 20.10 | 6543 |
| HUMES LIMITED | 8.62 | 2.65 | 573 |
| CHASE CORPORATION LIMITED | 8.57 | 3.20 | 1452 |

INDUSTRIAL STOCKS-M. CAP. BETWEEN 50M AND 200M

| STOCK NAME | % FALL | PRICE | M.CAP (MILL) |
|---|---|---|---|
| A.P.A. HOLDINGS LIMITED | 53.33 | 0.70 | 88 |
| JONRAY HOLDINGS LIMITED | 41.07 | 1.65 | 68 |
| U.T.C. LIMITED | 38.46 | 1.60 | 73 |
| CORONET AUSTRALIA LIMITED | 34.29 | 1.15 | 88 |
| OAKMINSTER HOLDINGS LIMITED | 30.43 | 0.80 | 54 |
| BCC INVESTMENTS LIMITED | 29.31 | 3.00 | 146 |
| OILMET RESOURCES N.L. | 28.04 | 0.78 | 88 |
| UNIVERSAL TELECASTERS LIMITED | 28.00 | 1.80 | 117 |
| ASSOCIATED BROADCASTING SERVICES LIMITED | 25.40 | 4.70 | 56 |
| BARROW FARMLANDS LIMITED | 25.00 | 0.45 | 78 |
| EUROLYNX LIMITED | 25.00 | 5.10 | 77 |
| CHARLES DAVIS LIMITED | 25.00 | 1.95 | 144 |
| AUSTEC INTERNATIONAL LIMITED | 23.91 | 1.75 | 62 |
| TELEVISION WOLLONGONG TRANSMISSION LIMITED | 23.33 | 1.15 | 68 |
| MINISKIPS LIMITED | 22.89 | 1.35 | 55 |

INDUSTRIAL STOCKS-M. CAP LESS THAN 50M

| STOCK NAME | % FALL | PRICE | M.CAP (MILL) |
|---|---|---|---|
| ACTION GOLD DEVELOPMENT LIMITED | 81.58 | 0.37 | 3 |
| ARMTECH LIMITED | 79.20 | 0.23 | 12 |
| EMBELTON LIMITED | 76.62 | 0.21 | 0 |
| DTX AUSTRALIA LIMITED | 75.00 | 0.15 | 1 |
| GRAND PRIX SAILING LIMITED | 73.33 | 0.12 | 18 |
| ALLEN COMMUNICATION LIMITED | 70.83 | 0.35 | 4 |
| WESTERN BIOTECHNOLOGY LIMITED | 68.97 | 0.20 | 8 |
| AUSTRALIAN METALS EXCHANGE LIMITED | 62.31 | 0.49 | 4 |
| ROCADO INVESTMENT & FINANCE LIMITED | 61.54 | 0.25 | 17 |
| AUSTRALIAN VENTURE CAPITAL LIMITED | 60.00 | 0.60 | 1 |
| POWERLINE AUSTRALIA LIMITED | 57.89 | 0.08 | 2 |
| D.A. ULTRASONICS LIMITED | 57.65 | 0.36 | 5 |
| PIPERCROSS TECHNOLOGY LIMITED | 52.63 | 0.18 | 3 |
| UNITEL CORPORATION LIMITED | 50.00 | 0.18 | 1 |
| MPES INDUSTRIES AUSTRALIA LIMITED | 50.00 | 0.45 | |

MINING AND OIL-M CAP. > 200M

| STOCK NAME | % FALL | PRICE | M.CAP (MILL) |
|---|---|---|---|
| BHP GOLD MINES LIMITED | 21.87 | 1.50 | 1455 |
| KIDSTON GOLD MINES LIMITED | 18.48 | 7.50 | 637 |
| CENTRAL NORSEMAN GOLD CORPORATION | 17.81 | 3.00 | 624 |
| SPARGOS EXPLORATION N.L. | 17.05 | 0.88 | 216 |
| BARRACK MINES LIMITED | 10.00 | 4.50 | 288 |
| ASHTON MINING LIMITED | 8.47 | 3.50 | 710 |
| PLACER DEVELOPMENT LIMITED | 7.98 | 24.00 | 2400 |
| TMOC RESOURCES LIMITED | 7.45 | 4.35 | 340 |
| SONS OF GWALIA N.L. | 8.90 | 13.50 | 397 |
| FORSAYTH N.L. | 8.02 | 4.90 | 400 |
| C S R LIMITED | 5.98 | 3.95 | 2750 |
| METALS EXPLORATION LIMITED | 5.26 | 1.80 | 248 |
| GIANT RESOURCES LIMITED | 4.51 | 3.30 | 1022 |
| WHIM CREEK CONSOLIDATED N.L | 4.51 | 12.40 | 365 |
| HAMPTON AUSTRALIA LIMITED | 0.00 | 5.50 | 214 |

MINING AND OIL-M. CAP. BETWEEN 50M AND 200M

| STOCK NAME | % FALL | PRICE | M.CAP (MILL) |
|---|---|---|---|
| CONSOLIDATED EQUITY AND FINANCE CORPORATION LTD | 38.17 | 3.00 | 87 |
| KALMANTAN GOLD N.L. | 31.34 | 0.48 | 63 |
| CLIMAX MINING LIMITED | 28.13 | 1.15 | 102 |
| HUNTER RESOURCES LIMITED | 27.27 | 1.60 | 148 |
| GRANTS PATCH MINING | 26.86 | 0.68 | 80 |
| ENTERPRISE GOLD MINES N.L. | 24.43 | 1.80 | 145 |
| WALHALLA MINING COMPANY N.L. | 24.22 | 2.50 | 76 |
| HILL MINERALS N.L. | 23.66 | 1.45 | 71 |
| GREAT CENTRAL MINES N.L. | 23.66 | 2.90 | 73 |
| GREAT VICTORIA GOLD LIMITED | 22.92 | 1.85 | 150 |
| ENDEAVOUR RESOURCES LIMITED | 22.86 | 0.54 | 124 |
| HAWK INVESTMENTS LIMITED | 21.54 | 5.10 | 197 |
| JINGELLIC MINERALS N.L. | 20.86 | 1.45 | 103 |
| THAMES MINING N.L. | 20.83 | 0.95 | 79 |
| MINOL SECURITIES N.L. | 20.41 | 0.78 | 175 |

MINING AND OIL-M.CAP. LESS THAN 50M

| STOCK NAME | % FALL | PRICE | M.CAP (MILL) |
|---|---|---|---|
| TEXAUST AUSTRALIA LIMITED | 60.00 | 0.16 | 2 |
| NORTHLAND MINERALS LIMITED | 52.17 | 1.10 | 13 |
| MARHLAND HOUSE LIMITED | 50.00 | 0.20 | 29 |
| LAVERTON GOLD N.L. | 48.90 | 0.35 | 12 |
| MOUNT KERSEY MINING N.L. | 48.15 | 1.40 | 34 |
| JOHNSON'S WELL MINING N.L. | 44.00 | 1.40 | 43 |
| AUROTECH N L | 41.38 | 0.17 | 9 |
| SEAMET LIMITED | 41.11 | 0.53 | 4 |
| TRIARC ENERGY LIMITED | 40.43 | 0.28 | 12 |
| MOGUL MINING N.L. | 40.00 | 0.30 | 3 |
| CONSOLIDATED GOLD MINING AREAS NO LIABILITY | 40.00 | 0.30 | 33 |
| ORCA PETROLEUM N L | 40.00 | 0.12 | 14 |
| NATQUEST LIMITED | 38.71 | 0.05 | 19 |
| AUDMACO LIMITED | 37.50 | 0.25 | 11 |
| KING MINING CORPORATION LIMITED | 37.14 | 0.22 | 6 |

FIGURE 27            WORST PERFORMING STOCKS - LAST 52 WEEKS                                17.7.87

| INDUSTRIAL STOCKS-M.CAP > 200M | | | | | MINING AND OIL-M CAP. > 200M | | | |
|---|---|---|---|---|---|---|---|---|
| STOCK NAME | % FALL | PRICE | M.CAP (MILL) | | STOCK NAME | % FALL | PRICE | M.CAP (MILL) |
| CHASE CORPORATION LIMITED | 31.70 | 3.20 | 1452 | | QUEENSLAND COAL TRUST | 5.45 | 1.58 | 789 |
| SARICH TECHNOLOGIES TRUST | 15.28 | 3.05 | 534 | | KIDSTON GOLD MINES LIMITED | -25.00 | 7.50 | 937 |
| WORMWALD INTERNATIONAL LIMITED | 15.00 | 3.40 | 460 | | C S R LIMITED | -36.44 | 3.95 | 2750 |
| EQUITICORP TASMAN LIMITED | 11.54 | 1.15 | 402 | | HOWARD SMITH LIMITED | -44.19 | 5.40 | 607 |
| KRAFT INCORPORATED | 5.28 | 75.00 | 12355 | | PEKO-WALLSEND LIMITED | -50.00 | 7.80 | 1398 |
| SUNSHINE AUSTRALIA LIMITED | 3.84 | 2.65 | 282 | | WEEKS PETROLEUM LIMITED | -50.00 | 11.25 | 733 |
| ADELAIDE STEAMSHIP COMPANY LIMITED; THE | 1.57 | 8.90 | 1328 | | BROKEN HILL PROPRIETARY COMPANY LIMITED; THE | -55.90 | 10.40 | 16183 |
| WESTFIELD CAPITAL CORPORATION LIMITED | 0.18 | 1.25 | 527 | | BELL RESOURCES LIMITED | -66.09 | 5.26 | 3504 |
| MIRAGE RESORTS TRUST | 0.00 | 2.60 | 252 | | AUSTRALIAN OIL AND GAS CORPORATION LIMITED | -73.10 | 2.60 | 494 |
| AUSTRALIAN GUARANTEE CORPORATION LIMITED | -1.48 | 2.60 | 989 | | PLACER DEVELOPMENT LIMITED | -74.55 | 24.00 | 2400 |
| NORTHERN STAR HOLDINGS LIMITED | -4.08 | 2.80 | 634 | | COMALCO LIMITED | -85.78 | 4.05 | 2270 |
| BRIERLEY INVESTMENTS LIMITED | -5.28 | 3.85 | 4046 | | BOUGAINVILLE COPPER LIMITED | -89.68 | 4.78 | 1817 |
| INTERNATIONAL INCOME PROPERTY INC | -7.14 | 22.50 | 255 | | VAMGAS LIMITED | -90.24 | 3.90 | 282 |
| BURSWOOD PROPERTY TRUST | -7.14 | 0.60 | 242 | | ENERGY RESOURCES OF AUSTRALIA LIMITED | -90.48 | 2.80 | 1148 |
| ARIADNE AUSTRALIA LIMITED | -9.84 | 2.60 | 1284 | | C R A LIMITED | -90.84 | 10.50 | 5840 |

| INDUSTRIAL STOCKS-M. CAP. BETWEEN 50M AND 200M | | | | | MINING AND OIL-M. CAP. BETWEEN 50M AND 200M | | | |
|---|---|---|---|---|---|---|---|---|
| STOCK NAME | % FALL | PRICE | M.CAP (MILL) | | STOCK NAME | % FALL | PRICE | M.CAP (MILL) |
| A P A HOLDINGS LIMITED | 73.58 | 0.70 | 86 | | OAKBRIDGE LIMITED | 12.50 | 0.59 | 101 |
| JONRAY HOLDINGS LIMITED | 62.50 | 1.65 | 68 | | BEACH PETROLEUM LIMITED | -2.78 | 0.74 | 82 |
| SCALZO AUTOMOTIVE RESEARCH LIMITED | 47.22 | 0.95 | 57 | | OIL COMPANY OF AUSTRALIA N L | -14.29 | 0.60 | 81 |
| MINISKIPS LIMITED | 48.00 | 1.35 | 55 | | COAL & ALLIED INDUSTRIES LIMITED | -14.83 | 4.70 | 148 |
| KINGSGATE INTERNATIONAL CORPORATION LIMITED | 35.71 | 0.45 | 115 | | CONSOLIDATED EQUITY AND FINANCE CORPORATION LTC | -25.00 | 3.00 | 87 |
| DIRECT ACCEPTANCE CORPORATION LIMITED | 29.41 | 0.60 | 52 | | WESTRALIAN SANDS LIMITED | -30.87 | 2.45 | 116 |
| B.T. INSURANCE HOLDINGS LIMITED | 27.93 | 0.32 | 71 | | PETROZ N L | -35.59 | 0.08 | 57 |
| AUSTRALIAN OVERSEAS INVESTMENTS LIMITED | 25.23 | 0.98 | 105 | | QUEENSLAND METALS CORPORATION N.L | -45.83 | 3.50 | 131 |
| ENTRAD CORPORATION LIMITED | 23.81 | 1.00 | 124 | | WESTERN AUSTRALIAN DIAMON TRUST | -47.09 | 1.25 | 81 |
| HASTINGS DEERING FINANCE AND INVESTMENT CO LTD. | 23.02 | 1.05 | 69 | | METRAMAR MINERALS LIMITED | -55.00 | 1.55 | 50 |
| CEREUS AUSTRALIA LIMITED | 21.05 | 3.75 | 50 | | WAHALLA MINING COMPANY N.L | -62.55 | 2.50 | 78 |
| DANOMIC INVESTMENTS LIMITED | 20.87 | 1.60 | 154 | | KALIMANTAN GOLD N.L. | -84.87 | 0.48 | 63 |
| U.T.C. LIMITED | 14.16 | 1.60 | 73 | | KIA ORA GOLD CORPORATION N.L | -75.00 | 1.05 | 71 |
| STANDARD CHARTERED BANK AUSTRALIA LIMITED | 11.54 | 1.15 | 116 | | KULIM LIMITED | -76.39 | 1.30 | 91 |
| ASPERMONT LIMITED | 9.69 | 7.00 | 87 | | CARR BOYD MINERALS LIMITED | -76.72 | 2.05 | 130 |

| INDUSTRIAL STOCKS-M. CAP LESS THAN 50M | | | | | MINING AND OIL-M.CAP. LESS THAN 50M | | | |
|---|---|---|---|---|---|---|---|---|
| STOCK NAME | % FALL | PRICE | M.CAP (MILL) | | STOCK NAME | % FALL | PRICE | M.CAP (MILL) |
| AUSTRALIAN METALS EXCHANGE LIMITED | 86.98 | 0.49 | 8 | | ALBERTA MINES N.L. | 82.63 | 0.14 | 4 |
| QUOKKA INVESTMENTS LIMITED | 85.19 | 0.20 | 2 | | INTERIMN RESOURCE CORPORATION LIMITED | 72.00 | 0.35 | 21 |
| ARMTECH LIMITED | 84.24 | 0.26 | 12 | | WESTERN REEFS LIMITED | 68.71 | 0.23 | 12 |
| ROCADO INVESTMENT & FINANCE LIMITED | 83.20 | 0.25 | 4 | | CONSOLIDATED RESOURCES N.L | 50.00 | 0.05 | 5 |
| EMBELTON LIMITED | 79.63 | 0.21 | 0 | | OLYMPUS RESOURCES LIMITED | 47.37 | 0.50 | 8 |
| UNITY CORPORATION LIMITED | 79.17 | 1.00 | 28 | | CENTRAL MURCHISON GOLD LIMITED | 37.50 | 0.55 | 10 |
| ALLEN COMMUNICATION LIMITED | 78.26 | 0.35 | 18 | | REGENT MINING LIMITED | 30.00 | 0.14 | 13 |
| DTX AUSTRALIA LIMITED | 75.00 | 0.15 | 3 | | AUSTRALIAN MINING INVESTMENTS LIMITED | 21.43 | 1.10 | 14 |
| WESTERN BIOTECHNOLOGY LIMITED | 75.00 | 0.20 | 4 | | AUSTEN & BUTTA LIMITED | 21.05 | 0.54 | 48 |
| TAG PACIFIC LIMITED | 74.58 | 0.60 | 16 | | PAGET GOLD MINING COMPANY LIMITED | 20.69 | 1.15 | 37 |
| PIPERCROSS TECHNOLOGY LIMITED | 72.73 | 0.16 | 5 | | MERIDAN OIL N L | 20.42 | 0.23 | 10 |
| MICROBEE SYSTEMS LIMITED | 70.00 | 0.12 | 2 | | ZANEX LIMITED | 18.18 | 0.16 | 34 |
| BRAEMAR LIMITED | 66.97 | 0.30 | 5 | | PETRO GULF RESOURCES LIMITED | 10.71 | 0.28 | 31 |
| AUSTRALIAN VENTURE CAPITAL LIMITED | 65.22 | 0.60 | 17 | | ALLIED QUEENSLAND COALFIELDS LIMITED | 7.41 | 0.25 | 10 |
| LASER-TECH AUSTRALIA LIMITED | 60.53 | 0.15 | 2 | | | 0.00 | 0.50 | 13 |

FIGURE 28

COMMODITY PRICES 17.7.87

U.S.DOLLARS

| | | | PERCENTAGE CHANGE FROM | | | |
|---|---|---|---|---|---|---|
| COMMODITIES | UNITS | PRICE | 52 WKS AGO | 13 WKS AGO | 5 WKS AGO | 1 WK AGO |
| WEST TEXAS INT. NY | BARREL | 22.40 | 73.64 | 20.04 | 12.79 | 5.02 |
| GOLD (NEW YORK) | TROY OZ | 450.80 | 29.45 | 2.95 | -1.05 | 1.33 |
| PLATINUM (NY) | TROY OZ | 573.50 | 30.34 | -1.97 | -1.97 | 2.78 |
| PALLADIUM (NY) | TROY OZ | 141.00 | 24.76 | 2.17 | 0.71 | 0.71 |
| SILVER (NEW YORK) | TROY OZ | 753.50 | 48.47 | 5.02 | -2.14 | -1.37 |
| COPPER (LONDON) | TONNE | 1603.11 | 25.10 | 10.99 | 3.66 | -2.02 |
| LEAD (LONDON) | TONNE | 668.51 | 80.44 | 16.81 | 4.67 | -2.28 |
| NICKEL (LONDON) | TONNE | 4940.42 | 26.42 | 25.05 | 7.60 | 6.69 |
| ZINC HG (LONDON) | TONNE | 811.99 | 0.60 | 8.09 | -12.51 | -4.69 |
| ALUMINIUM (LONDON) | TONNE | 1684.31 | 51.64 | 16.59 | 12.75 | 3.35 |
| COTTON (NEW YORK) | LB. | 73.37 | 12.02 | 28.56 | 2.43 | 2.00 |
| SUGAR (LONDON) | TONNE | 162.72 | 23.03 | -8.86 | -4.15 | -6.98 |

16. EXCHANGE RATES

| | | PERCENTAGE CHANGE FROM | | | |
|---|---|---|---|---|---|
| CURRENCIES | BUY RATE | 52 WKS AGO | 13 WKS AGO | 5 WKS AGO | 1 WK AGO |
| TRADE WEIGHTED INDEX | 55.00 | 5.87 | 0.00 | 0.54 | -0.96 |
| U.S. DOLLAR | 0.71 | 10.92 | -1.26 | -1.26 | 0.07 |
| BRITISH POUND | 0.43 | 3.01 | -1.03 | 0.77 | -0.55 |
| JAPANESE YEN | 106.84 | 6.59 | 4.95 | 4.58 | 0.44 |
| NEW ZEALAND DOLLAR | 1.16 | -2.13 | -5.13 | -4.24 | -0.83 |
| WEST GERMAN DEUTSCHE MARK | 1.30 | -4.98 | 0.33 | 1.17 | 0.04 |
| HONG KONG DOLLAR | 5.55 | 10.80 | -1.11 | -1.23 | 0.11 |
| SWISS FRANC | 1.09 | -2.43 | 1.50 | 1.88 | -0.18 |
| FRENCH FRANC | 4.33 | -2.15 | 0.44 | 0.66 | -0.35 |
| SINGAPORE DOLLAR | 1.50 | 7.74 | -1.96 | -0.79 | 0.00 |
| ITALIAN LIRA | 942.00 | -0.21 | 1.84 | 1.40 | -0.32 |
| PAPUA NEW GUINEA KINA | 0.64 | 4.36 | -0.32 | 0.33 | 0.08 |

AUSTRALIAN DOLLARS

| | | | PERCENTAGE CHANGE FROM | | | |
|---|---|---|---|---|---|---|
| COMMODITIES | UNITS | PRICE | 52 WKS AGO | 13 WKS AGO | 5 WKS AGO | 1 WK AGO |
| WEST TEXAS INT. NY | BARREL | 31.56 | 56.13 | 20.41 | 14.12 | 4.71 |
| GOLD (NEW YORK) | TROY OZ | 634.83 | 16.39 | 3.27 | 0.12 | 1.03 |
| PLATINUM (NY) | TROY OZ | 807.97 | 17.19 | -1.06 | -0.81 | 2.47 |
| PALLADIUM (NY) | TROY OZ | 198.65 | 12.19 | 2.49 | 1.91 | 0.42 |
| SILVER (NEW YORK) | TROY OZ | 1061.57 | 33.50 | 5.34 | -0.98 | -1.97 |
| COPPER (LONDON) | TONNE | 2343.07 | 12.48 | 11.33 | 4.88 | -2.31 |
| LEAD (LONDON) | TONNE | 941.82 | 82.24 | 17.17 | 8.11 | -2.87 |
| NICKEL (LONDON) | TONNE | 6960.26 | 13.67 | 26.44 | 9.08 | 6.37 |
| ZINC HG (LONDON) | TONNE | 1143.07 | -9.64 | 9.43 | -11.48 | -4.97 |
| ALUMINIUM (LONDON) | TONNE | 2372.93 | 39.34 | 16.95 | 14.09 | 3.05 |
| COTTON (NEW YORK) | LB. | 103.37 | 0.72 | 30.26 | 3.64 | 1.70 |
| SUGAR (LONDON) | TONNE | 229.25 | 10.62 | -8.58 | -3.02 | -7.24 |

COMMODITY PRICES / 16. EXCHANGE RATES

FIGURE 29

TAKEOVER WATCH

19 JUNE 1987

INDUSTRIALS

| STOCK NAME | MKT CAP GREATER THAN 200M | | |
|---|---|---|---|
| | 13- WEEK VOL/INDEX | PRICE ($) | MKT CAP ($M) |
| MIRAGE RESORTS TRUST | 5.26 | 2.55 | 230 |
| MONIER LIMITED | 5.00 | 4.15 | 849 |
| DAVID JONES LTD | 3.69 | 10.10 | 1054 |
| PIONEER SUGAR MILLS LTD | 3.64 | 2.54 | 304 |
| AIRSHIP INDUSTRIES LTD | 3.28 | 0.65 | 216 |
| BONDS COATS PATONS LTD | 3.22 | 5.64 | 226 |
| ADELAIDE STEAMSHIP CO LTD; THE | 2.28 | 8.20 | 1222 |
| ARIADNE AUSTRALIA LTD | 2.10 | 2.63 | 1424 |
| AUSTRALIAN ASSET MANAGEMENT LTD | 1.98 | 1.85 | 257 |
| NATIONAL AUSTRALIA BANK LTD | 1.89 | 4.60 | 2501 |
| HELM CORPORATION | 1.78 | 4.70 | 229 |
| SUNSHINE AUSTRALIA LTD | 1.32 | 2.55 | 271 |
| BOND CORPORATION HOLDINGS LTD | 1.29 | 2.50 | 1057 |
| LINTER GROUP LTD | 1.22 | 8.10 | 371 |
| KERN CORPORATION LTD | 0.76 | 2.90 | 402 |

| STOCK NAME | MKT CAP 50M - 200M | | |
|---|---|---|---|
| | 13- WEEK VOL/INDEX | PRICE ($) | MKT CAP ($M) |
| LATEC INVESTMENTS LTD | 12.79 | 0.31 | 125 |
| BOTENA INVESTMENTS LTD | 8.38 | 4.40 | 158 |
| METRO INDUSTRIES LTD | 7.33 | 2.05 | 63 |
| KEMTRON LTD | 4.40 | 0.30 | 87 |
| UNIVERSAL WALDECK LTD | 3.84 | 1.38 | 87 |
| PARBURY HENTY HOLDINGS LTD | 3.54 | 2.00 | 84 |
| PINE VALE INVESTMENT LTD | 3.28 | 0.55 | 56 |
| CORONET RESOURCES N.L | 2.82 | 1.38 | 108 |
| AUSTORE PROPERTY TRUST | 2.78 | 0.73 | 83 |
| OVERSEAS STRATEGIC HOLDINGS LTD | 1.88 | 1.60 | 87 |
| COMREALTY LTD | 1.61 | 2.80 | 102 |
| NZI-BRICK SECURITIES PROPERTY TRUST | 1.54 | 1.65 | 99 |
| SHERWIN PASTORAL CO LTD | 1.02 | 0.85 | 61 |

| STOCK NAME | MKT CAP LESS THAN 50 M | | |
|---|---|---|---|
| | 13- WEEK VOL/INDEX | PRICE ($) | MKT CAP ($M) |
| MILDURA GRAND HOTEL LTD | 21.98 | 8.50 | 9 |
| VANGUARD INSURANCE CO. LTD | 13.62 | 1.00 | 14 |
| PELTEX INTERNATIONAL LTD | 13.30 | 2.80 | 2 |
| EQUITABLE PROPERTY TRUST | 7.40 | 1.80 | 31 |
| MULTI TRANSPORT HOLDINGS LTD | 6.94 | 0.45 | 2 |
| AUSWARD LTD | 5.97 | 0.45 | 4 |
| ENTERPRISE INVESTMENTS (S.A.) LTD | 5.30 | 0.48 | 7 |
| CONTINENTAL VENTURE CAPITAL LTD | 4.20 | 0.37 | 23 |
| AIR INTERNATIONAL GROUP LTD | 3.79 | 0.57 | 14 |
| C P VENTURES LTD | 3.20 | 1.20 | 41 |
| EQUITY FINANCE LTD | 3.14 | 1.15 | 45 |
| SYDNEY NEW TOKYO INVESTMENT TRUST | 3.11 | 1.25 | 24 |
| FINANCE AND DEVELOPMENT LTD | 2.28 | 0.90 | 7 |
| VICTORY ARMAMENTS LTD | 2.22 | 1.01 | 7 |
| ADELAIDE PROPERTY TRUST | 1.84 | 0.90 | 5 |
| CORD HOLDINGS LTD | 1.82 | 0.25 | 9 |
| DSA AUSTRALIA LTD | 1.13 | 1.30 | 14 |
| PENN SECURITIES LTD | 0.68 | 0.16 | 2 |

MINING & OIL

| STOCK NAME | MKT CAP GREATER THAN 200M | | |
|---|---|---|---|
| | 13- WEEK VOL/INDEX | PRICE ($) | MKT CAP ($M) |
| NORTH KALGURLI MINES LTD | 5.15 | 1.60 | 697 |
| AZTEC EXPLORATION LTD | 4.91 | 1.70 | 204 |
| METALS EXPLORATION | 4.61 | 1.85 | 253 |
| CITY RESOURCES LTD | 3.19 | 2.40 | 274 |
| BARRACK MINES LTD | 2.81 | 4.10 | 283 |
| GIANT RESOURCES LTD | 2.78 | 2.60 | 848 |
| HARTOGEN ENERGY LTD | 2.67 | 3.40 | 312 |
| C S R LTD | 2.65 | 4.05 | 2679 |
| NORTH FLINDERS MINES LTD | 2.61 | 12.00 | 429 |
| POSEIDON MINING LTD | 2.48 | 5.50 | 600 |
| HILL 50 GOLD MINE N.L | 2.33 | 1.85 | 231 |
| NUIGINI MINING LTD | 2.29 | 11.50 | 705 |
| METANA MINERALS N.L | 2.10 | 12.60 | 353 |
| WESTERN MINING CORPORATION HOLDINGS LTD | 2.09 | 6.42 | 4172 |
| EMPEROR MINES LTD | 2.03 | 8.70 | 293 |
| SANTOS LTD | 1.75 | 6.82 | 1801 |
| WHIM CREEK CONSOLIDATED N.L | 1.73 | 10.00 | 320 |
| CENTAUR MINING & EXPLORATION LTD | 1.58 | 3.05 | 280 |
| FORSAYTH N.L | 1.56 | 4.3 | 351 |
| CONSOLIDATED EXPLORATION LTD | 1.00 | 3.95 | 246 |

| STOCK NAME | MKT CAP 50M - 200M | | |
|---|---|---|---|
| | 13- WEEK VOL/INDEX | PRICE ($) | MKT CAP ($M) |
| KIA PACIFIC GOLD LTD | 8.66 | 0.53 | 52 |
| KALIMANTAN GOLD N.L | 6.63 | 0.44 | 81 |
| DOMINION MINING & OIL N.L | 5.67 | 2.30 | 193 |
| GOLDEN GROVE MINING N.L | 5.52 | 3.90 | 78 |
| JIMBERLANA MINERALS N.L | 5.01 | 0.57 | 156 |
| ACORN SECURITIES LTD | 3.90 | 2.30 | 90 |
| GOLDEN VALLEY MINES N.L | 3.41 | 0.95 | 90 |
| SOUTHERN PACIFIC PETROLEUM N.L | 2.92 | 0.60 | 178 |
| EASTERN GROUP LTD | 2.75 | 0.42 | 54 |
| NORMANDY RESOURCES N.L | 2.59 | 0.68 | 56 |
| WEST COAST HOLDINGS LTD | 2.48 | 1.20 | 162 |
| ALCAN AUSTRALIA LTD | 2.38 | 2.80 | 81 |
| CONSOLIDATED EQUITY & FINANCE CORP LTD | 2.13 | 1.50 | 111 |
| GOLCONDA MINERALS N.L | 1.95 | 3.15 | 52 |
| MAWSON PACIFIC LTD | 1.72 | 2.05 | 64 |
| NORTH QUEENSLAND RESOURCES N.L | 1.62 | 1.14 | 141 |
| CLAREMONT PETROLEUM N.L | 0.81 | 7.50 | 139 |
| HELIX RESOURCES N.L | 0.08 | 2.70 | 99 |
| ASTRO MINING N.L | | | |

| STOCK NAME | MKT CAP LESS THAN 50M | | |
|---|---|---|---|
| | 13- WEEK VOL/INDEX | PRICE ($) | MKT CAP ($M) |
| KALBARRA MINING N.L | 10.30 | 0.55 | 20 |
| MOUNT PLEASANT GOLD TRUST | 8.50 | 0.50 | 22 |
| OCEAN RESOURCES N.L | 8.38 | 0.60 | 8 |
| MACQUARIE OIL N.L | 8.20 | 0.50 | 12 |
| MINERAL COMMODITIES LTD | 6.38 | 0.30 | 10 |
| SOUTHERN CROSS EXPLORATION N.L | 5.22 | 0.18 | 8 |
| NEW AUSTRALIAN RESOURCES N.L | 5.14 | 2.30 | 32 |
| WATTLE GULLY GOLD MINES N.L | 4.59 | 0.23 | 7 |
| SABMINCO N.L | 4.50 | 0.08 | 21 |
| BAMBOO CREEK HOLDINGS LTD | 4.02 | 0.50 | 11 |
| METALTRADERS AUSTRALASIA LTD | 3.60 | 0.35 | 20 |
| CENTRAL VICTORIAN GOLD MINES N.L | 3.23 | 0.27 | 21 |
| NORTH GOLD N.L | 3.16 | 1.22 | 9 |
| MARY KATHLEEN URANIUM | 3.04 | 0.20 | 15 |
| STRATA OIL N.L | 2.92 | 0.20 | 13 |
| AUSTRALIAN OVERSEAS MINING LTD | 1.52 | 0.90 | 20 |

FIGURE 30

TAKEOVER WATCH                                                                 10.7.87

INDUSTRIAL STOCKS - M.CAP > 200M

| STOCK NAME | 13 WEEK VOLUME INDEX | PRICE | M.CAP (MILL) |
|---|---|---|---|
| BONDS COATS PATONS LIMITED | 7.73 | 6.30 | 243 |
| MONIER LIMITED | 5.33 | 4.15 | 649 |
| GEORGE WESTON FOODS LIMITED | 4.06 | 4.00 | 284 |
| ACMEX HOLDINGS LIMITED | 4.06 | 6.30 | 216 |
| WATTIE INDUSTRIES LIMITED | 2.79 | 4.50 | 1205 |
| MCPHERSONS LIMITED | 2.38 | 1.55 | 208 |
| FLETCHER CHALLENGE LIMITED | 2.35 | 4.70 | 4048 |
| LEND LEASE CORPORATION LIMITED | 2.33 | 18.40 | 2114 |
| AFP INVESTMENT CORPORATION LIMITED | 2.28 | 2.70 | 1292 |
| BOND CORPORATION HOLDINGS LIMITED | 1.98 | 2.80 | 3100 |
| AUSTRALIA & NEW ZEALAND BANKING GROUP LIMITED | 1.91 | 4.40 | 3071 |
| NATIONAL AUSTRALIA BANK LIMITED | 1.80 | 4.80 | 2501 |
| SUNSHINE AUSTRALIA LIMITED | 1.78 | 2.90 | 278 |
| AUSTRALIAN ASSET MANAGEMENT LIMITED | 1.72 | 1.65 | 257 |
| PACIFIC DUNLOP LIMITED | 1.24 | 5.04 | 2558 |
| CUMBERLAND CREDIT CORPORATION LIMITED | 0.87 | 0.66 | 245 |
| HOOKER CORPORATION LIMITED | 0.67 | 3.95 | 798 |

INDUSTRIAL STOCKS - M.CAP. BETWEEN 50M AND 200M

| STOCK NAME | 13 WEEK VOLUME INDEX | PRICE | M.CAP (MILL) |
|---|---|---|---|
| METRO INDUSTRIES LIMITED | 27.59 | 2.05 | 83 |
| LATEC INVESTMENTS LIMITED | 8.61 | 0.78 | 105 |
| INTER-PACIFIC EQUITY LIMITED | 4.81 | 2.98 | 147 |
| AUSTORE PROPERTY TRUST | 4.28 | 0.80 | 102 |
| FINE METALS CORPORATION LIMITED | 3.84 | 2.50 | 83 |
| EQUITY FINANCE LIMITED | 3.78 | 1.75 | 68 |
| PINE VALE INVESTMENTS LIMITED | 3.72 | 0.58 | 58 |
| KINGSGATE INTERNATIONAL CORPORATION LIMITED | 2.37 | 0.40 | 102 |
| ROTHWELLS LIMITED | 2.35 | 3.50 | 108 |
| SEA WORLD PROPERTY TRUST | 2.17 | 0.75 | 140 |
| KENTAUR LIMITED | 1.98 | 0.34 | 76 |
| OVERSEAS STRATEGIC HOLDINGS LIMITED | 1.84 | 1.65 | 68 |
| TTL CORPORATION LIMITED | 1.80 | 3.40 | 84 |
| CHALLENGE BANK LIMITED | 1.09 | 2.40 | 103 |

INDUSTRIAL STOCKS - M.CAP LESS THAN 50M

| STOCK NAME | 13 WEEK VOLUME INDEX | PRICE | M.CAP (MILL) |
|---|---|---|---|
| FELTEX INTERNATIONAL LIMITED | 55.81 | 2.70 | 2 |
| DENTRAC INDUSTRIES LIMITED | 13.30 | 0.45 | 3 |
| ALTRACK LIMITED | 10.47 | 1.50 | 41 |
| AUSTRAL GROUP LIMITED | 10.12 | 1.25 | 28 |
| AUSTRALIAN RESORT DEVELOPMENT LIMITED | 6.63 | 1.00 | 14 |
| WESTRALIAN FOREST INDUSTRIES LIMITED | 5.77 | 2.85 | 44 |
| JOYCE CORPORATION LIMITED | 5.69 | 1.85 | 10 |
| MULTI TRANSPORT HOLDINGS LIMITED | 2.74 | 0.50 | 3 |
| CORD HOLDINGS LIMITED | 1.62 | 0.29 | 11 |
| VICTORY ARMAMENTS LIMITED | 1.53 | 1.00 | 6 |
| DGA AUSTRALIA LIMITED | 1.38 | 1.10 | 12 |
| GOLDMIN INVESTMENTS LIMITED | 1.32 | 0.60 | 7 |
| PENO SECURITIES LIMITED | 1.00 | 0.18 | 2 |
| BADEN PACIFIC LIMITED | 0.56 | 0.65 | 5 |

MINING AND OIL-M.CAP. > 200M

| STOCK NAME | 13 WEEK VOLUME INDEX | PRICE | M.CAP (MILL) |
|---|---|---|---|
| ANGLO AMERICAN PACIFIC LIMITED | 6.32 | 1.85 | 227 |
| DOMINION MINING & OIL N.L. | 4.92 | 2.40 | 201 |
| NORTH KALGURLI MINES LIMITED | 3.24 | 1.60 | 697 |
| METALS EXPLORATION LIMITED | 3.73 | 1.85 | 253 |
| HILL 50 GOLD MINE N.L. | 2.56 | 2.15 | 295 |
| NORTH FLINDERS MINES LIMITED | 2.28 | 14.50 | 519 |
| M.I.M. HOLDINGS LIMITED | 2.28 | 2.72 | 2858 |
| NIUGINI MINING LIMITED | 2.09 | 14.50 | 615 |
| BELL RESOURCES LIMITED | 2.08 | 4.78 | 3098 |
| ALCAN AUSTRALIAN LIMITED | 1.95 | 1.35 | 235 |
| C R A LIMITED | 1.88 | 10.45 | 5812 |
| WESTERN MINING CORPORATION HOLDINGS LIMITED | 1.66 | 7.48 | 4547 |
| EMPEROR MINES LIMITED | 1.82 | 7.50 | 337 |
| QUEENSLAND COAL TRUST | 1.82 | 1.50 | 758 |
| METANA MINERALS N.L. | 1.48 | 13.00 | 386 |
| CONSOLIDATED EXPLORATION LIMITED | 1.47 | 4.77 | 295 |
| WHIM CREEK CONSOLIDATED N L | 1.37 | 10.00 | 335 |
| POSEIDON MINING LIMITED | 1.25 | 5 | 552 |
| PAN AUSTRALIA MINING LIMITED | 1.15 | 3.00 | 285 |
| FORSAYTH N.L. | 1.09 | 4.40 | 359 |

MINING AND OIL-M. CAP. BETWEEN 50M AND 200M

| STOCK NAME | 13 WEEK VOLUME INDEX | PRICE | M.CAP (MILL) |
|---|---|---|---|
| ACORN SECURITIES LIMITED | 3.77 | 2.50 | 56 |
| INDEPENDENT RESOURCES LIMITED | 3.70 | 10.00 | 107 |
| CONSOLIDATED EQUITY AND FINANCE CORPORATION LTD | 3.11 | 3.00 | 87 |
| RAMSGATE RESOURCES LIMITED | 2.90 | 0.90 | 51 |
| EASTNET LIMITED | 2.62 | 2.40 | 120 |
| LITTLE RIVER GOLDFIELDS N.L. | 2.40 | 2.40 | 57 |
| JIMBERLANA MINERALS N.L. | 2.23 | 0.55 | 155 |
| BONE ENERGY COMPANY LIMITED | 2.17 | 0.63 | 65 |
| CHASE MINERALS N.L. | 1.89 | 1.50 | 66 |
| SEDIMENTARY HOLDINGS LIMITED | 1.77 | 1.55 | 79 |
| MAWSON PACIFIC LIMITED | 1.77 | 3.20 | 52 |
| HELM RESOURCES LIMITED | 1.84 | 1.30 | 87 |
| CONSOLIDATED RUTILE LIMITED | 1.57 | 6.70 | 139 |
| NORTH QUEENSLAND RESOURCES N.L. | 1.53 | 1.85 | 57 |
| JASON MINING LIMITED | 1.35 | 2.50 | 113 |
| CHOEBUS MINING N.L. | 0.95 | 0.57 | 51 |
| ASTRO MINING N.L. | 0.75 | 2.90 | 108 |

MINING AND OIL-M.CAP. LESS THAN 50M

| STOCK NAME | 13 WEEK VOLUME INDEX | PRICE | M.CAP (MILL) |
|---|---|---|---|
| KALBARRA MINING N.L. | 8.12 | 0.52 | 20 |
| MACQUARIE OIL N.L. | 6.47 | 0.80 | 28 |
| OCEAN RESOURCES N.L. | 6.38 | 0.90 | 6 |
| NEW AUSTRALIAN RESOURCES N.L. | 5.00 | 2.50 | 35 |
| MOUNT PLEASANT GOLD TRUST | 4.47 | 0.50 | 22 |
| STRATA OIL N.L. | 3.42 | 0.24 | 15 |
| GREAT AUSTRALIA RESOURCES N.L. | 2.76 | 0.60 | 12 |
| JERVOIS SULPHATES (N.T.) LIMITED | 2.45 | 0.23 | 28 |
| WESTRALIAN GOLD MINES LIMITED | 2.35 | 0.26 | 9 |
| AUSTRALIAN UNITED GOLD N.L. | 2.28 | 0.55 | 16 |
| METALTRADERS AUSTRALASIA LIMITED | 2.21 | 0.30 | 17 |
| CARBON MINERALS N.L. | 2.18 | 0.28 | 7 |
| GOLDQUEST TECHNOLOGY LIMITED | 2.14 | 0.85 | 51 |
| AUSTRALIAN OVERSEAS MINING LIMITED | 1.54 | 0.80 | 20 |
| PERSEVERANCE CORPORATION LIMITED | 1.05 | 2.40 | 14 |

METHOD AND DATA PROCESS SYSTEM FOR ANALYSING AND TIMING BUY/SELL TIPS AS AN AID TO INVESTMENT DECISION MAKING ON A TRADEABLE ASSET OR SECURITY

This invention relates to a system and method for processing data on tradable assets or securities. The system and method is particularly suited to the stock market, options market, futures market, exchange/currency market, commodities market, bond market and other markets where assets or securities like shares, options, futures contracts, bonds, real estate or any type of asset are traded.

In any market, the price of an asset or security is generally subject to daily fluctuations. However, it is the extraordinary movements in the tradable price of an asset or security which are the most difficult to identify but also represent the best opportunities to buy and sell the asset or security.

Accordingly, it is the object of the present invention to provide a method of analysing the data that is available on tradable assets or securities and manipulating that data in order to better identify opportunities to purchase and sell those assets or securities.

Accordingly, the invention provides a method for analysing and determining the timing of buy/sell tips as an aid to decision making on a tradable asset or security including the steps of: receiving data on a number of specified assets or securities: determining the technical strength of each asset or security: ranking the technical strength of each asset or security; selecting tradable assets or securities having a ranking above a predetermined ranking; determining the fundamental strength of those selected assets or securities based on one or more of a group of variables and ranking those selected assets or securities; and, from the selected group of assets or securities, selecting assets or securities which are suitable for buying and/or assets or securities which are suitable for selling.

The technical strength of a tradable asset or security is a function of variables that are calculated from the recorded market characteristics of a tradable asset or security. These characteristics include the volume traded of the tradable asset or security and the price at which the trade took place.

Hence the technical strength of a tradable asset or security provides a strong indication of the demand for the asset or security and price movement of the asset or security. A predetermined level for the ranking is chosen based on experience and the fundamental strength of the selected group analysed based on one or more selected variables.

To determine the technical strength of a tradable asset or security, it is preferable that the first variable which is calculated for each asset or security is the volume index which is defined as:

$$\text{Volume Index} = \frac{\text{Actual volume over a length of time}}{\text{Average volume over the same length of time based on an } x\text{-period}}$$

This variable gives an indication of whether the asset or security is trading higher or lower than average. For example, if the actual volume over a 3-hour period was 50,000 shares, and the average volume for 3 hours in the previous 1-month was 20,000 shares, then the Volume Index is 2.5. The volume index is combined with the price movement of the asset or security. FIGS. 1, 6, 6A, 6B, 7 and 8 are tables of shares in which the Volume Index of shares for particular market sectors and market capitalisations have been ranked in descending order.

It is preferable that a table of volume index be created by listing the volume index of each tradable asset or security in a selected group of tradable assets or securities in descending order over a period of time which may be, for example, the previous hour, previous trading day, previous trading week etc. That period of time may be one of a number of commonly used selectable periods of time or it may be nominated by the user or operator of the method. This variable is used to identify tradable assets or securities which are subject to higher than usual volume trades over the given period of time. Together with the table, a note may be presented stating how Volume Index was computed and over which period of time.

The group of tradable assets or securities under consideration may be reduced by setting a predetermined limit on the ranking or actual level/limit on the volume index and then only further considering those assets or securities above this preset limit.

The second variable which may be used to determine the technical strength of an asset or security is the price movement which may be also listed and tabulated in descending order of price increases (in percentages) and price falls (in percentages) in the same selected group. The combination of the ranking of the tradable asset or security in the volume index and the ranking on the price movement gives a measure of the upward technical strength of an asset or security, in the case where the price is increasing and the downward technical strength or weakness, in the case where the price is falling.

When an asset or security undergoes higher than average volume of sales with a corresponding increase in price then this indicates that the asset or security may be considered as a potential opportunity to buy. Conversely, when an asset or security undergoes a larger than average volume of sales with a corresponding decrease in price then this indicates that the asset or security should be considered as a sell opportunity.

It is preferable that tradable assets or securities are selected from the list of ranked assets/securities. The assets or securities may be selected on the basis of a threshold ranking level as per one or several criteria which have been predetermined and may be based on past experience or on the actual combination of volume index and price movement. As well, they may be affected by recent company announcements, media coverage, comments/rumours, relevant economic events, etc.

It is preferable that for this selected number of tradable assets or securities, the fundamental strength of the asset or security is determined and used as a filter mechanism to identify opportunities to buy or sell.

Alternatively, the fundamental strength of a group of tradable assets or securities may be determined and ranked based on one or more criteria from a large number of possible criteria and the technical strength preferably as determined above is used to select from the higher ranked securities, on a fundamental strength basis which assets or securities represent opportunities to buy/sell.

In accordance with another aspect, the invention provides a data processing system which receives market data on tradable assets or securities on a regular or real-time continuous basis (with or without a time lag) and performs the analysis method outlined above. The data processing system further includes a means such as a remote connectable terminal to output results of the analysis.

The output means may be capable of interacting with the data processing means to direct selection and display criteria.

The invention also relates to a computer program which carries out the method or is included in the data processing system above.

The invention may also provide a computer program and a computer programming element for performing the above described method of analysis.

The invention may also be used to enable an asset and/or securities portfolio manager to regularly or continuously monitor the relative performance of their portfolio. The manager may then make decisions on the buying or selling of assets or securities in the portfolio based on the relative performance and any recommendations made.

Accordingly another aspect of the invention provides a method of reviewing a portfolio of tradable assets or securities including the steps of:

(a) receiving data on a number of specified assets or securities, (b) determining the technical strength of each asset or security from recorded market characteristics of the security or asset as a function of the volume traded of the security or asset, the price at which the trade took place, and the direction of movement of the price, and ranking the technical strength of each asset or security in ascending or descending order, c) selecting a tradable asset or security having a ranking or volume of technical strength above a predetermined ranking, d) determining the fundamental strength of those selected assets or securities based on one or more of a group of selected variables and ranking those selected assets or securities based on their fundamental strength.

e) selecting or facilitating the selection of assets or securities which are suitable for purchasing and/or assets or securities which are suitable for selling based on the combination of the technical strength and fundamental strength and establishing buying and selling benchmarks based on these selections, f) receiving data on each tradable asset or security in said portfolio of assets or securities, g) determining the technical strength and fundamental strength of each portfolio asset or security, h) comparing the technical and fundamental strength of each portfolio asset or security with the buying and selling benchmarks established in step (e), and, i) processing, computing and/or displaying pros and cons of individual stocks as per various criteria It is preferable that the steps of establishing benchmarks for buying and selling and proving recommendations be performed on a continuous or regular basis. This enables recommendations to be made on assets or securities in particular sectors of the market almost independently of the overall trend in the market.

The technical strength of an asset or security may be conducted by calculating the volume index as previously defined and using the volume index in conjunction with the magnitude and direction of the price movement of the asset or security as the measure of technical strength.

The fundamental strength of an asset may be determined by selecting at least one fundamental strength characteristic from the later described list of fundamental strength characteristics depending on the market sector, and the assets or securities under consideration are marked according to the one or more selected fundamental strength characteristics.

Other aspects of the invention may also provide a computer program and a computer programming element for performing the above described method of reviewing a portfolio.

The computer program or computer programming element may be loaded on to form part of a data processing means in a data processing system which is operatively connectable to a remote terminal by such means as an internal network on the Internet to enable interactive operation of the data processing means.

The foregoing and other features, objects and advantages of the present will become more apparent from the following description of the preferred embodiment and accompanying drawings, in which:

FIG. 1 is a table of high volume index shares listed in descending order of volume index on the Australian stock exchange for the trading week ending May 11, 1987 in which the shares are separated into market sectors and grouped according to market capitalisation (in this example the Top 15 stocks by Volume Index in each category are selected and identified).

FIG. 2 is a table of shares traded on the Australian stock exchange as on May 11, 1987 grouped according to market sectors and capitalisation and ranked in descending order according to NTA/price (this is the reciprocal of the Price-to-Book Value), (in this example the Top 15 stocks in each category as per NTA/Price are selected and identified).

FIG. 3 is a table of shares traded on the Australian stock exchange as on May 11, 1987 grouped according to market sectors and capitalisation and ranked in ascending order of P/E ratio, (in this example the lowest 15 stocks in each category as per P/E are selected and identified).

FIG. 4 is a table of shares traded on the Australian stock exchange as on May 11, 1987 grouped according to market sectors and market capitalisation and ranked in descending order according to dividend yield, (in this example the Top 15 stocks in each category as per dividend yield are selected and identified).

FIG. 5A is a table of shares traded on the Australian stock exchange for the week ending May 11, 1987 grouped according to market sector and market capitalisation and are the best performing stocks ranked in descending order of the percentage rise in share price over the previous week.

FIG. 5B is a table of shares traded on the Australian stock exchange for the week ending May 11, 1987 grouped according to market sector and market capitalisation and are the worst performing stocks ranked in descending order of the percentage fall in share price over the previous week.

FIG. 6 is a table of shares traded on the Australian stock exchange for the week ending Jul. 17, 1987 for shares grouped according to their market capitalisation and market sector and ranked in descending order of their volume index over the previous week.

FIG. 6A is a table of shares traded on the Australian stock exchange for the week ending Jul. 10, 1987 for shares grouped according to their market capitalisation and market sector and ranked in descending order of their volume index over the previous week.

FIG. 6B is a table of shares traded on the Australian stock exchange for the week ending Jun. 19, 1987 for shares grouped according to their market capitalisation and market sector and ranked in descending order of their volume index over the previous week.

FIG. 7 is a table of shares traded on the Australian stock exchange for the five weeks ending Jul. 17, 1987 for shares grouped according to their market sector and market capitalisation and ranked in descending order of the volume index over the previous five weeks.

FIG. 8 is a table of shares traded on the Australian stock exchange for the thirteen weeks ending Jul. 17, 1987 for shares grouped according to their market sector and market capitalisation and ranked in descending order of the volume index over the previous thirteen weeks.

FIG. 9 is a table of shares traded on the Australian stock exchange for the week ending Jul. 17, 1987 for shares grouped according to their market sector and market capitalisation and ranked in descending order of the change of ownership index (change of ownership is defined by the volume of shares traded as a percent of the issued capital).

FIG. 10 is a table of shares traded on the Australian stock exchange for the five weeks ending Jul. 17, 1987 for shares grouped according to their market sector and market capitalisation and ranked in descending order of the change of ownership index over the previous five weeks.

FIG. 11 is a table of shares traded on the Australian stock exchange for the thirteen weeks ending Jul. 17, 1987 for shares grouped according to their market sector and market capitalisation and ranked in descending order of the change of ownership index over the previous thirteen weeks.

FIG. 12 is a table of shares traded on the Australian stock exchange for the thirteen weeks ending Jul. 17, 1987 for shares grouped according to their market sector and market capitalisation and ranked in descending order of the volume index over the previous thirteen weeks. This exhibit is titled Takeover Watch and is prepared after the computer scans through the previous two groups of Exhibits on Volume Indices and change of ownership to identify those stocks with a high correlation.

FIG. 13 is a table of shares traded on the Australian stock exchange as on Jul. 17, 1987 for shares grouped according to their market sector and market capitalisation and ranked in descending order of the NTA/price ratio.

FIG. 14 is a table of shares traded on the Australian stock exchange as on Jul. 17, 1987 for shares grouped according to their market sector and market capitalisation and ranked in ascending order of P/E ratio.

FIG. 15 is a table of shares traded on the Australian stock exchange as on Jul. 17, 1987 for shares grouped according to their market sector and market capitalisation and ranked in descending order of the P/E ratio.

FIG. 16 is a table of shares traded on the Australian stock exchange as on Jul. 17, 1987 for shares grouped according to their market sector and market capitalisation and ranked in descending order of dividend yield.

FIG. 17 is a table of shares traded on the Australian stock exchange as on Jul. 17, 1987 for shares grouped according to their market sector and market capitalisation and ranked in ascending order of yield.

FIG. 18 is a table of shares traded on the Australian stock exchange as on Jul. 17, 1987 for shares grouped according to their market sector and market capitalisation and ranked in descending order of yield and listing the dividend for each. The computer identifies those stocks which have had at least a 2-year history of producing good dividends as well as producing an annual capital appreciation of at least the bank deposit rate.

Figure 19B:
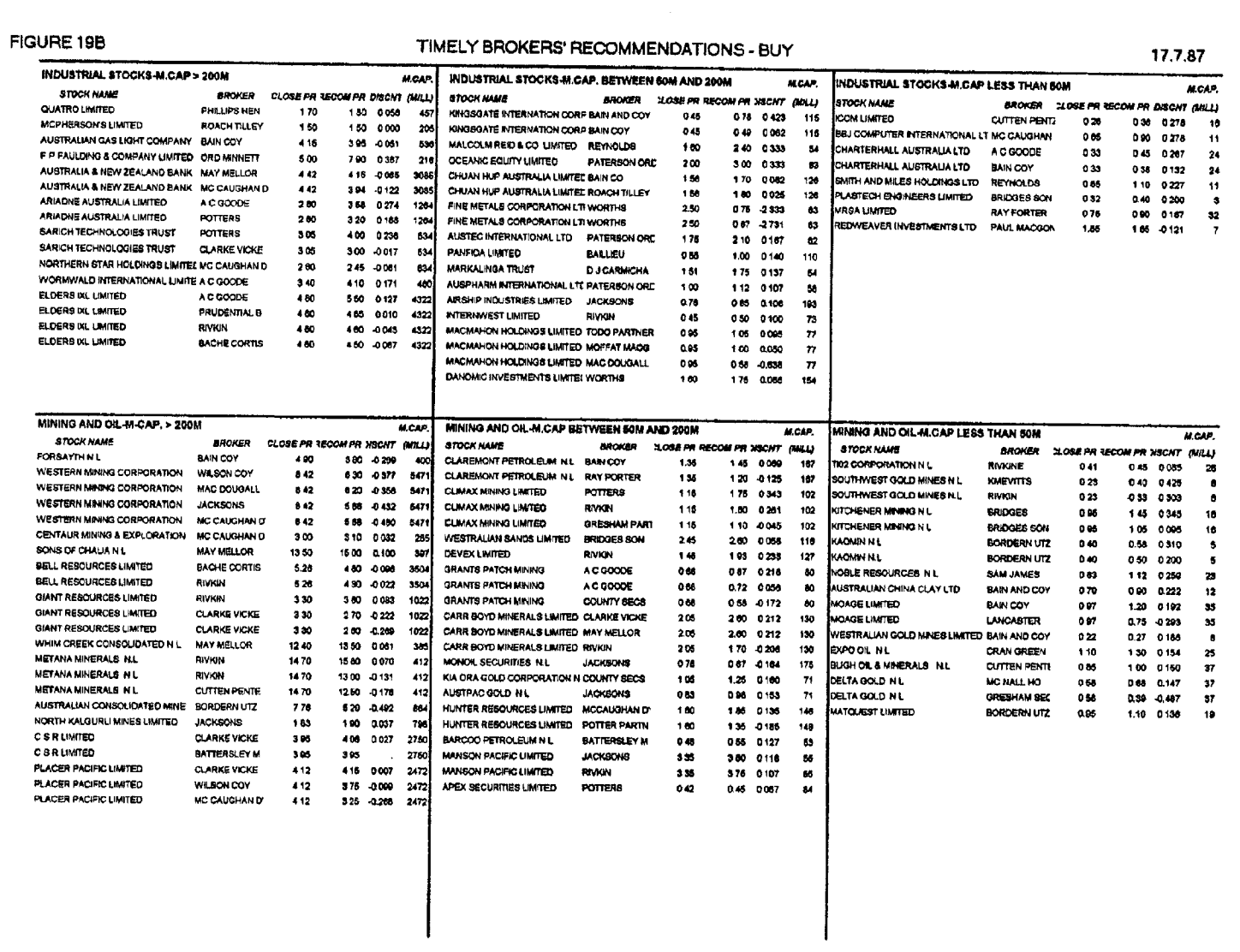

FIG. 19A is a listing in descending order of premium to recommended selling price together with the name of the broker recommending the selling opportunity.

FIG. 19B is a listing in descending order of discount to recommended buying price together with the name of the broker(s) recommending the buying opportunity.

FIG. 20 is a table of shares traded on the Australian stock exchange as on Jul. 17, 1987 for shares grouped according to their market sector and market capitalisation and ranked in descending order of the percentage increase in share price over the previous week.

FIG. 21 is a table of shares traded on the Australian stock exchange as on Jul. 17, 1987 for shares grouped according to their market sector and market capitalisation and ranked in descending order of the percentage increase in share price over the previous five weeks.

FIG. 22 is a table of shares traded on the Australian stock exchange as on Jul. 17, 1987 for shares grouped according to their market sector and market capitalisation and ranked in descending order of percentage price rise over the previous thirteen weeks.

FIG. 23 is a table of shares traded on the Australian stock exchange as on Jul. 17, 1987 for shares grouped according to their market sector and market capitalisation and ranked in descending order of the percentage price rise in the share price over the previous fifty-two weeks.

FIG. 24 is a table of shares traded on the Australian stock exchange as on Jul. 17, 1987 for shares grouped according to their market sector and market capitalisation and ranked in descending order of the percentage price fall in the share price over the previous week.

FIG. 25 is a table of shares traded on the Australian stock exchange as on Jul. 17, 1987 for shares grouped according to their market sector and market capitalisation and ranked in descending order of the percentage price fall in the share price over the previous five weeks.

FIG. 26 is a table of shares traded on the Australian stock exchange as on Jul. 17, 1987 for shares grouped according to their market sector and market capitalisation and ranked in descending order of the percentage price fall in the share price over the previous thirteen weeks.

FIG. 27 is a table of shares traded on the Australian stock exchange as on Jul. 17, 1987 for shares grouped according to their market sector and market capitalisation and ranked in descending order of the percentage price fall in the share price over the previous 52 weeks.

FIG. 28 is a table of the commodity share prices and exchange rates as on Jul. 17, 1987 together with percent change from one week ago, five weeks ago, thirteen weeks ago and fifty-two weeks ago.

FIG. 29 is a takeover watch of shares traded on the Australian stock exchange for the thirteen weeks ending Jun. 19, 1987 for shares grouped according to their market sector and market capitalisation and ranked in descending order of the volume index over the previous thirteen weeks. (Refer description on FIG. 12, Page 9).

FIG. 30 is a takeover watch of shares traded on the Australian stock exchange for the thirteen weeks ending Jul. 10, 1987 for shares grouped according to their market sector and market capitalisation and ranked in descending order of the volume index over the previous thirteen weeks. (Refer description on FIG. 12, Page 9).

While the invention will now be described in regard to the buying and selling of shares, it would be readily understood by persons skilled in the art that the invention may be used in relation to any asset or security like options, futures contracts, bonds, real estate where the asset or security is traded and the results of those trades reported in accessible form.

The method of the invention involves receiving, on a regular or continuous real time basis (with or without a time lag), data on the trading of tradable assets or securities such as stocks and shares, options, futures, currency, bonds, commodities etc. and analysing this data to identify which of the assets or securities represent good opportunities to buy or sell. It is to be noted that definitions of earnings per share, book value per share (NTA per share), dividend per share, etc are as per commonly accepted industry practice. A good opportunity or tip to "buy" is considered to be an asset or security where the potential and likelihood for capital growth is high and a good opportunity or tip to "sell" is considered to be a tradable asset or security where the likelihood that the asset or security will undergo a devaluation or diminution of value is high. The time period over which calculations are made may vary depending on the use or the program.

The group of tradable asset or securities may be selected on the basis of one or several common criteria such as:
1. A common industry sector.
2. A market capitalisation above a preselected amount, lower than a preselected amount or between two preset limits.
3. Inter market comparisons.
4. Any other criterion (refer to points 1-39, pages 13-21) like credit rating, currency in which the security is traded, sales turnover, profit margins, earning growth etc.

Depending on the selection process of the operator as well as the nature of members of the group of tradable assets or securities, the filter mechanisms that are used to identify the buying and selling opportunities may be varied. When selecting a buying opportunity, the operator may establish preset limits within or above which the tradable asset or security must be ranked in the variable in order for the variable to be selected.

For example, the operator may specify that in order to be representative of a buying opportunity the tradable asset or security must be in the Top 1% (or Top 5%, 10%) of the higher volume index and in the Top 5% (or Top 2%, Top 10%, Top 25%) of price rises over a certain time frame in order to categorise a particular tradable asset or security as having an upward technical strength and he may set a separate filter mechanism or selection criterion for identifying an upward fundamental strength hence signalling this tradable asset or security is a buying opportunity.

A further consideration of the assets or securities on the list above the preset limit may be carried out by considering the fundamental strength of each asset or security. FIGS. 2, 3, 4, 13, 14 and 16 are tables of shares grouped according to market sector and capitalisation, ranking the criteria chosen as the indicator of the fundamental strength.

Since the variable which is used to identify the fundamental strength of a tradable asset or security can be varied and selected depending on the particular industry and market capitalisation, the combination of variables used to calculate the fundamental strength of the group of tradable asset or securities can be varied with various combinations of the variables selected.

The following are examples of a list of other possible criteria (some of which are fundamental factors) which could generate BUY or SELL signals or tips and therefore act as additional filter mechanisms for BUY, if other criteria of high volume index and price rise are met or SELL, if other criteria of high volume index and price fall are met. The system uses a method of stock exchange relativities, benchmarks and/or comparisons on some or all of these criteria. Different sectors/industry groups may be selected for purposes of classification and comparison.

1. Dividend yield
   The dividend yield is defined by the historic dividend divided by the last traded price of the asset or security. For the purposes of selecting buy opportunities/signals/tips, the dividend yield is arranged in descending order and the higher ranked dividend yield tradable assets or securities are selected based on this variable. Conversely, for identifying sell opportunities/signals/tips low or zero dividend yield tradable assets or securities are selected.

2. NTA/Price
   NTA/Price (reciprocal of Price-to-Book ratio) is defined as the net tangible asset (NTA) backing of a tradable asset or security divided by the last traded price. This variable is calculated for each tradable asset or security and arranged in descending order for those tradable assets or securities which are of an average or benchmark level. A high NTA/Price ratio indicates buy opportunities/signals/tips when this variable is used. The bottom of the NTA/Price list may be used for identifying sell opportunities/signals/tips. The NTA or book value may be adjusted for inflation and substituted by the replacement cost of the assets and liabilities. A third alternative is an adjustment to make it closer to the market value of assets less liabilities.

3. P/E
   P/E is defined as the last traded price of the tradable asset or security divided by the earnings per asset or security. The P/E ratio can be ranked in descending order with low ranked P/E tradable assets or securities indicating buy opportunities/signals/tips and high P/E ratios indicating sell opportunities/signals/tips.

4. P/EBITDAPS
   The P/EBITDAPS is an abbreviation where P is the last price of the tradable asset or security and EBITDAPS is the earnings before interest, tax, depreciation and amortisation per share. Low P/EBITDAPS tradable assets or securities are identified as assets or securities which have the lowest multiple of price to earnings before interest, tax, depreciation and amortisation per share. A low ratio is indicative of buy opportunities/signals/tips whilst a high ratio indicates sell opportunities/signals/tips.

5. P/EVAPS
   Identifying assets or securities that had the lowest (for buying) and highest or negative (for selling) P/EVAPS (defined as the price to economic value added per share) would be ranked in ascending order with the lowest ranking indicating buy opportunities/signals/tips. The P/EVAPS would also be ranked in descending order with the highest ranking indicating sell opportunities/signals/tips.

6. Discount to Historical High or Premium to Historical Low
   The discount at which the asset or security price is currently trading relative to its historical high price may be listed in descending order with a higher ranking used to identify buy opportunities/signals/tips and a lower ranking indicating of sell opportunities/signals/tips. (The historical high price may be based on a pre-determined period eg. 1 week, 1 month, 1 quarter, 1 year, 3 years, 5 years, etc). For a certain stock identify the discount to its historical high to indicate buy opportunities/signals/tips.

7. Gearing level
   Other filtering mechanism for assessing buy opportunities/signals/tips may be gearing levels lower than the industry average or benchmark, interest cover above a benchmark etc.
   Conversely, for asset sell opportunities/signals/tips, high gearing levels (higher than or worse than the industry practice or benchmark) or thin interest cover may be chosen. These latter criteria may be chosen for selecting and identifying buy and sell opportunities/signals/tips from the group of tradable assets or securities.

8. Discount/Premium to Brokers' Recommended Buy/Sell Price.

Buy and sell recommendations of various brokers may be recorded. Price differential between current price and the brokers' buy or sell recommendation price may be computed, compared and/or processed on a regular or continuous basis. An option may be added for the program to track these in ascending or descending or order of discount to broker's buy recommendation and ascending or descending order of premium to broker's sell recommendation.

9. Price to sales per asset or security

For certain stocks like technology stocks, filter mechanisms may be incorporated such as low price to sales per share and/or a high growth rate in sales per share, indicating buy opportunities/signals/tips. Conversely, a high price to sales per share and/or a low/negative growth in sales per share may indicate sell opportunities/signals/tips.

10. Market capitalisation

Market capitalisation, which may or may not be adjusted for debt levels, of a certain key commodity/output or a certain key commodity/resource may be considered. For commodity stocks, filter mechanisms may include market capitalisation per quantity of commodity produced or market capitalisation per quantity of commodity reserves. Again, for stocks such as like technology and internet stocks, etc., filter mechanisms may be incorporated viz market capitalisation per "unique user", market capitalisation per annual sales revenue per user, growth rate in sales per share, growth rate in sales, momentum, average number of hits per month, average number of unique users per month, etc. A low ranking for some or all of these variables may indicate buy opportunities/signals/tips while a high ranking may indicate sell opportunities/signals/tips.

11. Unusually high change of ownership index

The change of ownership index (c/o index) is calculated as $$\frac{\text{Actual volume of shares traded over a given time period}}{\text{Total Shares on Issue}} \times 100$$

12. Identify stocks which are market leaders or have a position of market dominance or high market share in their respective industry/principal market. As a variation, one may identify stocks in descending order of market share in their respective industry/principal market.

13. Identify stocks which had return on shareholders' equity greater than say 15% per annum or 25% per annum in last/X financial year or financial quarter etc. As a variation, identify stocks in descending order of return on shareholder's equity or return on total assets.

14. Identify stocks which have high quality credit rating from rating agencies such as Standard & Poor's, Moody's, other rating agencies etc. Alternatively, identify stocks as per pre-selected categories of credit ratings, industry sectors, countries, stock exchanges, etc.

15. Identify stocks which have a low or high (on a relative basis) P/CFPS where CFPS is per share free cash flow defined by earnings plus depreciation minus capital spending minus dividends.

16. Identify stocks which have low/high volatility.

17. Identify stocks where top executives have significant shareholding in the company. As a variation, identify stocks where the Top 20 (or Top 40 or Top X) shareholders have a shareholding that exceeds a certain limit as a percent of issued capital. Or for example, identifying stocks in a certain industry where the combined holding of the Top 20 shareholders exceeds 70% of the issued capital (this may be construed to be a buy opportunity/signal/tip as it may reflect a closely held company).

18. Identify stocks in descending order or ascending order which are at a premium/discount to industry group or overall market based on various criteria outlined in this document.

19. Identify stocks which have high/low gross margins as per various benchmarks to be identified. As a variation, identify these in descending order or ascending order.

20. Identify stocks which have debt level less/more than industry benchmark or S&P 500 or any other appropriate benchmarks.

21. Identify stocks which have a good/erratic track record of profitability. For example:

Buy Signals/Tips
    (i) current quarterly earnings per share are up more than say 20% Over the same quarter last year, or the most recent quarter reported.
    (ii) annual compound growth rate of earnings exceeds say 20%.

Sell Signals/Tips
    (i) last two quarters earnings have shown consecutive declines.
    (ii) there has been an annual fall in earnings exceeding say 20%.
    (iii) identify worst performance in terms of one of several indicators like declining profits, declining earnings per share, declining sales.

22. Identify stocks where inventories are declining/increasing. As a variation, identify these in descending/ascending order in each industry grouping.

23. Identify stocks where major new products/services have been launched. Identify companies where new management is in place.

24. Identify stocks where insiders are buying/selling more than average. Identify stocks where institutional sponsors are increasing/decreasing.

25. Identify stocks where there is growth/decline in physical volumes of sales or production or inventories.

26. Identify stocks where profit margins are rising indicating buy opportunities/signals/tips or falling indicating sell opportunities/signals/tips. Identify stocks where return on capital employed is higher/lower than a benchmark. Identify stocks where earnings/revenue are higher/lower than a benchmark.

27. Identify stocks which have a higher/lower than benchmark/average growth in sales/profits/physical volumes/inventories etc.

28. Identify stock exchanges of countries where economic conditions are better or worse than before. For inter-stock exchange comparisons, a volume indicator in value or dollar terms may be used for computation, comparison and ranking of volume index. Also, identify what sectors and industries of the market are more promising and thus present better opportunities.

29. (i) Identify stocks which have a high/low cost structure defined by operating cost per unit produced or by other criteria.

(ii) For certain businesses identify and rank People Effectiveness Index defined by net sales billed in value terms divided by total payroll in value terms for buy/sell opportunities/signals/tips.

30. (i) Identify stocks which have higher than average growth rate in earnings per share (EPS), net tangible asset backing per share (NTA), gross cash flow per share (GCF), dividends per share (DPS), etc.
    (ii) Identify "growth industries" for buy opportunities/signals/tips and "decline industries" or "recessing industries" for sell opportunities/signals/tips as per growth or decline in comparison with benchmarks.
31. Identify stocks which have a P/E ratio less than the earnings growth rate for buy opportunities/signals/tips. Also identify stocks which have a P/E ratio greater than the earnings growth rate for sell opportunities/signals/tips.
32. Among certain sectors like bank stocks, certain specific criteria may be created eg. Total Income/Average Assets, Operating Costs/Average Assets, Bad Debt Charge/Average Assets. These criteria may be stated as higher or lower relative to a benchmark. As a variation, they may be compared and listed in ascending/descending order.
33. Identify stocks of distressed firms with negative earnings or negative book values.
34. Identify High Income and capital gain stocks. For example. FIG. 18 identifies those stocks in various sectors as at Jul. 17, 1987 which had Dividend Yield greater than 5% for that year AND had Dividend Yield greater than 5% one year ago AND had Dividend Yield greater than 5% two years ago AND had a capital gain in share price exceeding 72.8% when compared with the price three years ago (this represents an average annual compound growth rate in share price of 20% per annum). The exact numbers used for Dividend Yield and Capital gain may vary.
35. A "Takeover Watch" Exhibit is created (refer FIG. 12) to identify stocks to watch for takeover possibilities. This includes stocks which had Unusually High Volumes Traded (or Volume Index) AND Unusually High Change of Ownership (defined by actual volume divided by shares on issue) and by whom, over 1 week, 5 weeks and/or 13 weeks. As a variation to this, the Takeover Watch might include only Unusually High Change of Ownership or a price increase accompanied by high change of ownership. Also refer to the definition of "momentum up" on page 21.
36. Identify stocks which have return (or earnings) on assets exceeding the indicator lending rate for buy opportunities/signals/tips or below the indicator lending rate for sell opportunities/signals/tips.
37. Identify and rank stocks for buy opportunities/signals/tips which are below their long term average (regression to the mean long-term average price). Conversely, identify and rank stocks for sell opportunities/signals/tips which are above their long term average (regression to the mean long-term average price).
38. Alternatively, the user/operator may pre-specify what, in their opinion, is an appropriate filter mechanism. This filter mechanism may go beyond conventional ideas. For example, they may wish to buy a comparatively high P/E stock because they believe that the bubble effect will mean that the price will continue to rise in the short-term even though they believe that in the long-term it is a sell opportunity.
39. Other criteria for value selection include some or all of Benjamin Graham's criteria, the 200-day moving average comparisons, or any other criteria of selection, may all be introduced in the program.

Typically the considerations for buying and selling tips in accordance with embodiments of the invention are as follows:—

Signals for Identifying Buy Opportunities/Tips

Note: "AND" represents the Logic AND function. "OR" represents the Logic OR function.

1A. Upward technical strength (also termed "momentum up" or "momentum ↑") stocks is defined by selecting those assets/securities that have:

Noticeable price rise as identified by price movements in descending order of the percentage value of rises. (Mention needs to be made of the fact that price rises may reflect an opportunity to buy an overvalued asset/security. However, if volume index is high, there is a certain probability that the price may rise further before it stabilises to a level when it generates a sell signal/tip based on value considerations.)

AND

High Volume Index Above Benchmark/Average

AND we may also add as an optional factor a condition that

Market is not technically weak (meaning high Market Volume and falling Index)

1B. Upward strength in fundamental terms is defined by some of the criteria outlined earlier (refer above criteria 1-39, pages 13-21) and would include logic OR function of one of several or all of those criteria. The program may pick and identify which of the criteria 1-39 are met.

High Dividend Yield

OR

High NTA/Price

OR

Low P/E

OR

Low P/EBITDAPS

OR

Low P/EVAPS

OR

High discount to its own high

OR

Low gearing level

OR

High Discount to Brokers' Buy Recommendations

OR

Low Price to Sales Per Share (for selected technology and other stocks)

OR

Low Market Capitalisation (which may or may not be adjusted for debt levels) to quantity produced (for selected commodity producers)

OR

Low Market Capitalisation (which may or may not be adjusted for debt levels) to quantity reserves (for selected commodity stocks)

1C. Upward strength in technical and fundamental terms is defined by

Stocks which have technical strength as per 1A above.

AND

Stocks which have fundamental strength in one or more criteria as per 1B above.

Note: The factors of fundamental strength may be individually listed together with their percentile ranking in sector or relativity versus a chosen sector. Only a few of the 39 criteria are listed in Example 1 and Example 2.

Signals for Identifying Sell Opportunities/Tips

2A. Downward technical strength and "momentum down" or ("momentum ↓") stocks is defined by selecting those assets/securities that have:

Noticeable price fall as identified by price movements in descending order of the percentage value of falls. (Mention needs to be made of the fact that price falls may reflect an opportunity to buy an undervalued asset/security. However, if volume index is high, there is a certain probability that the price may fall further before it stabilises to a level when it generate a buy signal/tip based on value considerations.)

AND

High Volume Index above benchmark/average

AND we may also add as an optional factor a condition that

Market is not technically strong (meaning high Market Volume and rising Index)

2B. Downward strength in fundamental terms is defined by some of the criteria outlined earlier (refer above criteria 1-39, pages 13-21), and would include logic OR function of several or all of those criteria. The program may pick and identify which of the criteria 1-39 are met:

Low Dividend Yield

OR

Low NTA/Price

OR

High P/E

OR

High P/EBITPS

OR

High P/EVAPS

OR

High premium to its own low

OR

High gearing level

OR

High Premium to Brokers' Sell Recommendations

OR

High Price to Sales Per Share (for selected technology and other stocks)

OR

High Market Capitalisation (which may or may not be adjusted for debt levels) to quantity produced (for selected commodity producers)

OR

High Market Capitalisation (which may or may not be adjusted for debt levels) to quantity reserves (for selected commodity stocks)

2C. Downward strength in technical and fundamental terms is defined by Stocks which have downward technical strength as per 2A above.

AND

Stocks which have downward fundamental strength in one or more criteria as per 2B above.

The buy and sell opportunities/signals/tips will outline the filtering or selection mechanisms used to provide more useful information to the user. Whether one wishes to buy or sell, the decision-maker may accordingly select the order as descending or ascending order.

The method of the invention and the data processing system computer program and computer program element using the method of the invention is suitable for use by individual and institutional investors, day traders, short-term traders, professional traders and brokers who maintain a list of tradable assets or securities which are buying and selling opportunities.

A mechanism may be used for comparing a portfolio with a benchmark. This comparison may establish deviation from the benchmark together with suggested buy and sell signals/tips. A further mechanism may exist where the pros and cons of buy and sell decisions are automatically available on a real-time basis (with or without a time delay). Signals for identifying Buy and Sell Opportunities as described earlier would be used to identify BUY signals/tips as pros and SELL signals/tips as cons.

The software may be designed to make the filtering and selection available on a real-time basis in parallel with trading activity in the concerned market. The objective may be to let the system work as a personal interactive broker which provides processed information on stock market relativities/comparisons etc. based on which the user may make a decision on whether to buy, sell or hold a security/asset.

When the invention is embodied in a computer program element on a data processing system, then it may be possible for the client or investor to log onto his or her portfolio of investments and download contra information from the stock exchange or other relevant source. This information would then be manipulated and analysed in accordance with the method or system of the invention to maintain a customised library of relevant information for that client or investor. The client or operator of the program accesses a data processing means having a computer program element embodying the invention from a terminal which is connectable to the data processing means via an internal network (intranet) on the Internet. The client or operator may interact with the data processing means by specifying such variables as selection criteria, display options or other operating variables. The results of the data processing may then be displayed on the terminal or recorded in hard copy or electronic form.

Alternatively, this may be an added consideration in the BUY/SELL decisions of the investor/user.

The library of relevant information may include information on price movements, volumes, sectoral exposure, recent press clippings, stock market announcements, relative position of various variables, buy and sell signals/tips in accordance with certain selection criteria of the program (together with assumptions and disclaimer and disclosure notices), user's target buy and sell targets, benchmark portfolio guidelines etc.

This historical information can be used to compare the various variables used in the invention including benchmarks to test the validity of buy and sell signals/tips and identify modifications, optional weighting factors or further criteria which could be considered in the future.

Comparisons of various variables including benchmarks may be made on a historical basis and/or on an inter-market basis to identify relativities, arbitrage opportunities etc.

FIGS. 5A, 5B and 27 are tables calculated to identify the best and worst performing shares over various periods of time. The information in these tables is an example of the historical information which may be gathered and used to test the hypotheses on buy and sell signals/tips and other variables related to the buy/sell decision.

FIG. 28 is a table of the commodity prices and exchange rates captured for a particular date to provide a reference for their effect on share prices.

It may be preferable for a benchmark or set point on any one or more variables at any point of time to be computed and/or communicated. The benchmark may exist for any sector or for the market as a whole. It is likely that the benchmark will change with the passage of time.

New indicators may be created to compute the value of a variable relative to a certain benchmark ie. relative P/E, relative P/NTA, relative price rise or fall with respect to a section. (This may be termed over-performance/under-performance with respect to a sector benchmark).

Each stock may be given a percentile ranking as per a selected criterion. This percentile ranking would indicate what percent of the selected group were worse off than that stock for that criterion. For example, if there were 15 companies in the selected group and if the criteria was P/E and the stock had the fifth lowest P/E its percentile ranking (for potential BUY opportunity) would be 66.67. Likewise, if the second criteria were current quarterly earnings growth and the stock was third in its selected group of 15 its percentile rank (for potential BUY opportunity/tip) on current quarterly earnings growth would be 80.

To illustrate the present invention, the following examples are provided based on the data of the accompanying figures.

Example 1A

Stocks in which there was both a significant price rise (refer FIG. 5A) and a significant volume index (refer FIG. 1) in the week ended 11 May 1987. This is an example of Momentum Up or Momentum ↑ stocks. They are separated into three capitalisation levels; over $200 million, between $50 million and $200 million, and under $50 million. They are in descending order from the highest rise of the week down to the lowest rise of the Top 15. Their volume index is also stated with the rank of their volume index in the Top 15. For example, Exhibit 1A processes the commonality/correlation (which may also be referred to as the AND logic function) to identify stocks in the Top 15 of price rises in certain categories that also had a volume index ranking in the Top 15 of that category.

Exhibit 1A

| Rank of Stock by % Rise | % Price Rise Over Week | Volume Index (Rank) |
|---|---|---|
| Capitalisation >$200m (Mining & Oil) | | |
| 1. Pelsart Resources N.L. | 36.84 | $2.86_{(12)}$ |
| 2. Hartogen Energy Limited | 32.31 | $8.48_{(3)}$ |
| 3. Aust. Oil and Gas Corporation Limited | 25.58 | $2.63_{(14)}$ |
| 6. M.I.M. Holdings Limited | 17.38 | $2.53_{(15)}$ |
| 8. Crusader Limited | 16.07 | $3.99_{(9)}$ |
| 14. Bell Resources Limited | 11.94 | $6.19_{(6)}$ |
| 15. Metals Exploration Limited | 11.76 | $7.51_{(4)}$ |
| Capitalisation >$200m (Industrials) | | |
| 2. Airship Industries | 72.41 | $24.64_{(1)}$ |
| 12. Borg-Warner (Australia) Ltd | 6.38 | $8.75_{(3)}$ |
| 14. Boral Limited | 6.00 | $1.99_{(12)}$ |
| Capitalisation $50m - $200m | | |
| 1. Bruce Resources N.L. | 177.78 | $212.47_{(1)}$ |
| 3. Consolidated Petroleum Aust. N.L. | 64.71 | $11.71_{(6)}$ |
| 4. Greenbushes Tin Limited | 52.94 | $7.85_{(12)}$ |
| 5. Phoenix Oil & Gas N.L. | 47.83 | $10.16_{(7)}$ |
| 7. Aztec Exploration Limited | 45.83 | $8.46_{(9)}$ |
| 10. Petro Energy Limited | 33.33 | $8.17_{(1)}$ |
| 11. Winton Oil N.L. | 33.33 | $14.22_{(3)}$ |
| 13. Genoa Oil N.L. | 31.43 | $12.72_{(5)}$ |
| 15. Barcoo Petroleum N.L. | 26.67 | $68.01_{(2)}$ |
| Capitalisation <$50m | | |
| 5. Zapopan N.L. | 66.67 | $12.06_{(7)}$ |
| 12. Central Murchison Gold Limited | 46.15 | $13.23_{(7)}$ |

Example 1B

Stocks in which there was both a significant price decline (refer FIG. 5B) and a significant volume index (refer FIG. 1) in the week ended $11^{th}$ May, 1987. This is an example of Momentum Down or Momentum ↓ stocks. They are separated into three capitalisation levels; over $200 million, between $50 million and $200 million, and under $50 million. They are in descending order from the highest decline of the week down to the lowest of the Top 15. Their volume index is also stated with the rank of their volume index in the Top 15.

For example, Exhibit 1B processes the commonality/correlation (which may also be referred to as the AND logic function) to identify stocks in the worst (top) 15 of Price falls in certain categories that also had a volume index ranking in the Top 15 of that category.

Exhibit 1B

| Rank of Stock by % Fall | % Price Fall Over Week | Volume Index (Rank) |
|---|---|---|
| Capitalisation >$200m | | |
| 2. Anglo American Pacific Limited | 6.15 | 19.13$_{(1)}$ |
| 3. Hill 50 Gold Mine N.L. | 5.56 | 3.60$_{(10)}$ |
| 7. Ampol Exploration Limited | 3.57 | 3.23$_{(11)}$ |
| 8. Oil Search Limited | 3.33 | 9.99$_{(2)}$ |
| 11. BHP Gold Mines Limited | 2.78 | 6.33$_{(5)}$ |
| Capitalisation <$50m | | |
| 9. Kalbara Mining N.L. | 17.33 | 27.54$_{(5)}$ |

Example 2

From the list of stocks in Exhibits 1A and 1B we follow certain stocks over each day of the previous week during which they either rose or fell significantly. This establishes the relevance of Momentum Up ↑ or Momentum Down ↓ to buy and sell tips during the period in which momentum was up or down. By doing so, we can follow their daily movements and see the volumes traded with these fluctuations. By solely using the correlation between price movement and high volume index we can determine good (albeit rough) estimates of when to buy and sell the stock according to the procedures described in the patent. Note that only price and volume index have been taken into account here and not the additional criteria as recommended.

Actual Price & Volume on the Date

Vol (00's)   Vol (00's)   Vol (00's)   Vol (00's)   Vol (00's)   Vol (00's)   Vol (00's)

1/5/87 ⇒ 4/5/87 ⇒ 5/5/87 ⇒ 6/5/87 ⇒ 7/5/87 ⇒ 8/5/87 ⇒ 11/5/87 ⇒ 15/5/87

STOCK NAME & BUY/SELL TIPS BASED ON TECHNICAL CONSIDERATIONS OF PRICE & VOLUME

AIRSHIP INDUSTRIES LIMITED (Refer Exhibit 1A)

3640      3195       198       2965      8905      4705
62  ⇒  53  ⇒  55  ⇒  55  ⇒  70  ⇒  100  ⇒  110  ⇒  95
                  BUY

AMPOL EXPLORATION LIMITED (Refer Exhibit 1B)

232       125        94       1318      6906      2119
560 ⇒ 530 ⇒ 500 ⇒ 530 ⇒ 530 ⇒ 540 ⇒ 534 ⇒ 600
                                            BUY

ANGLO AMERICAN PACIFIC LIMITED (Refer Exhibit 1B)

5367      1051      4338      11907     5423       524       143
325 ⇒ 320 ⇒ 300 ⇒ 300 ⇒ 305 ⇒ 300 ⇒ 295 ⇒ 295
        SELL

AZTEC EXPLORATION LIMITED (Refer Exhibit 1A)

2855       775      2775      5498      9316      1866      2679
72  ⇒  72  ⇒  72  ⇒  75  ⇒  105 ⇒  110 ⇒  104 ⇒  110
                           BUY

BHP GOLD MINES LIMITED (Refer Exhibit 1B)

2458      1338      1504      1153      4185      1201      2025
173 ⇒ 172 ⇒ 175 ⇒ 172 ⇒ 172 ⇒ 175 ⇒ 170 ⇒ 162
        SELL

BORAL LIMITED (Refer Exhibit 1A)

199      2762      1316      4957      4694      2105      1199
452 ⇒ 450 ⇒ 450 ⇒ 470 ⇒ 478 ⇒ 480 ⇒ 480 ⇒ 495
                                            BUY

BRUCE RESOURCES N.L. (Refer Exhibit 1A)

2634       265       552       825       260       550       175
47  ⇒  55  ⇒  78  ⇒  80  ⇒  100 ⇒  130 ⇒  110 ⇒  105
        BUY

CRUSADER LIMITED (Refer Exhibit 1A)

334       169      5451       940       727       660
280 ⇒ 300 ⇒ 310 ⇒ 315 ⇒ 315 ⇒ 320 ⇒ 325 ⇒ 320
                           BUY

-continued

GENOA OIL N.L. (Refer Exhibit 1A)

445 →[150]→ 450 →[285]→ 430 →[505]→ 455 →[438]→ 440 →[116]→ 455 →[40]→ 500 ⇒ 580
            BUY

KALBARA MINING N.L. (Refer Exhibit 1B)

78 →[4040]→ 72 →[5655]→ 70 →[2270]→ 55 →[5103]→ 64 →[5470]→ 62 →[1882]→ 60 →[1790]→ 63
            SELL                                         BUY

METALS EXPLORATION LIMITED (Refer Exhibit 1A)

170 →[174]→ 160 →[205]→ 165 →[168]→ 172 →[4856]→ 175 →[2145]→ 190 →[1057]→ 195 →[2795]→ 195
                                                              BUY

M.I.M HOLDINGS LIMITED (Refer Exhibit 1A)

330 →[15969]→ 338 →[4615]→ 362 →[12958]→ 370 →[7812]→ 385 →[9365]→ 380 →[2714]→ 375 ⇒
              BUY

PELSART RESOURCES N.L. (Refer Exhibit 1A)

100 →[1521]→ 100 →[3609]→ 105 →[5336]→ 115 →[884]→ 135 →[2727]→ 130 →[1325]→ 120 ⇒ 119
              BUY

PHOENIX OIL & GAS N.L. (Refer Exhibit 1A)

115 →[4958]→ 125 →[1115]→ 130 →[1107]→ 130 →[1093]→ 145 →[8226]→ 170 →[1609]→ 140 ⇒ 160
              BUY

WINTON OIL N.L. (Refer Exhibit 1A)

21 →[49750]→ 24 →[22325]→ 25 →[15870]→ 26 →[18230]→ 27 →[20530]→ 28 →[10405]→ 29 ⇒
            BUY

Example 3

This is an Example of a Combination of Fundamental and Technical Factors

Examples of High Dividend Yield and High Volume Index

This Exhibit lists those stocks that were in the Top 15 of the High Dividend Yield in their category of market capitalisation as at Nov. 5, 1987 (FIG. 4) AND were also in the Top 15 of High Volume Index subsequently. This suggests technical considerations of High Volume Index and corresponding price rise combined with fundamentals represent a sound BUY opportunity. Daily volume data would have been helpful in making a BUY decision.

| | | |
|---|---|---|
| Westpac Banking Corporation | 4.98 ⇓ 5.46 | May (11 May 1987) High 1-Week Volume at 17 Jul. 1987 (#10 in Top 15. FIG. 6) July (17 Jul. 1987) |

-continued

| | | |
|---|---|---|
| Bell Resources Limited | 6.00 ⇓ | May (11 May 1987) High 1-Week Volume at 17 Jul. 1987 (FIG. 6). High NTA/P at 11 May 1987 (FIG. 2) |
| | 4.35 ⇓ | May (11 May 1987) High 1-Week Volume at 17 Jul. 1987 (FIG. 6). (#2 in Top 15. FIG. 6A) |
| | 4.78 ⇓ 6.00 | July (10/7/87) July (17/7/87) |
| Consolidated Rutile Limited | 7.00 ⇓ 7.00 | May (11/5/87) 6.70 with High 1-Week Volume at 10/7/87 BUY (#6 in Top 15. FIG. 6A) July (17/7/87) |
| Queensland Coal Trust | 1.45 ⇓ 1.56 | May (11/5/87) - High Dividend Yield Stock High Dividend Yield and High Volume Stock (5 weeks. #10 in Top 15 at 17/7/87. FIG. 7) July (17/7/87) |

-continued

| | | |
|---|---|---|
| CSR | 3.83 | May (11/5/87) - High Dividend Yield |
| | ⇓ | |
| | 4.05 | (19/6/87) (#4 in Top 15. FIG. 6B) |
| | ⇓ | |
| | 3.95 | July (17/7/87) - High 5 Week Volume Index (# 9 in Top 15. FIG. 7) |
| CRA | 11.30 | May (11/5/87) - High Dividend Yield |
| | ⇓ | |
| | 10.45 | May (10/7/87) - High Dividend Yield |
| | ⇓ | (10/7/87, FIG. 6A High Volume) |
| | 10.50 | July (17/7/87) - High 5 Week Volume Index (#12, FIG. 7) |

Examples of NTA/P and High Volume Index

| | | |
|---|---|---|
| Bell Resources Limited | 6.00 | May (11/5/87) High Volume at 17/7/87, (# 1 in Top 15. FIG. 6) High NTA/P at 11/5/87 |
| | 4.35 | July (3/7/87) High 1-Week Volume Index (#2 in Top 15. FIG. 6A) |
| | 4.78 | July (10/7/87) |
| | ⇓ | |
| | 6.00 | July (17/7/87) |
| Bridge Oil | 1.55 | High NTA/P at 11/5/87 (#1 in Top 15. FIG. 2) |
| | 1.90 | High 1-Week Volume at 17/7/87 (#14 in Top 15) |
| Westpac Banking Corporation | 4.98 | High NTA/P at 11/5/87 (#5. FIG. 2) |
| | 5.46 | High 1-Week Volume Index at 17/7/87 (#10. FIG. 6) |
| Tooth & Co. | 6.20 | May (11/5/87) - High NTA/P (#8, FIG. 2) |
| | 7.90 | July (17/7/87) - High 5-Week Volume Index (#4, FIG. 7) |
| Sunshine Australia | 2.45 | May (11/5/87) (#7 in NTA/P. FIG. 2) |
| | 2.65 | July (17/7/87) - High 5-Week Volume Index (#10. FIG. 7) |
| Austore Property Trust | 0.75 | May (11/5/87) (#4 in NTA/P. FIG. 2) |
| | 0.80 | July (17/7/87) - High 5-Week Volume Index (#7, FIG. 7) |

Similar analysis may be performed using other criteria mentioned in the earlier list of criteria.

FIGS. 9-11 are illustrative of a table of shares selected on the basis of criteria 11, i.e. change of ownership index and is used as a measure of a buy opportunity/signal/tip.

FIGS. 12, 29, 30 are a takeover watch and are illustrative of the volume index and the change of ownership index being used as a measure of a buy opportunity/signal/tip.

FIG. 13 is illustrative of a table of shares in which criteria 2 is used as a measure of the fundamental strength.

FIGS. 14 and 15 are illustrative of a table of shares in which criteria 3 is used as a measure of the fundamental strength/weakness.

FIGS. 16 and 17 are illustrative of a table of shares in which criteria 1 is used as a measure of the fundamental strength.

FIG. 18 is illustrative of a table of shares in which criteria 34 is used as the measure of the fundamental strength.

FIGS. 19A and 19B are illustrative of a table of shares in which criteria 8 is used for determining a buying or selling tip.

FIGS. 20-27 are illustrative of technical criteria of price rises or price falls.

As can be seen from the above, the method of analysing in accordance with the invention can be used as a basis for buying and selling tips of any type of tradable asset by a combination of the technical strength as an indicator of the volume turned over and the fundamental strength which is based on a criteria indicative of the particular market under consideration.

The computer program may also make available other information and other opportunities as follows:—

Comments made on a stock by brokers, media etc, as well as company announcements may be made available to a user based on the buy and sell signals/tips generated, user's interest (as may be determined through mass customisation).

Networking opportunities or loose alliances may be formed to discuss certain issues related to a stock or financial instrument. This may be in the form of talkback or chatting on the internet created for groups interested in sharing comments/analysis/research on a certain security.

It may be possible to present a prospectus or Initial Public Offering (IPO) on the internet. Also, the program may be set up for creating comparisons vs current benchmarks in the stock exchange. As a result, investors may either buy or underwrite or sub-underwrite or bid for stock using real-time trading, internet, etc.

The program may be used for identifying opportunities among closed end funds by comparing with other funds, stocks sectors, their Net Asset Value (NAV), Market Price (MP), NAV/MP, Yield, Fees charged, Total Returns etc. Ranking of NAV/MP and other criteria may be done to identify relativities, value, etc.

For Futures Markets, a third indicator besides Price and Volume may be used viz. open positions. This will also be compared with its own average or benchmark to create an Open Positions Index. The Open Positions Index may also be listed in descending order. For example, if Prices increase AND Volume Index is unusually high AND Open Positions Index is unusually high this will be a strong buy signal. Seasonal adjustments may include adjustments for double witching and triple witching.

Adjustments may be made for taxation purposes to suit investors as per their own circumstances and/or the tax regimes under which they operate.

Opportunities for international portfolio investing, global investing etc. may be highlighted.

Sensitivity Analysis of a stock may be carried out by setting norms of change of earnings per share with critical variables like prices of key commodities, exchange rates, interest rates etc. By using the current P/E multiple and/or other variables, arbitrage opportunities of buy or sell may be identified by generating appropriate signals/tips.

It may be possible to do a sensitivity analysis of price to key variables like interest rates, inflation, employment data, current account deficit, prices of key commodities, etc. to identify arbitrage opportunities. For example, if interest rates have gone up and bank stocks have gone down, identify relative value within the banking sector ie. identify those banking stocks which have fallen the most as a result of interest rate falls (these might offer switch opportunities within the banking sector). Likewise, if gold prices go up, identify relative value within gold stocks.

While the invention has been described with reference to tradable shares and other securities, the invention is equally applicable to any tradable asset in which volume is recorded and reported such as real estate. Also, embodiments of this document may be combined with relevant factors of the following markets to make it more applicable to each of them:

1. Property Application

There is a major difference in Property Valuations when compared with Share Valuations. Whereas Share Valuations are transaction based, Property Valuations are appraisal based.

The first step in Property Valuations is to correctly determine the net income after deducting all outgoings. The second step is to arrive at a decision to use a certain capitalisation rate. It must be remembered small changes in the capitalisation rate can cause significant changes in the resulting capital value. Individual owners of property with a given net income would like to know the capitalization rate applicable to the property.

The capitalisation rate is dependent on the following factors (research on some or all of these factors may be carried out regularly prior to assuming a certain capitalisation rate for the purpose of valuing a property):

- special characteristics like high returns, low risk, indivisibility, illiquidity, high costs of transfer, long-term nature etc.
- Location
- Building type
- Economic Situation
- Quality of cash flow and security of income
- Tenants and Tenant strength and its impact on security and regularity of income.
- Duration of Tenancy contracts
- Alternative investments including alternative property investments
- State of the property market, vacancy levels etc.
- Risks and insurance against fire, earthquake, cyclone, flood, third Party liabilities etc.
- Legal environment viz. Title, easements, encroachments, leases etc.
- Growth potential
- Sentiment. This is an important factor in determining capitalization rate and is a function of momentum. A discussion on momentum in estimating capitalization rates for property valuations is given in the following two paragraphs.

The capitalization rate for a given property may be estimated as a result of benchmarking and comparison with similar properties. The value of a property may be fixed on the basis of the estimated capitalization rate. This value may then be translated into certain norms like $ per square meter or $ per square foot. Those values may be regularly updated based on recent transactions.

Additionally, the number and value of transactions may be recorded. Once the data on price (or value in $ per unit of area etc) and volumes of transactions (in number and value) is updated, that information may be communicated to the relevant user. If there is a price rise and if the volumes of transactions are unusually high (mainly in value terms), it would be stated that the momentum is up in that particular geographical area for that category of properties. This would be deemed to be a buy opportunity/signal/tip for that particular category of property.

On the other hand, if there is a price fall and volumes of transactions are unusually high (again mainly in value terms), it would be stated that momentum is down and this would be deemed to be a sell opportunity/signal/tip.

2. Currency Application

The currency markets can be similarly based on the aforementioned factors (namely criteria 1-39, pages 13-21) as well as political and financial stability, interest rates, inflation, economic news and data, sentiment, and government actions, particularly the issue or retirement of debt securities.

Certain cross rates may have unusually high volatility and volumes on certain dates. For example, if the Australian Dollar has risen during a 10-hour time period against the US Dollar whilst volumes traded has been higher than average, it would be deduced and stated that the 10-hour momentum of the Australian Dollar is up or high against the US Dollar.

3. Commodities Application

Similarly the buy/sell tips for investment decision making on commodities will depend on many of the aforementioned criteria as well as an others the operator may wish to take into account as many deal with raw materials that are influenced by outside factors such as seasonality, production levels, political problems, and general supply and demand factors.

For example, if copper price is down over a three-month period and volume is more than average, it may be stated the 3-month momentum of copper prices is down.

4. Futures Application

The price of futures is determined in the trading on the exchange where again many different factors are taken into account. This system can help assist the decision making process, and be adapted to incorporate the different risk spreads needed or desired by each individual customer.

Hedgers may use this system to help better protect themselves against price changes. Speculators can use this system to better determine which way the prices will move on the futures market. For both kinds of users, they can use which criteria they believe are most influential in the determination of price and its movement and thus create their own variation system for better decision-making.

5. Options Application

Those in the options markets can also use the system as they would stocks as previously described (particularly as volume plays a significant part). The system can assist hedgers in protecting their investments as well as speculators who need to be able to identify changes in the market to ensure profits for themselves.

The decision process for considering buying or selling put and/or call options on stocks and stock indexes can be made easier with this system of buy/sell tips.

Options on interest rates can also be covered by this system by taking into account the more relevant factors that influence it, as well as evaluating the interest rate caps.

The options on currencies can be adapted in a similar manner as described above under the currency market.

6. Bonds Application

Prices and volumes of bonds traded would also be analysed in a similar manner and processed information would be provided on momentum and other fundamental as well as miscellaneous factors such as credit ratings, prevailing interest rate environment, perception of risk, inflation, etc.

The invention claimed is:

1. A computer readable medium which stores instructions executable by at least one processor to determine timings for buy/sell decisions for financial instruments by performing steps of:
  identifying one or more instruments, each of the one or more instruments comprising at least a financial asset or at least a tradable security;
  determining market characteristics for each of the one or more instruments based on recorded market characteristics associated with that instrument, the market characteristics comprising one or more trade volumes, one or more trade prices and one or more directions of movements of trade prices;
  computing at least one volume index for the each of the one or more instruments which is calculated as a ratio of actual trade volume over a length of time to average trade volume over that length of time for the each of the one or more instruments,
  ranking the one or more instruments based upon their technical strengths using at least combination of the volume indices and the directions of movements of trade prices;
  determining fundamental strength of each of the one or more instruments;
  ranking the one or more instruments based upon their fundamental strengths; and
  generating at least a buy signal or at least a sell signal for at least one of the one or more instruments based upon whether its technical strength rank exceeds a predetermined threshold and whether its fundamental strength rank exceeds a predetermined threshold.

2. The computer readable medium of claim 1 wherein the instructions are executable by the at least one processor to perform further step of determining an instrument from the one or more instruments having a combination of high volume index and upward price movement to be having upward technical strength or momentum up or both.

3. The computer readable medium of claim 1 wherein the instructions are executable by the at least one processor to perform further step of determining an instrument from the one or more instruments having high volume index and downward price movement to be having downward technical strength or momentum down or both.

4. The computer readable medium of claim 1 wherein the fundamental strength is determined based on at least market sector or at least possible market capitalization.

5. A system for determining timings for buy/sell decisions for financial instruments, the system comprising:
  a computer readable medium which stores instructions executable by at least one processor to
    identify one or more instruments, each of the one or more instruments comprising at least a financial asset or at least a tradable security,
    determine market characteristics for each of the one or more instruments, the market characteristics comprising one or more trade volumes, one or more trade prices and one or more directions of movements of trade prices,
    compute at least one volume index for the each of the one or more instruments which is calculated as a ratio of actual trade volume over a length of time to average trade volume over that length of time for the each of the one or more instruments,
    rank the one or more instruments based upon their technical strengths using at least combination of the volume indices and the directions of movements of trade prices,
    determine fundamental strength of each of the one or more instruments,
    rank the one or more instruments based upon their fundamental strengths,
    generate automatically at least a buy signal or at least a sell signal for at least one of the one or more instruments based upon whether its technical strength rank exceeds a predetermined threshold and whether its fundamental strength rank exceeds a predetermined threshold, and
    output information associated with the generated signal.

* * * * *